United States Patent
Archer et al.

(10) Patent No.: US 10,950,849 B2
(45) Date of Patent: Mar. 16, 2021

(54) HYBRID MATERIALS AND NANOCOMPOSITE MATERIALS, METHODS OF MAKING SAME, AND USES THEREOF

(71) Applicant: Cornell University, Ithaca, NY (US)

(72) Inventors: Lynden A. Archer, Ithaca, NY (US); Zichao Yang, Jiangsu (CN); Shyamal Kumar Das, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 14/098,838

(22) Filed: Dec. 6, 2013

(65) Prior Publication Data

US 2014/0225041 A1 Aug. 14, 2014

Related U.S. Application Data

(63) Continuation-in-part of application No. PCT/US2012/045188, filed on Jul. 2, 2012.
(Continued)

(51) Int. Cl.
*H01M 4/36* (2006.01)
*C08F 230/04* (2006.01)
*C08F 2/26* (2006.01)

(52) U.S. Cl.
CPC .............. *H01M 4/364* (2013.01); *C08F 2/26* (2013.01); *C08F 230/04* (2013.01)

(58) Field of Classification Search
CPC ... H01B 1/02; H01B 1/04; H01B 1/16; H01B 1/22; H01M 4/362; H01M 4/364; H01M 4/668; B82Y 30/00; B82Y 40/00; C08F 2/02; C08F 2/04–2/30; C08F 2/06; C08F 2/08; C08F 2/10; C08F 2/12; C08F 2/14; C08F 2/16; C08F 2/18; C08F 2/20;
(Continued)

(56) References Cited

U.S. PATENT DOCUMENTS

| | | | | |
|---|---|---|---|---|
| 4,959,417 A | * | 9/1990 | Miyazono | ............. C08F 265/04 525/274 |
| 4,990,571 A | * | 2/1991 | Miyazono | ................. C08F 8/14 525/274 |

(Continued)

FOREIGN PATENT DOCUMENTS

| | | |
|---|---|---|
| CN | 1381510 | 11/2002 |
| CN | 1737053 | 2/2006 |

(Continued)

OTHER PUBLICATIONS

Piao et al., Facile scalable synthesis of magnetite nanocrystals embedded in carbon matrix as superior anode materials for lithium-ion batteries, Chemical Communications, vol. 46, No. 1, pp. 118, Nov. 16, 2009.

(Continued)

*Primary Examiner* — Matthew R Diaz
(74) *Attorney, Agent, or Firm* — Hodgson Russ LLP

(57) ABSTRACT

Hybrid materials and nanocomposite materials, methods of making and using such materials. The nanoparticles of the nanocomposite are formed in situ during pyrolysis of a hybrid material comprising metal precursor compounds. The nanoparticles are uniformly distributed in the carbon matrix of the nanocomposite. The nanocomposite materials can be used in devices such as, for example, electrodes and on-chip inductors.

18 Claims, 48 Drawing Sheets

Related U.S. Application Data

(60) Provisional application No. 61/503,085, filed on Jun. 30, 2011, provisional application No. 61/578,464, filed on Dec. 21, 2011, provisional application No. 61/734,207, filed on Dec. 6, 2012.

(58) Field of Classification Search
CPC ...... C08F 2/22; C08F 2/24; C08F 2/26; C08F 2/28; C08F 2/32; C08F 30/04; C08F 230/04; C08F 275/00
USPC .................................................. 252/503, 506
See application file for complete search history.

(56) References Cited

U.S. PATENT DOCUMENTS

| | | | |
|---|---|---|---|
| 5,231,156 A | | 7/1993 | Lin |
| 5,744,118 A | * | 4/1998 | Imamura ............... B82Y 30/00 423/263 |
| 5,856,415 A | | 1/1999 | Lagace et al. |
| 5,962,608 A | * | 10/1999 | Ryang ..................... C08F 2/44 522/81 |
| 5,977,241 A | * | 11/1999 | Koloski ............... C08F 283/00 428/319.1 |
| 6,184,968 B1 | | 2/2001 | Taylor-Smith |
| 6,323,309 B1 | | 11/2001 | Swager et al. |
| 6,451,420 B1 | | 9/2002 | Jin et al. |
| 6,607,590 B2 | | 8/2003 | Jin et al. |
| 6,646,089 B2 | | 11/2003 | Dvornic et al. |
| 6,706,401 B1 | | 3/2004 | Wapner et al. |
| 6,727,304 B2 | * | 4/2004 | Sugihara ............... C08F 30/04 524/392 |
| 6,727,343 B2 | | 4/2004 | Morris et al. |
| 7,094,709 B2 | * | 8/2006 | Karkkainen ......... C01G 23/053 438/780 |
| 7,365,126 B2 | | 4/2008 | Atanasoska et al. |
| 7,385,003 B1 | | 6/2008 | Thoma et al. |
| 7,709,574 B2 | | 5/2010 | Wan et al. |
| 7,935,735 B2 | | 5/2011 | Li et al. |
| 8,058,347 B2 | | 11/2011 | Shelekhov |
| 2006/0167147 A1 | * | 7/2006 | Asgari ................. A61K 9/0024 524/174 |
| 2007/0099790 A1 | | 5/2007 | Wan et al. |
| 2009/0272949 A1 | | 11/2009 | Buttry |
| 2010/0087603 A1 | | 4/2010 | Brittain et al. |
| 2011/0124492 A1 | * | 5/2011 | Loukine ............... B01J 35/0013 502/159 |

FOREIGN PATENT DOCUMENTS

| | | | | |
|---|---|---|---|---|
| WO | WO 2010056623 A1 | * | 5/2010 | ............ C23C 18/08 |
| WO | 2010/099864 A1 | | 9/2010 | |

OTHER PUBLICATIONS

Yasuda, H., et al., New Carbon Composites Containing Ultrafine Fe, Co, or Ni Particles. 1. Facile Synthesis by Pyrolysis of Organometallic Polymers, Journal of Inorganic and Organometallic Polymers, Jan. 3, 1991, vol. 1, No. 1, pp. 135-141.

Yang, J., et al., A novel synthetic route to metal-polymer nanocomposites by in-situ suspension and bulk polymerizations, European Polymer Journal, Feb. 20, 2008, vol. 44, pp. 1331-1336.

Wu et al., LiFePO4 Nanoparticles Embedded in a Nanoporous Carbon Matrix: Superior Cathode Material for Electrochemical Energy-Storage Devices, Advanced Materials, 2009, 21, 27010-27014, May 12, 2009.

Piao et al., Facile scalable synthesis of magnetite nanocrystals embedded in carbon matrix as superior anode materials for lithium-ion batteries, Chemical Communication, vol. 46, No. 1, pp. 118-120, Jul. 16, 2009.

Chen et al., SnO2 Nanoparticles with Controlled Carbon Nanocoating as High-Capacity Anode Materials for Lithium-Ion Batteries, J. Phys. Chem. C 2009, 113, pp. 20504-20508, Oct. 16, 2009.

Yu et al., Encapsulation of Sn@Carbon Nanoparticles in Bamboo-like Hollow Carbon Nanofibers as an Anode Material in Lithium-Based Batteries, Angew. Chem. Int. Ed. 2009, 48, 6485-6489, Jan. 1, 2009.

Kang et al., Fe3O4 Nanoparticles Confined in Mesocellular Carbon Foam for High Performance Anode Materials for Lithium-Ion Batteries, Adv. Funct. Mater. 2011, 21, 2430-2438, Jan. 1, 2011.

Ji et al., Manganese oxide nanoparticle-loaded porous carbon nanofibers as anode materials for high-performance lithium-ion batteries, Electrochemistry Communications, 11 (2009), 795-798, Feb. 8, 2009.

Huang, Principles and Technologies of Sol-Gel, Chemical Industry Press, pp. 181-183, Sep. 30, 2005.

Li, Adhesives Production Principles, Chemical Industry Press, pp. 74-76, Aug. 31, 2009.

Yan et al., Basic Chemistry, Shandong People's Press, p. 191, Apr. 30, 2010.

Ruckenstein et al., Oxide-carbon composites and porous oxides prepared via water-swellable polymer networks, Chem. Mater., vol. 8, Iss. 2, pp. 547-552, Feb. 14, 1996.

Walcarius, A., Electrochemical Applications of Silica-Based Organic-Inorganic Hybrid Materials, Chem. Mater., 2001, vol. 13, pp. 3351-3372.

Tu C. et al., Magnetic Ni/SiO2 composite microcapsules prepared by one-pot synthesis, Journal of Materials Chemistry, Mar. 7, 2009, vol. 19, No. 9, pp. 1245-1251.

Palkovits, R., et al., Polymerization of w/o Microemulsions for the Preparation of Transparent SiO2/PMMA Nanocomposites, Langmuir, 2005, vol. 21, pp. 6048-6053.

Zhou, J., et al., Direct Incorporation of Magnetic Constituents within Ordered Mesoporous Carbon-Silica Nanocomposites for Highly Efficient Electromagnetic Wave Absorbers, J. Phys. Chem. C., Apr. 12, 2010, vol. 114, pp. 7611-7617.

Mazrouaa, A.M., Polypropylene, Chapter 14: Polypropylene Nanocomposites, InTech, May 2012, pp. 265-286.

Gomez-Romero, P., Hybrid Organic-Inorganic Materials—In Search of Synergic Activity, Advanced Materials, Feb. 8, 2001, vol. 13, No. 3, pp. 163-174.

Ellsworth, M.W. and Novak, B.M., "Inverse" Organic-Inorganic Composite Materials. 3. High Glass Content "Nonshrinking" Sol-Gel Composites via Poly(silicic acid esters); Chem. Mater. Jun. 1, 1993, vol. 5, No. 6, pp. 839-844.

Lin Y. and Haynes, C.L., Synthesis and Characterization of Biocompatible and Size-Tunable Multifunctional Porous Silica Nanoparticles, Chem. Mater, Aug. 12, 2009, vol. 21, pp. 3979-3986.

Holzapfel, V., et al., Synthesis and biomedical applications of functionalized fluorescent and magnetic dual reporter nanoparticles as obtained in the miniemulsion process, Journal of Physics: Condensed Matter, 2006, vol. 18, pp. S2581-S2594.

Liu, J., et al., Magnetic Nanocomposites with Mesoporous Structures: Synthesis and Applications; Small, 20111, vol. 7, No. 4, pp. 425-443.

* cited by examiner

1. Synthesis lithium polysulfide: $Li_2S + 2S \rightarrow Li_2S_3$ in DMF solution;
2. PAN crosslinked through CN - $Li^+$ interaction in DMF;

3. Dehydrogenation with S as oxidant and cyclization ($H_2S$ release);

4. Carbonization to form honeycomb C structure (partial N removal).

HYBRID MATERIALS AND NANOCOMPOSITE MATERIALS, METHODS OF MAKING SAME, AND USES THEREOF

CROSS-REFERENCE TO RELATED APPLICATIONS

This application is a continuation-in-part of PCT/US2012/045188, filed Jul. 2, 2012, which claims the benefit of U.S. Provisional Patent Application Nos. 61/503,085, filed Jun. 30, 2011, and 61/578,464, filed Dec. 21, 2011, the disclosures of which are incorporated herein by reference in their entirety. This application also claims the benefit of U.S. Provisional Patent Application No. 61/734,207, filed Dec. 6, 2012, the disclosure of which is incorporated herein by reference in its entirety.

STATEMENT REGARDING FEDERALLY SPONSORED RESEARCH

This invention was made with government support under contract nos. DOE-SC0001086 and DOE-DESC0001086, awarded by the Department of Energy and contract no. NSF-IIP-1237622, awarded by the Nation Science Foundation. The government has certain rights in the invention.

FIELD OF THE INVENTION

The present invention generally relates to composite materials and methods of making such composite materials. More particularly, the present invention relates to in situ formation of nanoparticles embedded in a carbon matrix.

BACKGROUND OF THE INVENTION

Rising energy prices and unmet demand for secondary batteries with higher energy & power densities, higher operating voltages, improved cycling stability, enhanced safety, and lower initial and life cycle costs has increased interest in lithium ion batteries (LIB). LIBs demonstrate higher energy density, higher operating voltage and lower self-discharge rates compared to conventional rechargeable batteries. They have consequently received intense scientific and commercial interest for portable electronics applications since the early 1990s. In recent years, the demand for secondary (rechargeable) batteries with better performance, higher charge-rate capability, improved cycling stability, and enhanced safety has steadily increased to meet new needs for smaller, lighter, more powerful electronic devices, as well as to accommodate growing interests in hybrid electric and plug-in hybrid electric vehicles.

A crucial performance criterion is the cyclability of the electrode materials and a key issue in capacity retention lies in the large structural and morphological changes many electrode materials undergo during cyclic insertion and deinsertion of lithium. Significantly, these changes occur in materials following rather different lithiation mechanisms, including alloying, conversion, and intercalation; implying that general solutions are required. Despite the sustained efforts of research groups worldwide, the performance achieved with the current LIB platforms based on a graphite anode and a lithium metal oxide (e.g., $LiCoO_2$) cathode is believed to be close to its limits due to the limited gravimetric capacity and rate capability of graphitic carbon as the anode material.

BRIEF SUMMARY OF THE INVENTION

The present invention provides hybrid materials, nanocomposite materials, methods of making such materials. Also provided are uses of such materials. The hybrid/in situ approach of the instant invention provides homogeneous dispersion of the metal precursor in the polymer matrix (e.g., a cross-linked polymer matrix).

In an aspect, the present invention provides a hybrid material. The hybrid material is a polymer comprising a metal precursor. The metal precursor is chemically bonded to the polymer. During pyrolysis of the hybrid material, nanoparticles are formed from the metal precursors. In an embodiment, the step of pyrolysing the hybrid material is carried out such that a nanocomposite material comprising a plurality of nanoparticles, the nanoparticles being formed from the metal component of the one or more metal precursor compounds, embedded in a carbon matrix is formed.

In an aspect, the present invention provides a nanocomposite material. The nanocomposite material has nanoparticles (e.g., metal nanoparticles, metal oxide nanoparticles, metal halide (e.g., metal fluoride) nanoparticles, metal boride nanoparticles, metal phosphate nanoparticles) embedded in a continuous phase of carbon (i.e., a carbon matrix).

In an aspect, the present invention provides methods of forming a material. The material can be a hybrid material or nanocomposite material as described herein.

In an embodiment, the method for forming a material comprises the steps of: contacting one or more monomers, one or more metal precursor compounds, optionally, an initiator, and, optionally, one or more solvents to form a reaction mixture, heating the reaction mixture such that a hybrid material comprising a plurality of metal precursor compounds chemically bonded to the polymer matrix is formed and, optionally, isolating the hybrid material. In an embodiment, the method further comprises the step of pyrolysing the hybrid material, such that a nanocomposite material comprising a plurality of metal oxide nanoparticles (or metal nanoparticles) embedded in a carbon matrix is formed.

In various embodiments, the nanocomposite material is subjected to various ex situ treatments such that nanoparticles of the resulting nanocomposite have different chemical compositions than the starting nanoparticles. For example, metal oxide nanoparticles are reacted such that metal, metal halide, metal sulfide, and metal phosphate nanoparticles are formed or metal sulfide nanoparticles are reacted such that metal oxides, metal halide, metal, or metal phosphate nanoparticles are formed.

In an aspect, the present invention provides devices comprising the hybrid material or nanocomposite materials described herein. Examples of such devices include batteries (e.g., secondary batteries), on-chip inductors.

Figure 49:
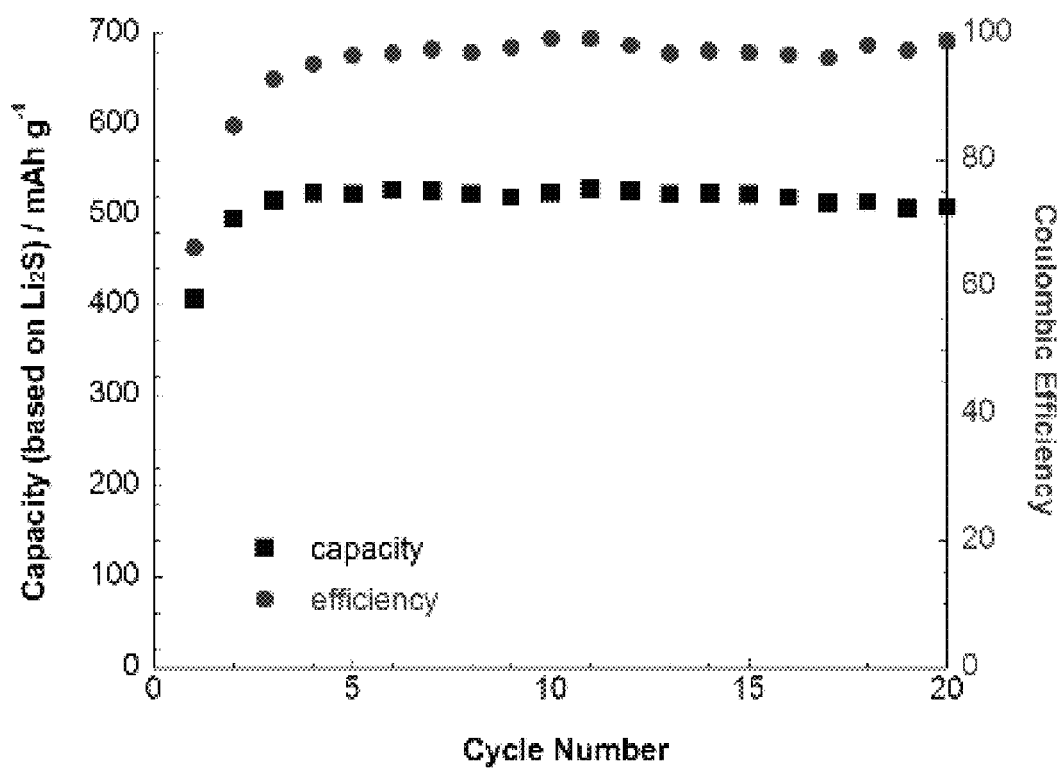

FIG. 49. Representative discharge capacity (left axis) and coulombic efficiency (right axis) of the Li$_2$S—C cathode as a function of cycle number. A fixed current density of 200 mA g$^{-1}$ was used for these measurements.

Figure 50:
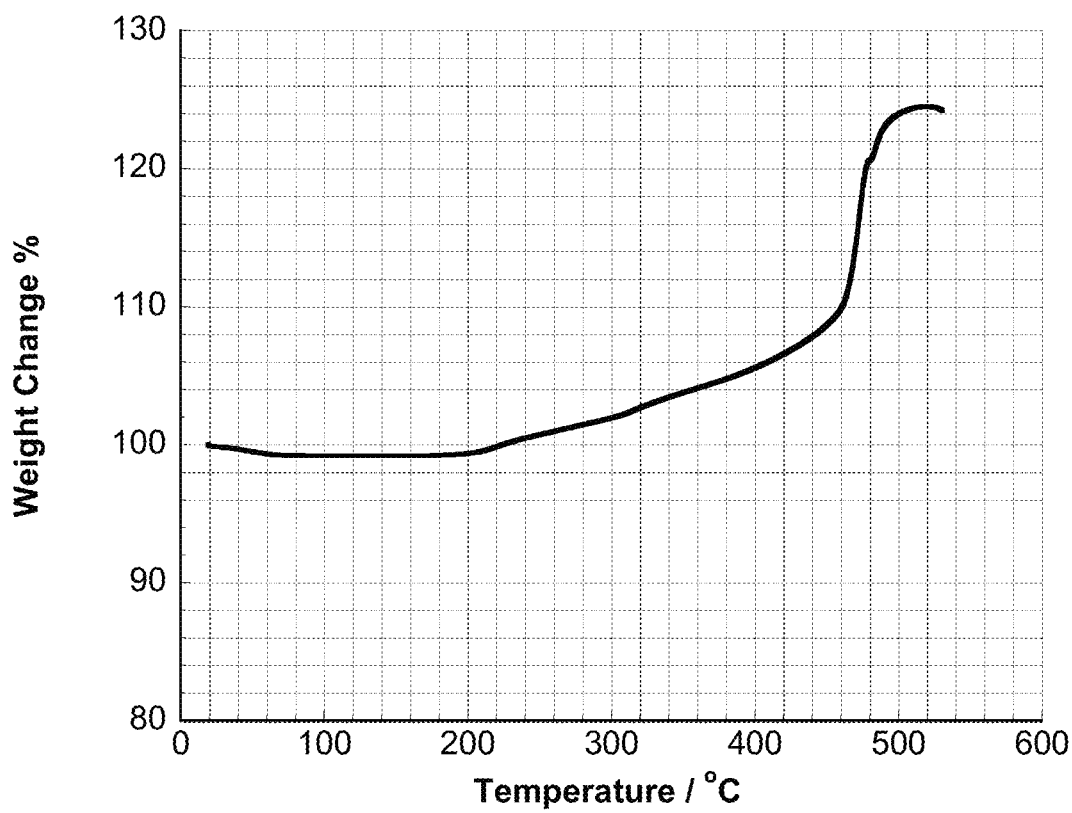

FIG. 50. Representative TGA curve of the Li$_2$S—C composite in dry air environment. The TGA was performed as follows: temperature was increased from room temperature at a rate of 5° C. min$^{-1}$; final temperature at 550° C. was held for 1 h to ensure complete oxidization.

Figure 51:
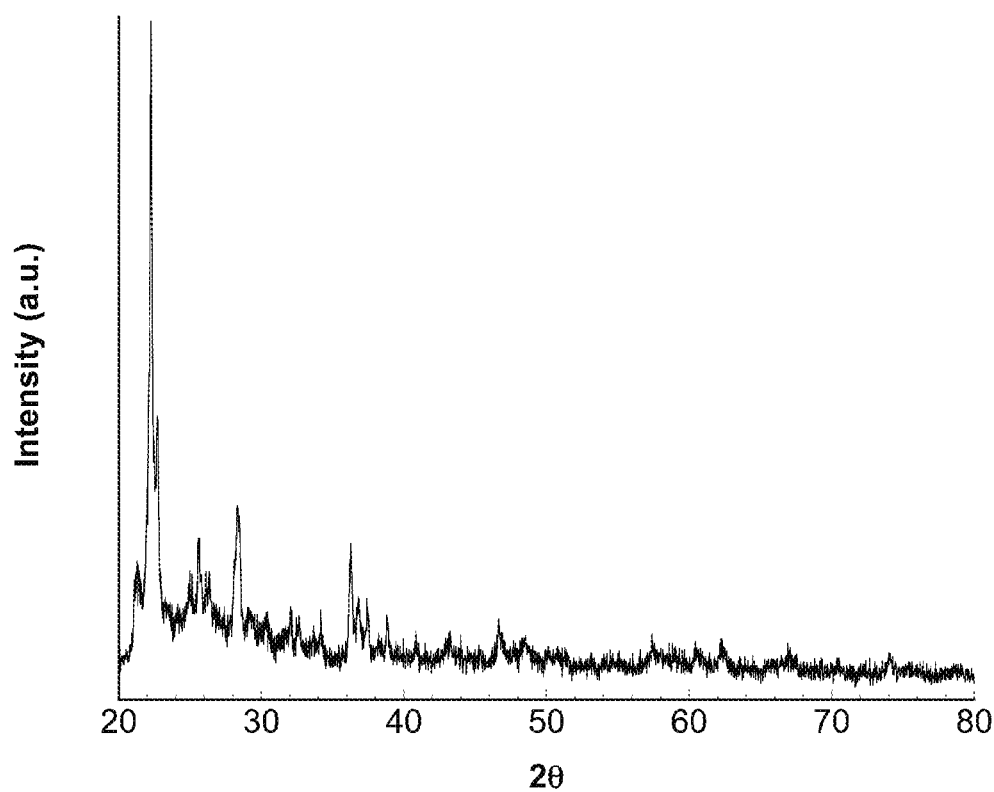

FIG. 51. Representative XRD pattern of remain the Li$_2$S—C sample after the TGA test, and it is indexed as Li$_2$SO$_4$.

Figure 52:
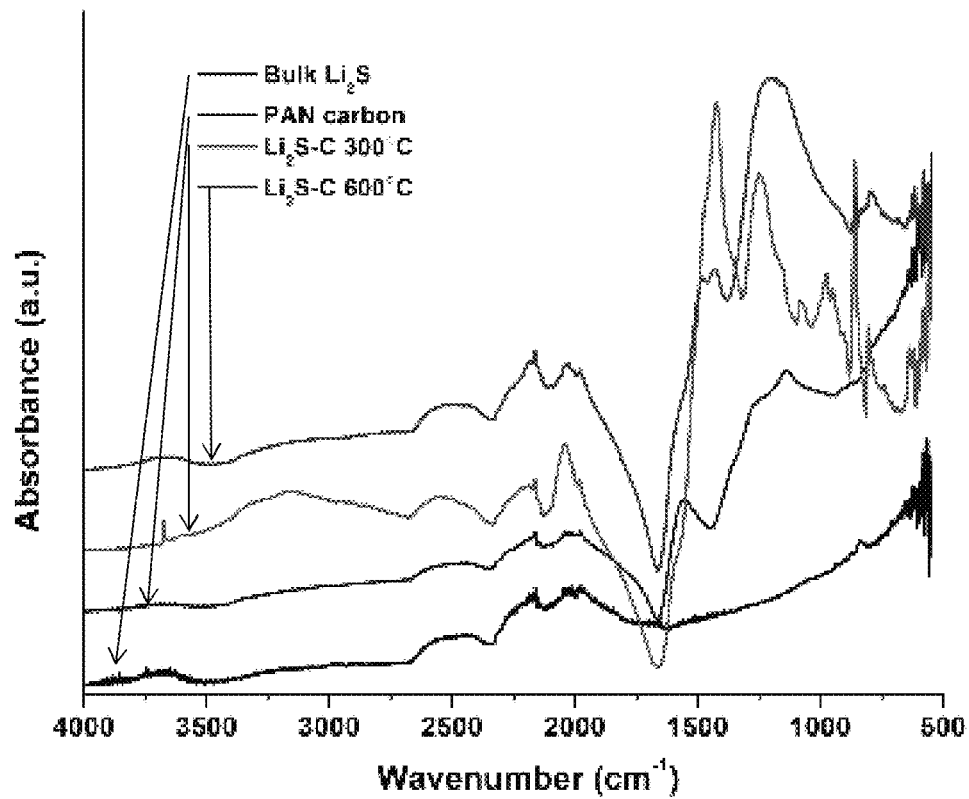

FIG. 52. Representative infrared spectra of bulk Li$_2$S, PAN carbonized at 600° C. and Li$_2$S—C composites synthesized at 300° C. and 600° C.

Figure 53:
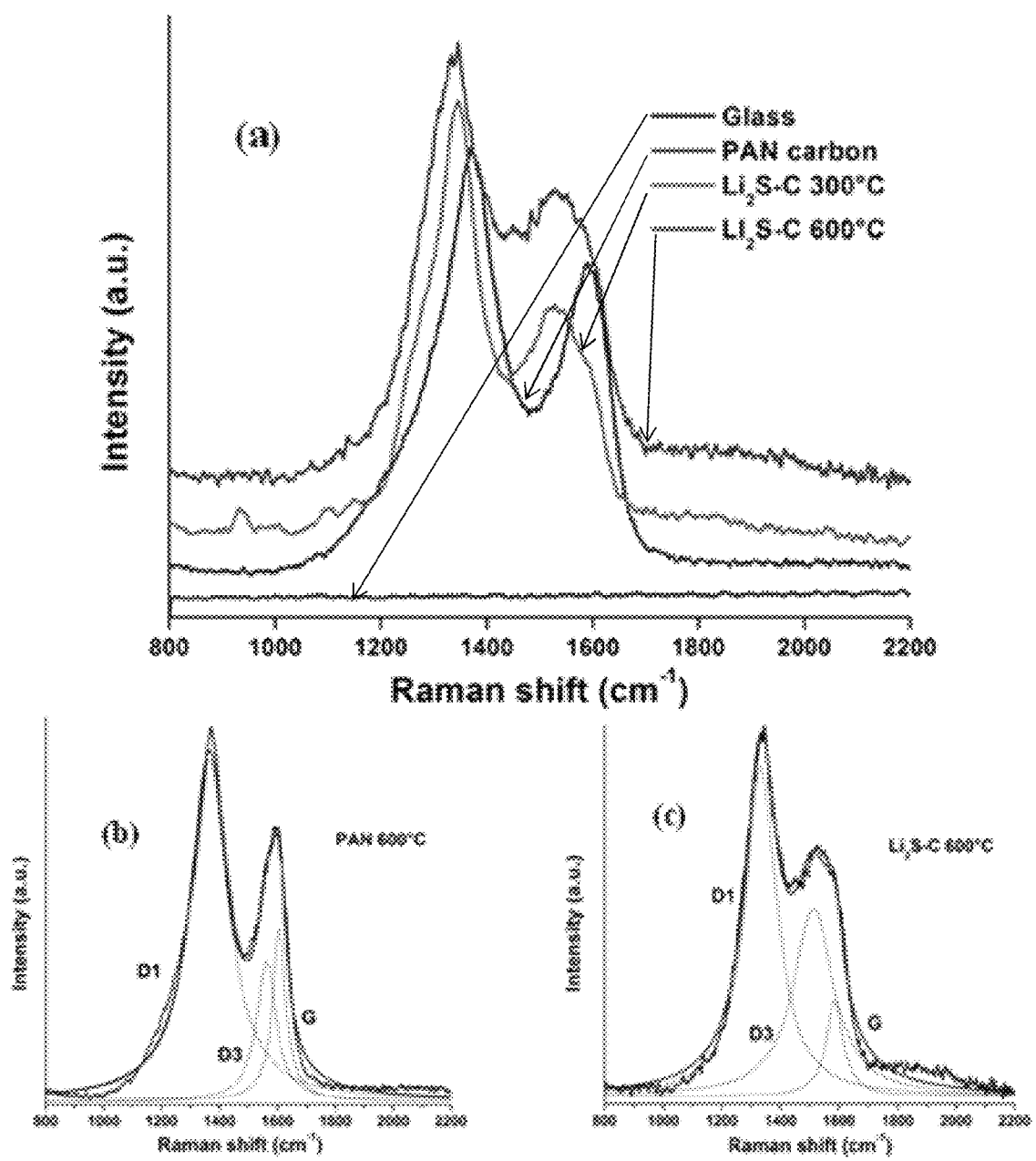

FIG. 53. Representative (a) Raman spectra of glass holder, PAN carbonized at 600° C. and Li$_2$S—C composites synthesized at 300° C. and 600° C.; (b) and (c) Deconvolution of the spectra.

Figure 54:
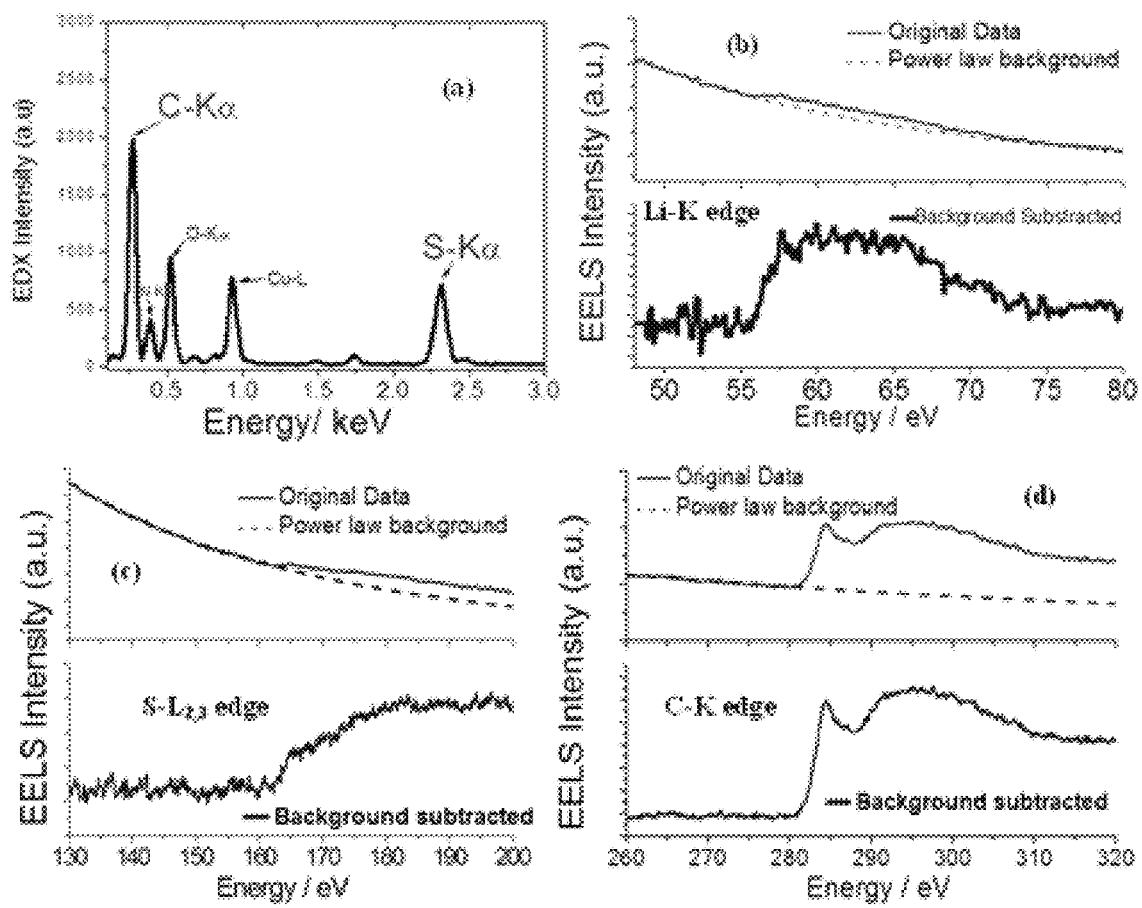

FIG. 54. Representative (a) EDX spectrum based on the area in FIG. 46b; original and power-law background subtracted EELS data of (b) Li—K edge, (c) S-L$_{2,3}$ edge, (d) C—K edge based on the line shown in FIG. 46e.

Figure 55:
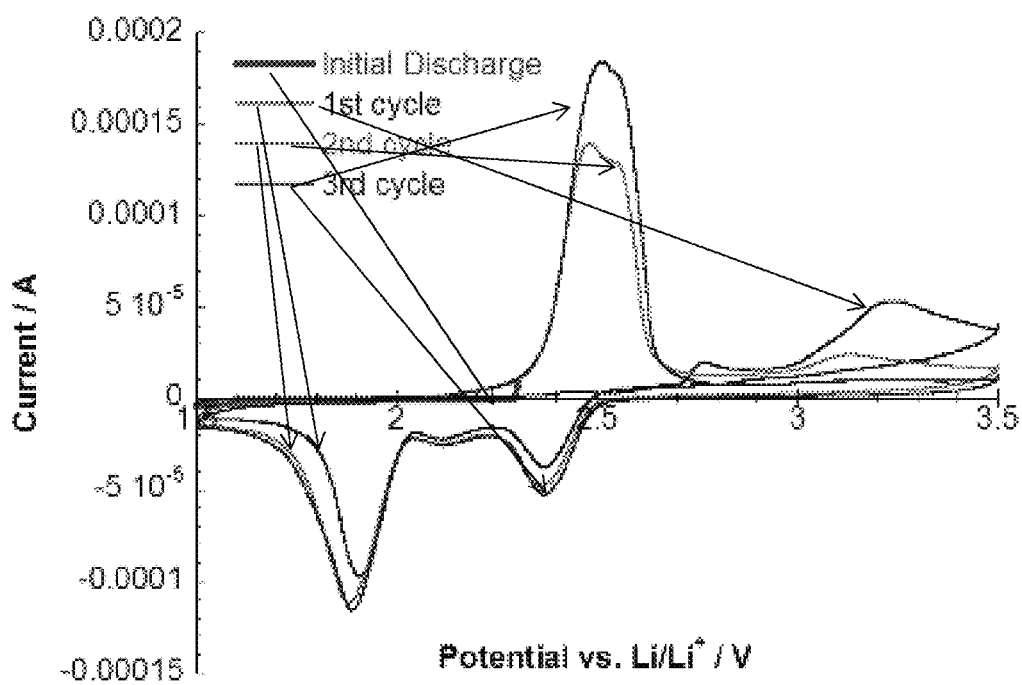

FIG. 55. Representative CV cycling: started with lithiation process (decreasing potential). Arrows indicate direction of scan during first cycle.

Figure 56:
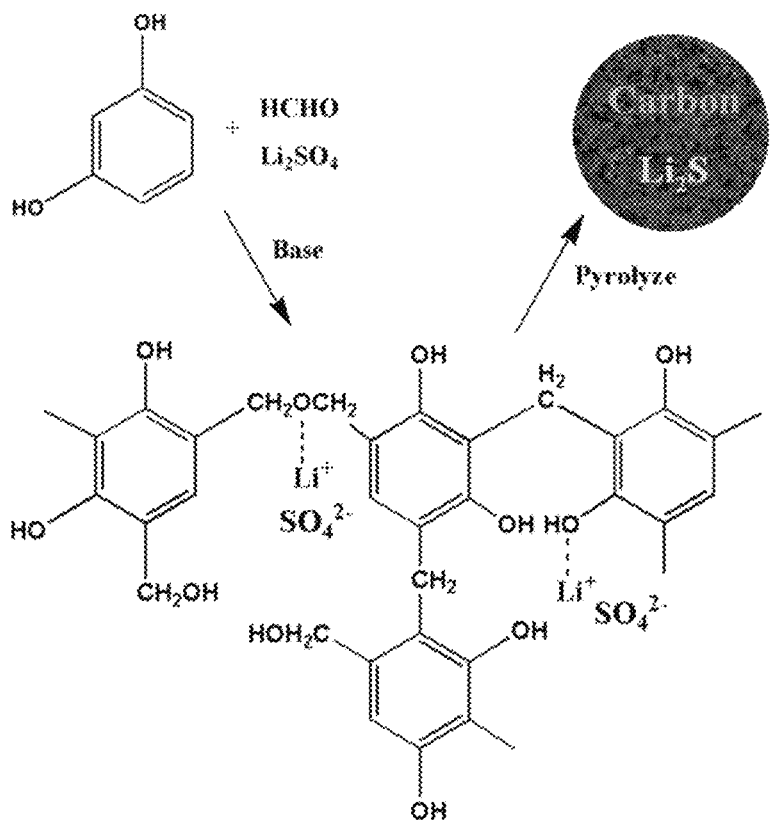

FIG. 56. Representative in situ synthesis scheme for Li$_2$S@C composite.

Figure 57:
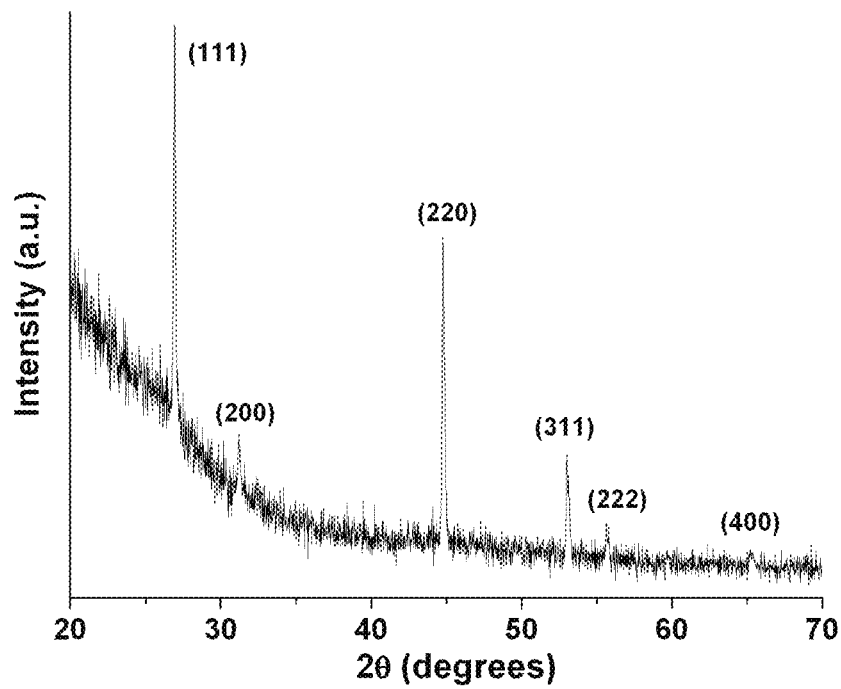

FIG. 57. Representative X-Ray Diffraction pattern of the Li$_2$S @C composite.

Figure 58:
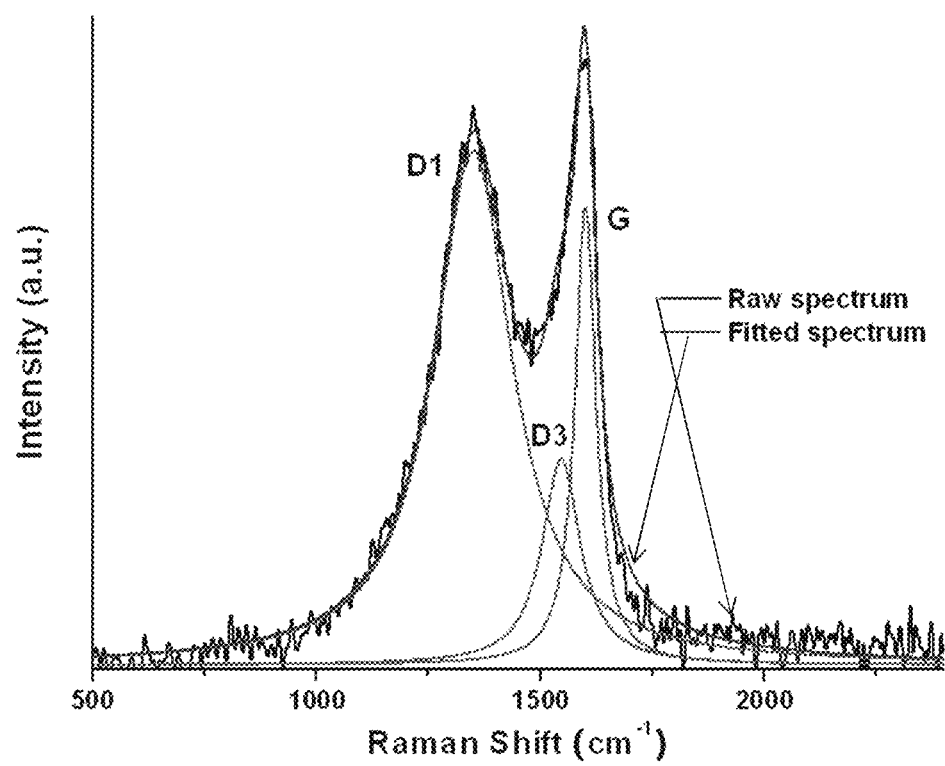

FIG. 58. Representative Raman spectrum of carbon pyrolyzed from RF gel at 900° C., deconvoluted into graphite (G), disordered graphitic lattice (D1) and amorphous carbon (D3) peaks.

Figure 59:
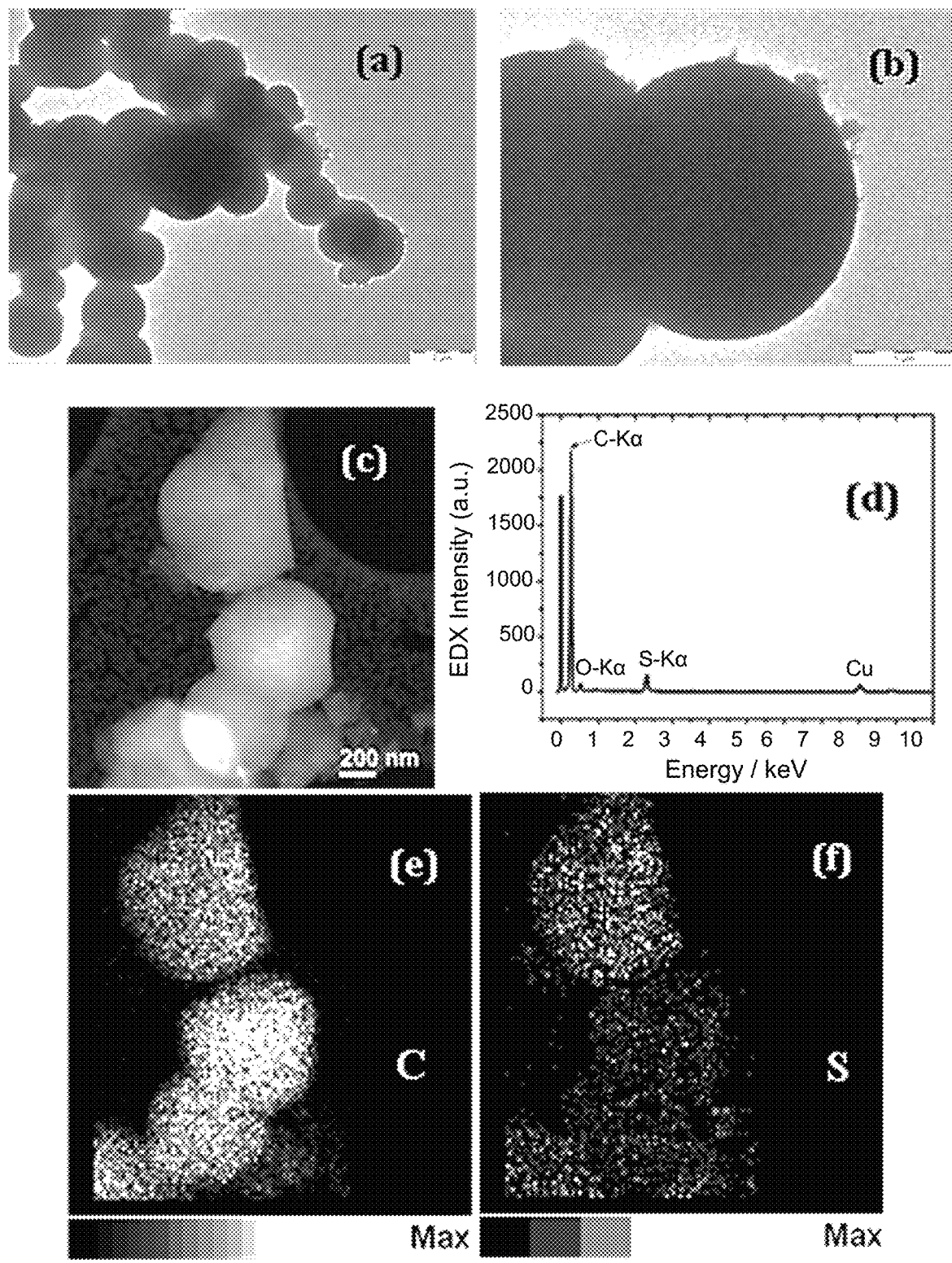

FIG. 59. (a) and (b) Representative transmission electron microscopy (TEM) images of Li$_2$S@C particles; (c) High angle annular dark field (HAADF) scanning transmission electron microscopy (STEM) image of Li$_2$S@C particles, along with (d) Energy Dispersive X-Ray (EDX) spectrum, showing the presence of carbon K edge and sulfur K edge; EDX mapping of (e) carbon and (f) sulfur.

Figure 60:
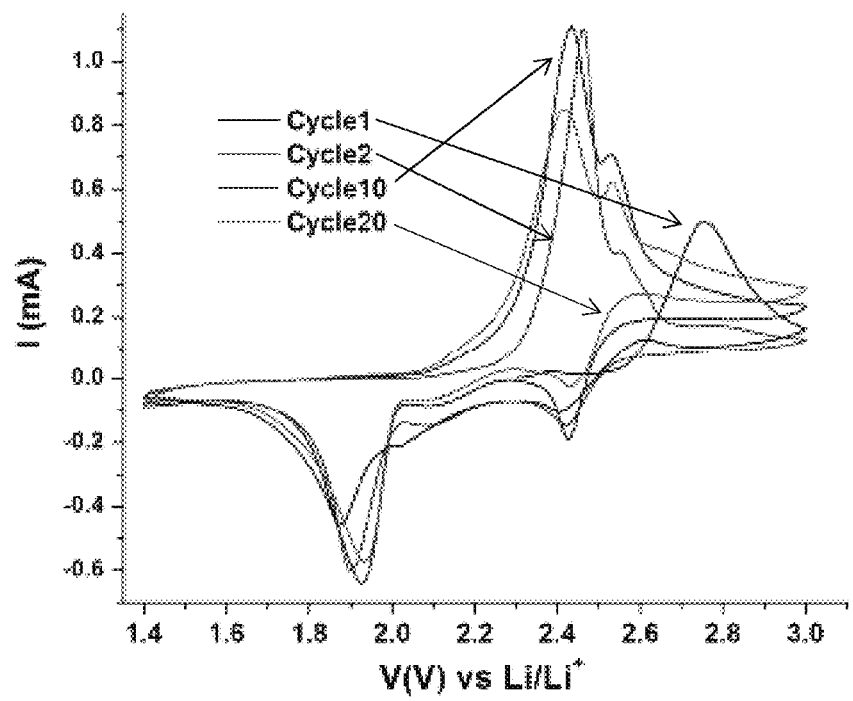

FIG. 60. Representative cyclic voltammograms of Li$_2$S@C composite in 1M LiTFSI in tetraglyme cycled at 0.2 mV/s.

Figure 61:
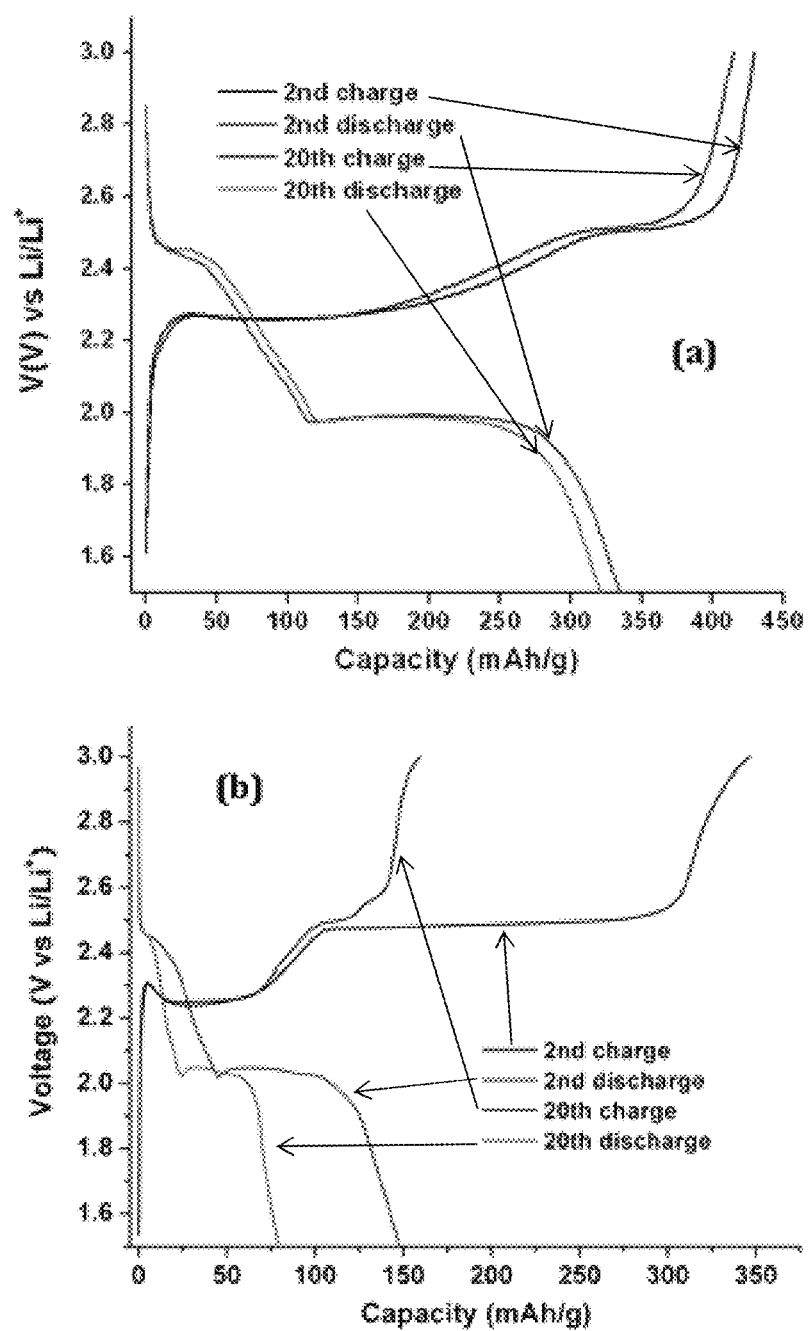

FIG. 61. Representative charge-discharge curves of (a) Li$_2$S@C composite and (b) physical mixture of Li$_2$S and carbon at 0.5 C charge/discharge rate. Electrolyte=1M LiTFSI in tetraglyme.

Figure 62:
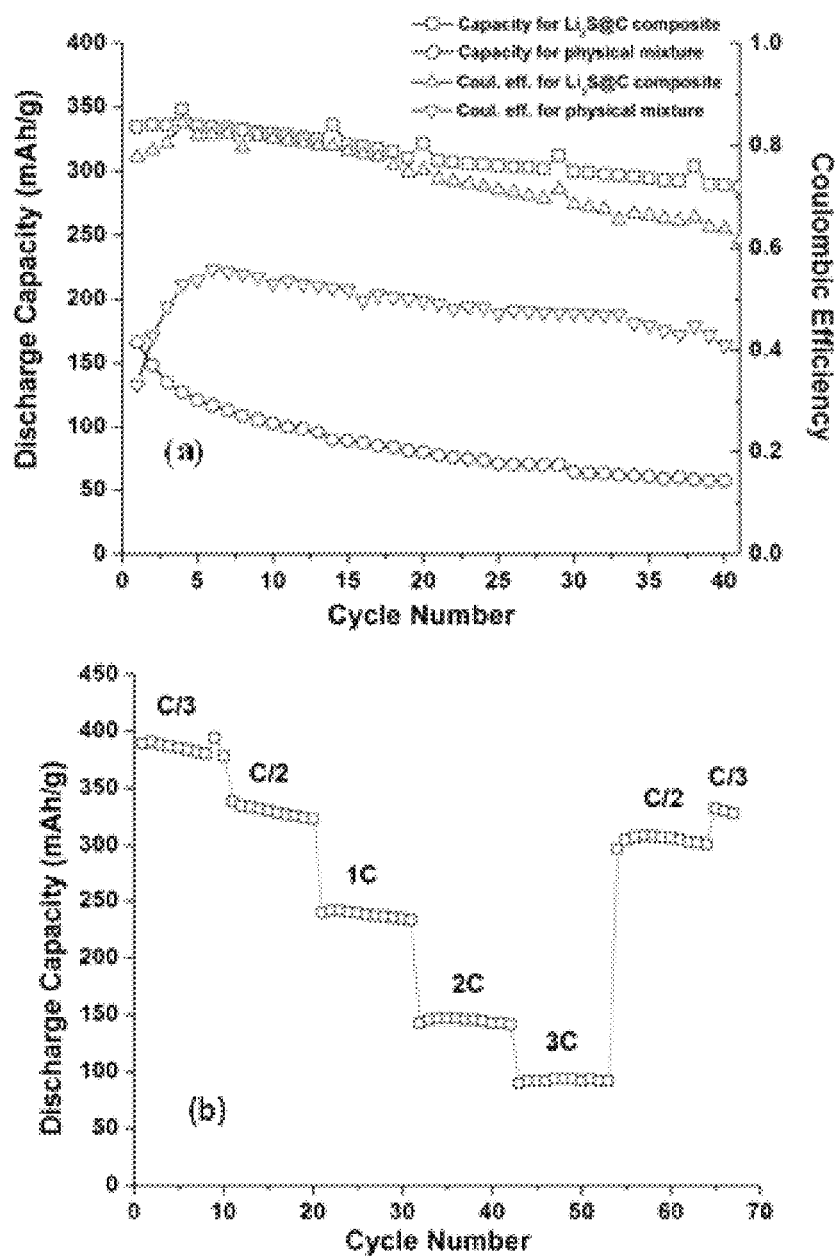

FIG. 62. Representative (a) Cycling performance of Li$_2$S@C composite and physical mixture of Li$_2$S and carbon in 0.5 C (1 C=1166 mA/g) charge/discharge rate; (b) Cycling performance of Li$_2$S@C composite at different charging rates. Electrolyte=1M LiTFSI in tetraglyme.

Figure 63:
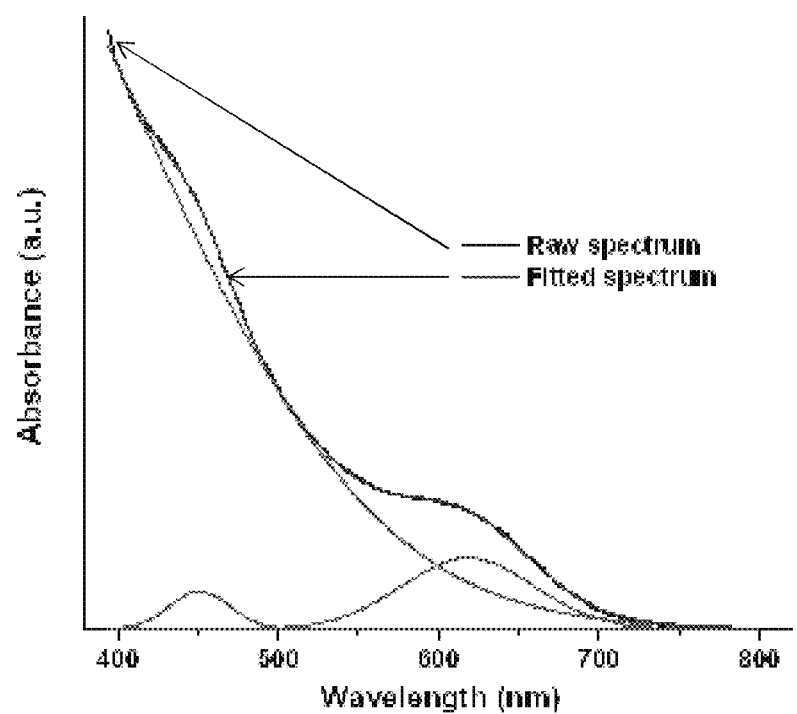

FIG. 63. Representative UV-visible absorbance spectra of lithium polysulfide (9.5 mA Li$_2$S$_{3.5}$) in tetraglyme.

Figure 64:
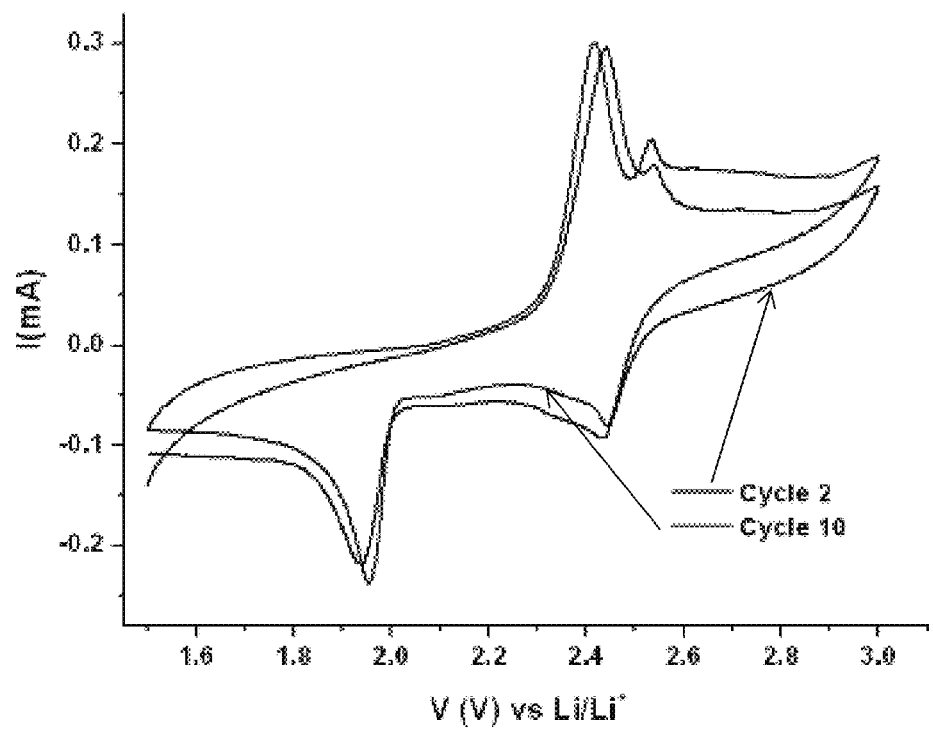

FIG. 64. Representative cyclic voltammograms of Li$_2$S@C in 1M LiTFSI+0.095M Li$_2$S$_{3.5}$ in tetraglyme.

Figure 65:
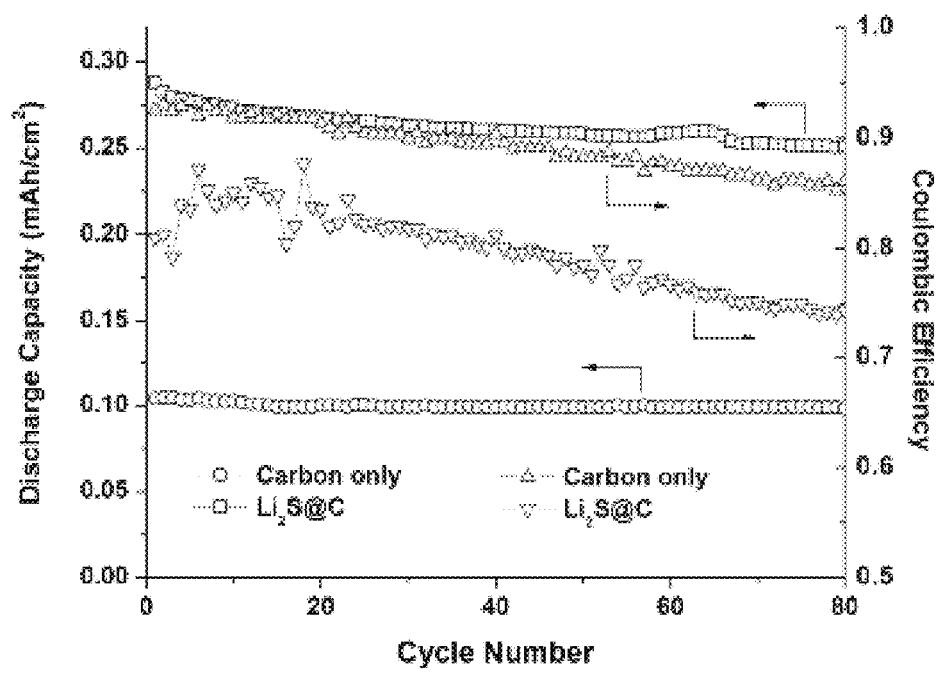

FIG. 65. Representative cyclic performance of carbon pyrolyzed from RF gel and Li$_2$S@C, respectively, in 1M LiTFSI+0.095M Li$_2$S$_{3.5}$ in tetraglyme, at charging rate of 0.16 mA/cm$^2$. Series in black corresponds to discharge capacity and series in blue corresponds to coulombic efficiency.

Figure 66:
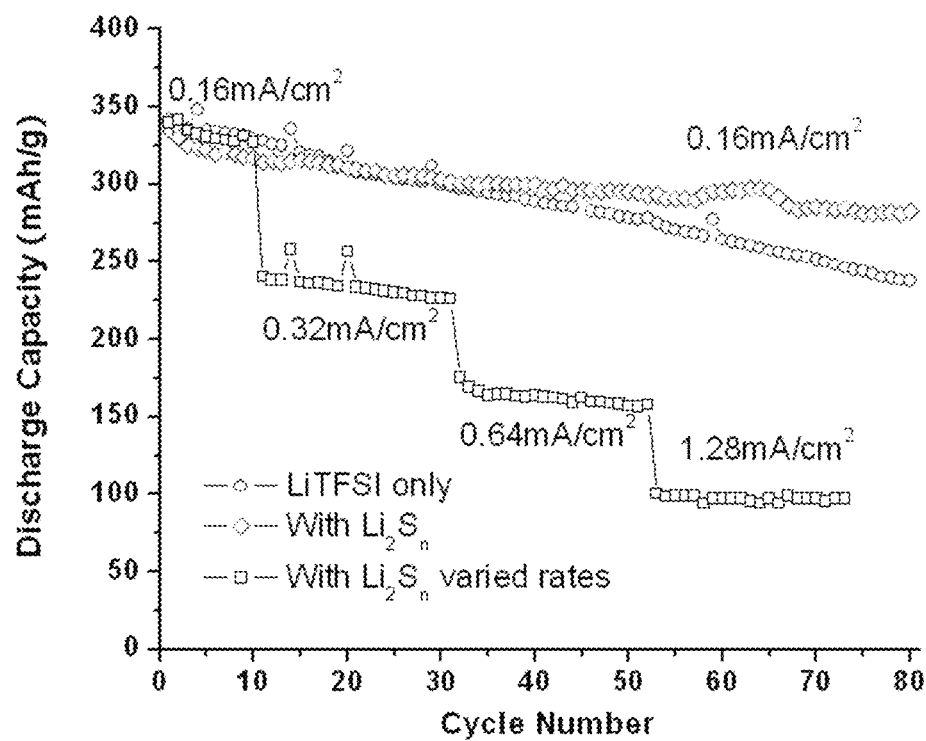

FIG. 66. Representative cycling performance of Li$_2$S@C with electrolytes without and with lithium polysulfides.

Figure 67:
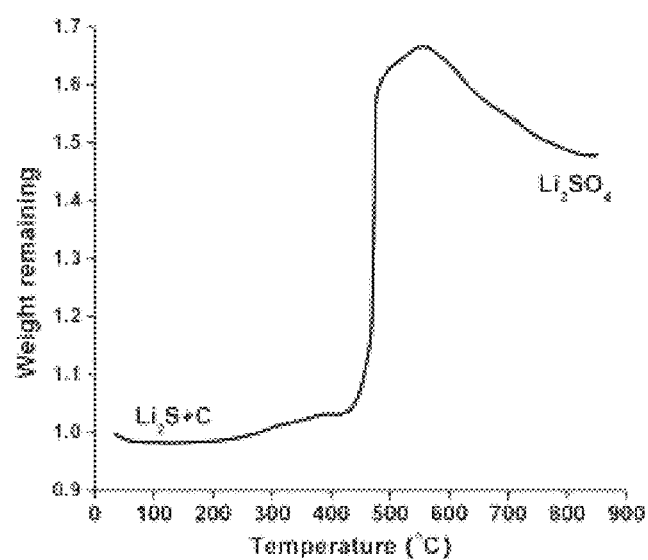

FIG. 67. Representative TGA curve of Li$_2$S@C composite in air.

Figure 68:
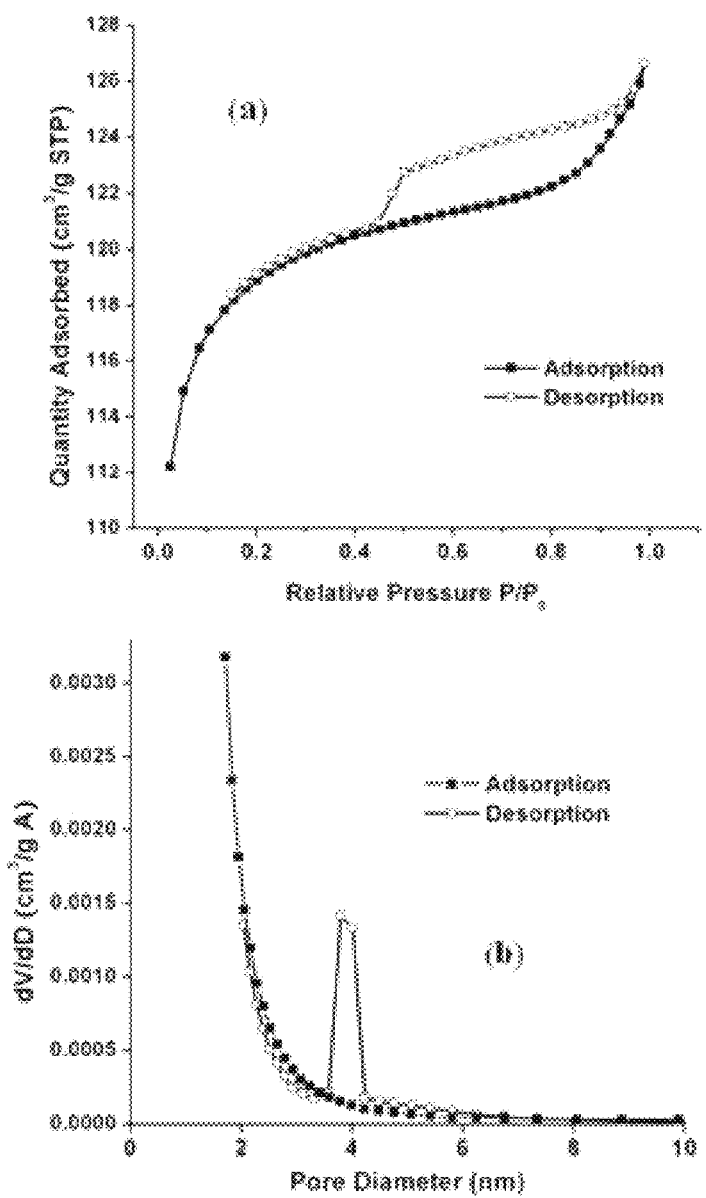

FIG. 68. Representative (a) nitrogen adsorption isotherms and (b) pore size distribution for the Li$_2$S@C composite.

Figure 69:
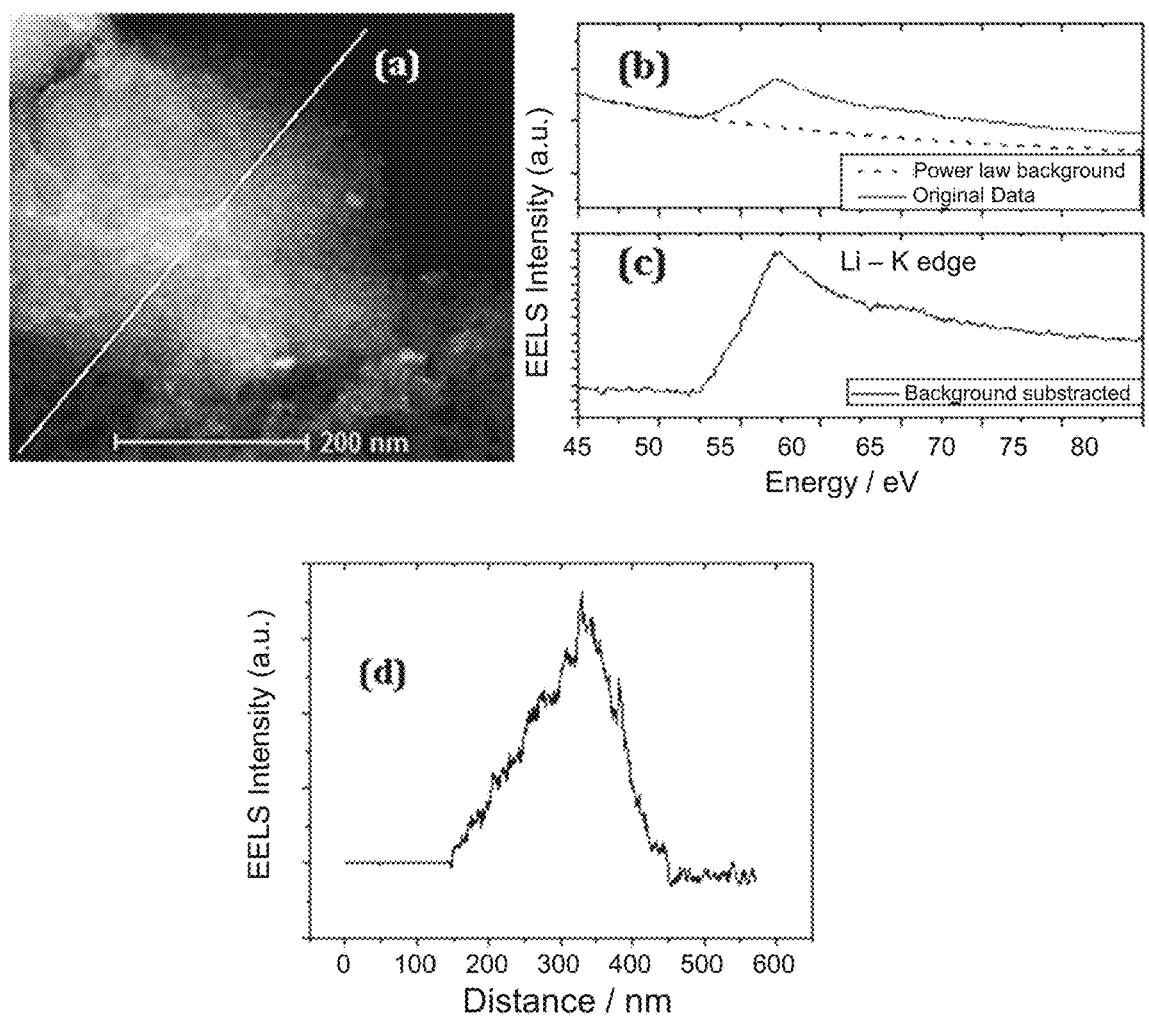

FIG. 69. Representative electron energy loss spectroscopy (EELS) analysis. (a) HAADF-STEM survey image, with EELS performed on highlighted line. (b) EELS spectrum at low energy range, with power-law background fitting and (c) background subtracted Li—K edge. (d) line profile of Li—K edge distribution, indicating the presence of Li in the particle.

Figure 70:
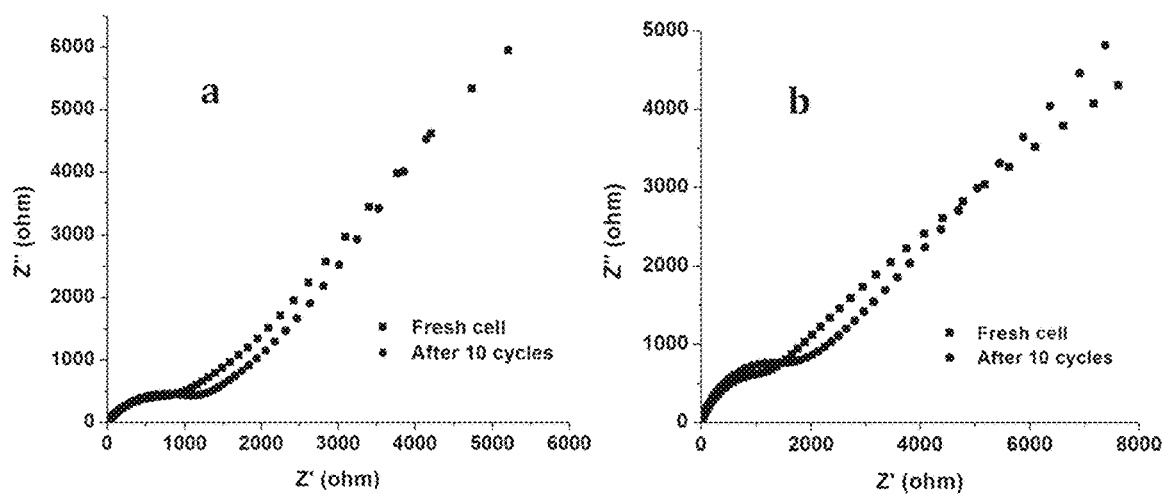

FIG. 70. Representative impedance plots of (a) Li$_2$S@C composite and (b) physical mixture of bulk Li$_2$S and carbon from pyrolysis of RF gel, before cycling and after 10 cycles.

Figure 71:
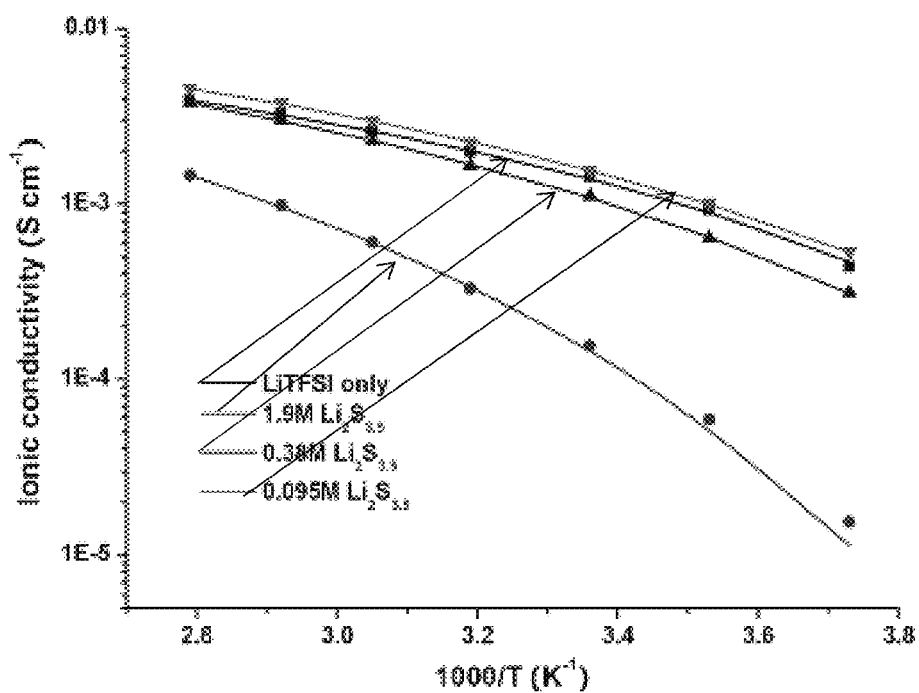

FIG. 71. Representative ionic conductivities of lithium polysulfide in tetraglyme (with 1M LiTFSI in all cases) at different concentrations and temperatures.

Figure 72:
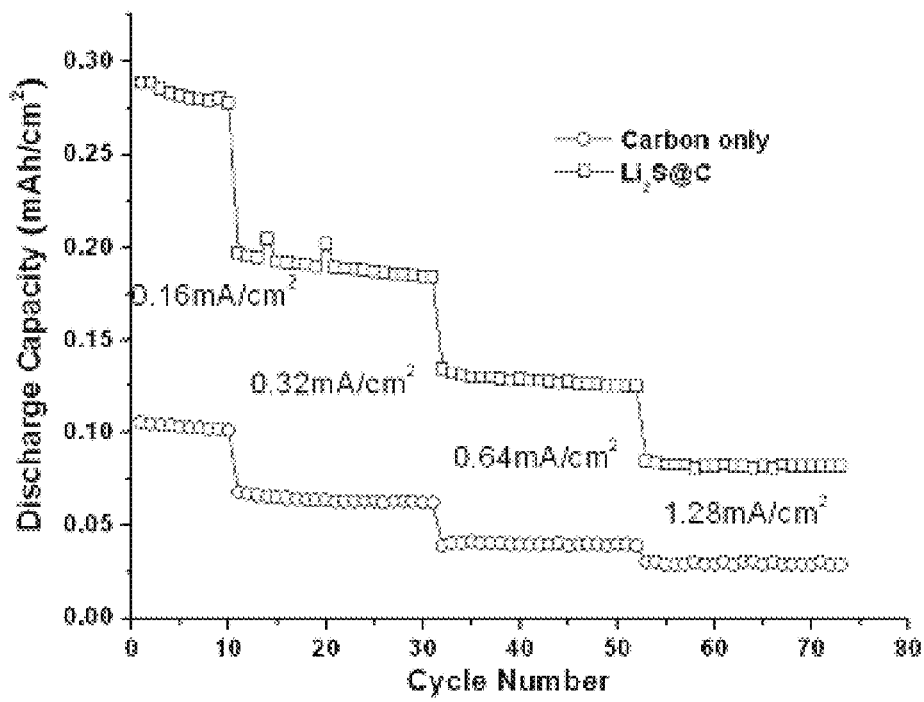

FIG. 72. Representative cycling performance of carbon pyrolyzed from RF gel and Li$_2$S@C, in 1M LiTFSI+0.095M Li$_2$S$_{3.5}$ in tetraglyme, at different charging rates.

DETAILED DESCRIPTION OF THE INVENTION

The present invention provides hybrid materials, nanocomposite materials, methods of making such materials. Also provided are uses of such materials.

The hybrid/in situ approach of the instant invention provides homogeneous dispersion of the metal precursor in the polymer matrix (e.g., a cross-linked polymer matrix) and thus the pyrolysis of the hybrid is able to yield composites with particles uniformly dispersed in the matrix. Additionally, the synthesis of the composite via simultaneous creation of the active material and the carbon matrix reduces the complexity of synthesis procedure and lends itself to the development of low-cost/scalable production processes.

In an aspect, the present invention provides a hybrid material. The hybrid material is a polymer comprising a nanoparticle precursor (e.g., metal precursor, or metal sulfide precursor). The metal precursor is chemically bonded to the polymer. During pyrolysis of the hybrid material, nanoparticles are formed from the metal precursors or metal sulfide precursors. In an embodiment, the hybrid material comprises a plurality of metal precursor compounds or metal sulfide precursor compounds embedded in a polymer.

By chemically bonded it is meant that the metal precursor or metal sulfide precursor (i.e., a chemical moiety of or metal center of the metal precursor or metal sulfide precursor) is chemically bonded via a chemical bond (e.g., covalent bond, coordinate covalent bond, or ionic bond) to the polymer.

A variety of polymers can be used. Suitable polymers can be thermally degraded (i.e., pyrolyzed) to provide a graphitic material or partially graphitic material. The resulting material is electrically conducting. The polymer can be a homopolymer or a copolymer. Examples of suitable polymers include poly(acrylonitrile), polyvinylpyrroilidone, polypyrrole, polyacetylene, polythiophene, polyphenylene vinylene, polyphenylene sulfide, polysaccharides (e.g., galactose, maltose, and glucose), acrylonitrile-divinylbenzene copolymer, phenol resin, and resorcinol-formaldehyde copolymer. The polymer or copolymer can be comprised of any one of the monomers described herein.

The metal precursor is a compound with a metal center and one or more ligands. The metal precursor compounds are chemically bonded to the polymer. The metal precursor is uniformly distributed throughout the polymer. The metal precursors form nanoparticles in situ during pyrolysis of the polymer. Depending on the components of the reaction mixture, it may be desirable the metal precursor be water soluble. The metal precursors are present in the hybrid material at from 10% by weight to 90% by weight, including all integer % by weight values and ranges therebetween. Examples of suitable metal precursor compounds include metal carboxylates, metal coordination compounds (e.g., metal thiolates), amino acid metal salts, and other metal-organic compounds.

By uniformly distributed it is meant there is a homogeneous distribution of a preponderance of the metal precursors in the polymer-based hybrid materials, or a homogeneous distribution of a preponderance of the nanoparticles in the nanocomposite materials. For the hybrid materials, there is a substantial absence of phase separation (e.g., no observed phase separation) between the polymer and metal precursors and/or a substantial absence of metal precursor aggregates (e.g., no metal precursor aggregates are observed). For the nanocomposite materials, there is a substantial absence of phase separation between the carbon matrix and nanoparticles (e.g., no observed phase separation) and/or a substantial absence of particle-particle aggregates (e.g., no particle-particle aggregates are observed).

The metal precursor can be a metal carboxylate. In an embodiment, the metal carboxylate comprises an alkyl moiety. The alkyl moiety can be a $C_6$ to $C_{30}$ alkyl moiety, including all integer number of carbons and ranges therebetween. The moiety can be branched or linear. The moiety can be substituted. For example, the alkyl moiety can be substituted with a reactive chemical moiety (e.g., a carbon-carbon double bond, and amine, hydroxyl, carboxylate groups and combinations of such groups (which can hydrogen bond with moieties in the polymer/monomer)) that can be incorporated in the polymer by a polymerization reaction. Examples of suitable metal carboxylates include alkyl metal carboxylates (e.g., iron undecylenate, manganese undecylenate, tin undecylenate, or vanadium undecylenate), metal citrates (e.g., iron citrate, manganese citrate, tin citrate, and vanadium citrate), amino acid metal salts (e.g., iron aspartate), and other metal-organic compounds (e.g., iron gluconate).

The metal sulfide precursor is a compound comprising a metal (lithium) and one or more sulfur atoms. The metal sulfide precursor compounds are chemically bonded to the polymer. The metal sulfide precursor is uniformly distributed throughout the polymer. The metal sulfide precursors form metal sulfide nanoparticles in situ during pyrolysis of the polymer. Depending on the components of the reaction mixture, it may be desirable the metal precursor be water soluble. The metal sulfide precursors are present in the hybrid material at from 10% by weight to 90% by weight, including all integer % by weight values and ranges therebetween. Examples of suitable metal sulfide precursor compounds include $Li_2S_3$, $LiSO_4$, and the like.

The metal sulfide precursor compound can cross link with the polymer. Without intending to be bound by any particular theory, it is considered that the cross-linking between the metal sulfide precursor and the polymer facilitates homogenous distribution of the precursor in the polymer matrix.

The metal precursor can be a metal coordination compound. In an embodiment, the metal center (e.g., Mo) of the metal precursor (e.g., ammonium molybdenum tertrathiolate) is chemically bound to the polymer via a coordinate covalent bond.

In an embodiment, the metal precursor or metal sulfide precursor has a chemical moiety that reacts with the polymer or monomer to form a chemical bond (e.g., a covalent bond or coordinate covalent bond). For example, the metal precursor is a metal carboxylate (e.g., iron undecylenate, manganese undecylenate, tin undecylenate, or vanadium undecylenate) having a carbon-carbon double bond that is copolymerized with a monomer or monomers.

In an aspect, the present invention provides a nanocomposite material. The nanocomposite material has nanoparticles embedded (e.g., encapsulated) in a continuous phase of carbon (i.e., a carbon matrix). In an embodiment, the nanocomposite material comprises a plurality of nanoparticles embedded in a carbon matrix.

The nanocomposite materials can include a variety of nanoparticles. For example, the nanoparticles can be metal nanoparticles, metal oxide nanoparticles, metal halide (e.g., metal fluoride) nanoparticles, metal boride nanoparticles, metal phosphate nanoparticles, or combinations of such nanoparticles. The nanoparticles can include a variety of metals. The nanoparticles can have multiple metals (e.g., metal alloys and mixed metal oxides). In the case of multiple metals in the nanoparticles, depending on the composition the individual nanoparticles can have mixed composition (alloyed nanoparticles) or a mixture of nanoparticles with different composition. For example, $Fe_{0.75}Mn_{0.25}O$ can provide alloyed nanoparticles and $Sn/FeSn_2$ can provide a mixture of nanoparticles with different compositions. The nanoparticles can be crystalline or amorphous.

Examples of suitable metal nanoparticles include Fe, Mn, and $FeSn_2$, $FeNi_3$, Al, Sn, Ge, and Si. Examples of suitable metal oxides include $Fe_2O_3$ (e.g., $\gamma$-$Fe_2O_3$), $Fe_3O_4$, $M_2FeO_4$ (M=Li, Na, K, Ag), CuO, $Cu_2O$, NiO, M-$NiO_2$ (M=Li, Na, K), MnO, $Mn_2O_4$, $Mn_2O_3$, M-$Mn_2O_4$ (M=Li, Na, K), $MoO_3$, $V_2O_5$, $TiO_2$, $M_4Ti_5O_{12}$ (M=Li, Na, K, Ag), $SnO_2$, SnO, $Co_3O_4$, and $MCoO_2$ (M=Li, Na, K). Examples of suitable metal sulfides include $MoS_2$, $MoS_3$ $FeS_2$, FeS, $Fe_{1-x}S$(x=0-0.2), CoS, CuS, $Cu_2S$, $TiS_2$, and $M_2S$ (M=Li, Na, K). Examples of suitable metal borides include $TiB_2$, $VB_2$, and $LiB_{10}$. Examples of a suitable metals fluoride are $CuF_2$, $FeF_2$, and $FeF_3$. Examples of suitable metal phosphates include $MFePO_4$ (M=Li, Na, K) and $LiMn_xFe_{1-x}PO_4$.

The nanoparticles are present at 10% by weight to 90% by weight, including all integer % by weight values and ranges therebetween. In an example, the nanoparticles are present at 40% by weight to 90% by weight.

Based on the composition of the nanoparticles and the methods used to form the nanoparticles, the nanoparticles can have a variety of shapes and sizes. In various examples, the nanoparticles have a spherical shape (e.g., $Fe_2O_3$ nanoparticles) or a rectangular shape (e.g., $MoS_2$ nanoparticles). In the case of spherical nanoparticles, the diameter of the nanoparticles is from 5 nm to 500 nm, including all integer nanometer values and ranges therebetween, in size. In the case of rectangular nanoparticles, the nanoparticles have a length of 20 to 100 nm, including all integer nanometer values and ranges therebetween, and a thickness of 5 to 20 nm, including all integer nanometer values and ranges therebetween. The size can be an average size. For example, the size of individual nanoparticles and the average nanoparticle size can be measured by transmission electron microscopy.

The nanoparticles have a narrow size distribution. For example, the nanoparticles have a polydispersity index of 1.001 to 1.05, including all values to 0.001 and ranges therebetween. In an embodiment, the nanoparticles are monodisperse (i.e., the fraction of nanoparticles within one standard deviation from the number average size is greater than or equal to 75%). In another embodiment, the fraction of nanoparticles within one standard deviation from the number average size is greater than or equal to 90%.

The nanoparticles are embedded in a carbon matrix. The carbon matrix is a partially graphitic or graphitic material. The graphitic material is a material consisting of graphite. The partially graphitic material is a material comprising graphite that may also contain disordered graphitic lattices and/or amorphous carbon. The presence of graphite, disordered graphitic lattices and/or amorphous carbon can be determined by techniques such as, for example, XRD and Raman spectroscopy. The carbon matrix is porous and amorphous. Aggregation of the nanoparticles in the carbon matrix is not observed (e.g., by TEM, SEM, or light microscopy). For example, the carbon matrix is formed by pyrolysing a hybrid material as described herein.

The carbon matrix can have a range of porosity based the materials and conditions used to form the matrix. In various examples, the pores of the carbon matrix are less than 100 nm, less than 20 nm, or less than 5 nm.

The nanocomposite materials exhibit desirable properties. The nanocomposite material is conductive. The material can have a conductivity of $10^{-5}$ to 100 S/cm. The material can have a Vickers Hardness of the composite is 1 to 40 GPa. The material can have a fracture toughness of the composite is 5 to 25 MPa $m^{1/2}$. In various examples, the capacity retentions of the composites in lithium-ion batteries is greater than 90%, greater than 95%, greater than 98% in 100 cycles at a 1 C charge/discharge rate.

In an aspect, the present invention provides methods of forming a material. The material can be a hybrid material or nanocomposite material as described herein. In an embodiment, the hybrid material is made by a method described herein. In an embodiment, the nanocomposite material is made by a method described herein.

In an embodiment, the method for forming a material comprises the steps of: contacting one or more monomers, one or more metal precursor compounds or metal sulfide precursor compounds, optionally, an initiator, and, optionally, one or more solvents to form a reaction mixture, heating the reaction mixture such that a hybrid material comprising a plurality of metal precursor compounds or metal sulfide precursor compounds chemically bonded to the polymer matrix is formed and, optionally, isolating the hybrid material.

In an embodiment, the method for forming a material comprises the steps of: contacting a polymer, one or more metal precursor compounds or metal sulfide precursor compounds and, optionally, one or more solvents to form a reaction mixture, heating the reaction mixture such that a hybrid material comprising a plurality of metal precursor compounds or metal sulfide precursor compounds chemically bonded to the polymer matrix is formed and, optionally, isolating the hybrid material.

In an embodiment, the reaction mixture comprises: a first (e.g., bulk) monomer (e.g., acrylonitrile), optionally, a second (vinyl or cross-linking) monomer (e.g., divinyl benzene), a metal precursor compound (metal carboxylate) (e.g., iron undecylenate), an initiator (e.g., AIBN), a (anionic) surfactant (e.g., sodium dodecyl sulfate), water, and one or more organic solvents such that a reaction mixture that is an aqueous emulsion is formed. In this embodiment, the reaction mixture is, optionally, subjected to high-shear mixing such that a miniemulsion having oil-in-water droplets with an average size of 0.01 microns to 0.5 microns if formed. For example, high shear mixing (for bench-top scale synthesis) can be provided by a sonication horn operated at 500 W and at 20 kHz with 50% amplitude. A larger scale reaction may require higher power to achieve the desired shear.

In another embodiment, the reaction mixture comprises: a first (e.g., bulk) monomer (e.g., resorcinol), and, optionally, a second (bulk) monomer (e.g., formaldehyde), a metal precursor compound (e.g., ammonium tetrathiomolybdate) or metal sulfide precursor compound (e.g., $Li_2S_3$ or $LiSO_4$), and water.

In an embodiment, the reaction mixture comprises a plurality (e.g., two, three, or four) of metal precursors, where the metal precursors each comprise a different metal.

The hybrid material can be pyrolysed to form a nanocomposite material. Nanoparticles are formed in situ from the metal precursor compounds as a result of the pyrolysis process. The pyrolysis process can be carried out in a single step or can have multiple steps. For example, carbonization can comprise consecutive, stabilization, carbonization, and graphitization steps. The determination of pyrolysis conditions is material dependent and is within the purview of one having skill in the art. For example, a single step pyrolysis step can be from 500 to 900° C., including all values to the degree Celsius and ranges therebetween. For example, a multiple step pyrolysis can be 320° C. for 1 hour for stabilization and 500° C. for 2 hours for carbonization. Higher temperatures may be required for complete graphitization.

The pyrolysis step (or one of the steps of a multiple step pyrolysis) can be carried out in an atmosphere comprising a variety of gases. A mixture of gases can be used. For example, the pyrolysis step can be carried out in air (or an oxygen containing atmosphere) or an inert atmosphere (e.g., a nitrogen atmosphere, an argon atmosphere, or a mixture thereof). For example, a reactive gas such as carbon dioxide (an oxidizing gas) can be used to provide increased mesopore and micropore content of the carbon matrix relative to pyrolysis in the absence of such gas.

In an embodiment, the method further comprises the step of pyrolysing the hybrid material, such that a nanocomposite material comprising a plurality of metal oxide nanoparticles (or metal nanoparticles) embedded in a carbon matrix is formed.

In an embodiment, the resorcinol-formaldehyde hybrid polymers are pyrolysed in an atmosphere comprising carbon dioxide or in a carbon dioxide gas atmosphere. The carbon dioxide is present at atmospheric pressure or substantially atmospheric pressure. The use of carbon dioxide in the pyrolysis step can provide a carbon matrix having a desirable morphology. For example, the carbon matrix can have an interconnected pore structure and higher surface area than materials obtained without using carbon dioxide in the pyrolysis step. For example, pyrolysis of a resorcinol-formaldehyde hybrid polymer at 800° C. in a $CO_2$ (g) atmosphere provides carbon with broad pore size distribution (including mesopores and micropores) with graphene-like sheet textures. Using carbon dioxide in the pyrolysis step can result in a loss of mass in the resulting composite material and increases the interconnectivity of the pores of the carbon matrix.

The nanocomposite material can be subjected to various ex situ treatments. The nanoparticles of the starting nanocomposite are subjected to reaction conditions that result in formation of a portion of or all nanoparticles having a different chemical composition than the starting nanoparticles. For example, metal oxide nanoparticles are reacted such that metal, metal halide, metal sulfide, and metal phosphate nanoparticles are formed or metal sulfide nanoparticles are reacted such that metal oxides, metal halide, metal, or metal phosphate nanoparticles are formed.

In an embodiment, the method further comprises reducing the metal oxide nanoparticles of the nanocomposite material comprising a plurality of metal oxide nanoparticles embedded in a carbon matrix by contacting the nanocomposite material with a reductant (e.g., hydrogen gas) or heating the nanocomposite material under inert conditions (to a temperature higher than the carbonization temperature (carbon serves as the reductant)), such that a nanocomposite material comprising a plurality of metal nanoparticles embedded in a carbon matrix is formed.

In an embodiment, the method further comprises contacting the nanocomposite material comprising a plurality of metal oxide nanoparticles embedded in a carbon matrix with a sulfur compound (e.g., sulfur), halide compound (e.g., fluoride compound), or phosphate compound, such that a nanocomposite material comprising a plurality of metal sulfide, metal halide, or metal phosphate nanoparticles embedded in a carbon matrix is formed.

In an embodiment, the method further comprises reducing the metal sulfide nanoparticles of the nanocomposite material comprising a plurality of metal sulfide nanoparticles embedded in a carbon matrix by contacting the nanocomposite material with a reductant (e.g., hydrogen gas) or heating the nanocomposite material under inert conditions (to a temperature higher than the carbonization temperature (carbon serves as the reductant)), such that a nanocomposite material comprising a plurality of metal nanoparticles embedded in a carbon matrix is formed.

In an embodiment, the method further comprises contacting the nanocomposite material comprising a plurality of metal sulfide nanoparticles embedded in a carbon matrix with an oxygen compound, halide compound, or phosphate compound, such that a nanocomposite material comprising a plurality of metal oxide, metal halide, or metal phosphate nanoparticles embedded in a carbon matrix is formed.

In an aspect, the disclosure provides a method for forming a nanocomposite material comprising a plurality of nanoparticles embedded in a carbon matrix comprising the steps of: a) contacting one or more monomers comprising a monomer selected from the acrylonitrile, divinyl benzene, resorcinol, formaldehyde, vinylpyrrolidone, vinyl alcohol, acrylic acid, phenol, 1,4-butadiene, isoprene, vinylsilane, sulfur, and combinations thereof such that least one of the monomers is acrylonitrile, resorcinol, formaldehyde, vinylpyrrolidone, vinyl alcohol, acrylic acid, phenol, vinylsilane, or sulfur; one or more metal precursor compounds selected from the group consisting of metal carboxylates, metal coordination compounds, and combinations thereof; wherein the metal of the metal carboxylates and/or metal coordination compounds is selected from the group consisting of Cu, Fe, Co, Li, Mn, V, Sn, and combinations thereof, an initiator, to form a reaction mixture, b) heating the reaction mixture such that a hybrid material comprising a plurality of metal precursor compounds chemically bonded to the polymer matrix is formed; c) pyrolysing the hybrid material, such that a nanocomposite material comprising a plurality of nanoparticles embedded in a carbon matrix is formed, the nanoparticles being formed from the metal component of the one or more metal precursor compounds; and d) contacting the nanocomposite material from step c) with a reductant or heating the nanocomposite material under inert conditions; such that a nanocomposite material comprising a plurality of metal nanoparticles embedded in a carbon matrix is formed.

The bulk monomer or monomers form the majority of the polymer in the hybrid material. Examples of suitable bulk monomers include acrylonitrile, resorcinol, formaldehyde, vinylpyrrolidone, vinyl alcohol, acrylic acid, and phenol.

The cross-linking monomer forms cross links in the polymer. Examples of suitable cross-linking monomers include divinylbenzene, 1,4-butadiene, isoprene, vinylsilane, and sulfur.

Any initiator that initiates the polymerization of the monomers can be used. For example radical polymerization initiators can be used. Examples of suitable initiators include 2,2'-azobisbutyronitrile (AIBN), benzoyl peroxide, dicumyl peroxide, potassium persulfate, and 4,4'-azobis(4-cyanovaleric acid).

Any surfactant that forms a suitable aqueous emulsion can be used. For example anionic surfactants can be used. Examples of suitable surfactants include sodium dodecyl sulfate, hexadecyltrimethylammonium bromide, and polysorbates.

A single solvent or mixture of solvents can be used. For example, the solvent can be water. In the case where water is a solvent, depending on, for example, the components of the reaction mixture, it may be desirable to have the pH of the reaction mixture be greater than 7. Examples of suitable solvents include water, DMF, toluene, and cyclohexane.

The selection of reaction conditions that result in formation of the desired nanoparticle composition is within the purview of one having skill in the art. The polymerization temperature for acrylonitrile is typically 60-80° C.

The steps of the method described in the various embodiments and examples disclosed herein are sufficient to produce hybrid materials and/or nanocomposite materials of the present invention. Thus, in an embodiment, the method consists essentially of a combination of the steps of the methods disclosed herein. In another embodiment, the method consists of such steps.

In an aspect, the present invention provides devices comprising the hybrid material or nanocomposite materials described herein. Examples of such devices include batteries (e.g., secondary batteries), on-chip inductors. Such device structures and methods of making such structures are known in the art.

In an embodiment, the present invention provides an electrode comprising a nanocomposite material. In an embodiment, a device comprises an electrode (e.g., an anode) comprising the nanocomposite material. In an embodiment, the present invention provides an on-chip inductor comprising the nanocomposite material. In an embodiment, a device comprises an on-chip inductor. The on-chip inductors can be constructed using, for example, nanocomposites containing iron or iron/nickel alloy nanoparticles.

The following examples are presented to illustrate the present invention. They are not intended to limiting in any manner.

Example 1

This example describes the synthesis and characterization of examples of hybrid materials and nanocomposite materials of the present invention.

An in situ, scalable method for creating a variety of transition metal oxide-carbon nanocomposites was developed based on free-radical polymerization and cross-linking of poly(acrylonitrile) in the presence of the metal oxide precursor containing vinyl groups. The approach yields a cross-linked polymer network, which uniformly incorporates nanometer-sized transition metal oxide particles. Thermal treatment of the organic-inorganic hybrid material produces nearly monodisperse metal oxide nanoparticles uniformly embedded in a porous carbon matrix. Cyclic voltammetry and galvanostatic cycling electrochemical measurements in a lithium half-cell are used to evaluate the electrochemical properties of a $Fe_3O_4$-carbon composite created using this approach. These measurements reveal that when used as the anode in a lithium battery, the material exhibits stable cycling performance at both low and high current densities. The polymer/nanoparticle copolymerization approach can be readily adapted to synthesize metal oxide/carbon nanocomposites based on different particle chemistries for applications in both the anode and cathode of LIBs.

Figure 1:
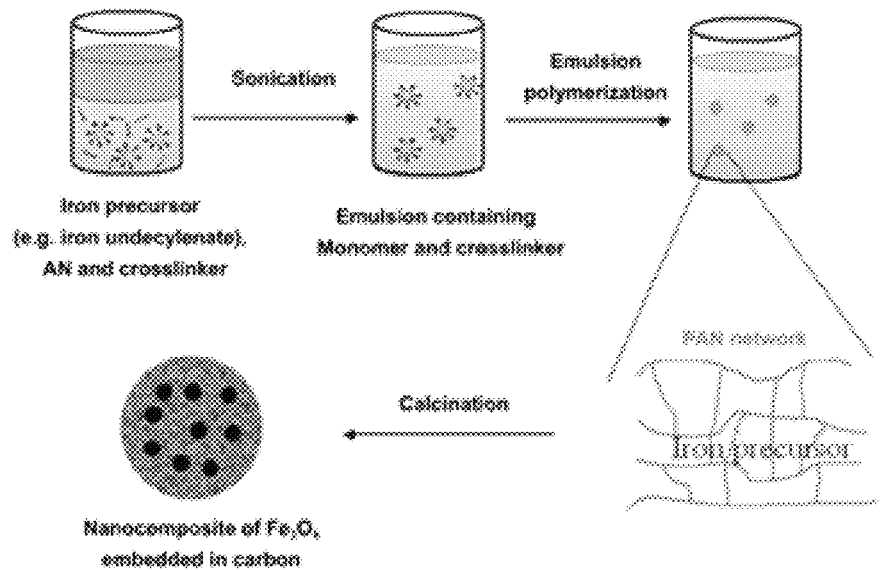
FIG. 1. An example of an in situ synthesis scheme for $Fe_3O_4$—C nanocomposite.

A facile, scalable emulsion polymerization technique for synthesizing transition metal oxide nanoparticles embedded in a porous carbon matrix has been reported. The method (illustrated in FIG. 1) relies upon co-polymerization and cross-linking of the carbon precursor (acrylonitrile) and the nanoparticle precursor in a single-step; it yields polymer-nanoparticle hybrids with uniform particle distributions at high nanoparticle loadings. The procedure is also applicable for large-scale production of metal oxide-carbon composites required for commercial-scale LIB manufacturing processes. The procedure was demonstrated by using a high-capacity (924 mA h $g^{-1}$) transition metal oxide ($Fe_3O_4$) and show that it is adaptable to other oxides.

A nanocomposite of metal oxide/metal and carbon has been synthesized via a polymerization-carbonization process. A metal precursor (a carboxylic acid salt of the metal), soluble in nonpolar solvents, is mixed with a monomer, a cross-linking agent and a surfactant to form an oil-in-water emulsion. For example, emulsion polymerization is performed to yield a composite of polymer nanoparticles encapsulating the iron precursor. The material is then separated from the liquid phase and carbonized to give a composite material of metal oxide/metal-carbon nanoparticles, which may be used as the active electrode material for lithium-ion batteries. $Fe_3O_4$ was demonstrated as an example compound but the method is applicable to various metal oxides/metals. The method can also be extended to synthesize nanocomposites consisting of nanoparticles of other materials (e.g., other compounds which contain the metal such as CoS or a metal fluoride such as $CuF_2$) embedded in a carbon matrix, through ex situ treatment of metal/carbon composites with sulfur, fluorine, and other materials (see, e.g., Example 2).

Reagents used in the study were purchased from Sigma-Aldrich unless otherwise specified and used without purification. Iron undecylenate was synthesized by the following procedure. 10.8 g (40 mmol) of $FeCl_3.6H_2O$, 4.8 g (0.12 mol) of NaOH and 22.1 g (0.12 mol) of undecylenic acid were added to a mixture of 80 ml of ethanol, 60 ml of water and 140 ml of hexane under vigorous stirring. The mixture was heated at 70° C. for 3 hours and then the organic phase was collected using a separation funnel. After washing with water for 3 times, hexane was driven off from the mixture using a rotary evaporator to obtain iron undecylenate, a waxy solid.

In a typical reaction, 2 ml acrylonitrile (AN), 2 ml divinylbenzene (DVB) and 1.8 g of iron undecylenate were mixed to form a homogeneous solution. 3 mg of azobisisobutyronitrile (AIBN) and 100 mg sodium dodecyl sulfate (SDS) were added to 25 ml of water and the former solution introduced into the aqueous phase under sonication with a Sonics VCX500 horn (500 W, 20 kHz, amplitude 50%). The mixture was sonicated for 3 minutes and after a stable emulsion was formed, heated at 70° C. for 12 h. Sodium chloride was added to induce aggregation of the resultant polymer-inorganic hybrid particles, which were collected by centrifugation. The material obtained was heated in a nitrogen atmosphere, first to 320° C., held at this temperature for 1 h, then to 500° C. and held for 2 h to obtain the final metal-oxide/carbon nanocomposite product.

The crystal structures of the particles were characterized using a Scintag Theta-theta PAD-X X-ray Diffractometer (Cu Kα, λ=1.5406 Å) and their morphologies were studied using an FEI Tecnai G2 T12 Spirit Transmission Electron Microscope (120 kV). Raman spectra were taken using a Renishaw In Via Confocal Raman Microscope. Thermogravimetric analysis was performed using a TA Instruments Q5000 IR Thermogravimetric Analyzer. Electrical conductivity measurement was made using a Lucas Signatone SP4 four-point probe station and the pellets were made using a pressure of 7 tons $cm^{-2}$. Gas adsorption analysis for porous materials was performed using a Micromeritics ASAP 2020 Accelerated Surface Area and Porosimetry System.

Electrochemical characterization of the composites as anode materials in rechargeable lithium-ion batteries was performed at room temperature in homemade Swagelok-type cells. The working electrode consists of 80 wt % of the active material, 10 wt % of carbon black (Super-P Li from TIMCAL) as a conductivity aid, and 10 wt % of polymer binder (PVDF, polyvinylidene fluoride, Aldrich). Lithium foil was used as the counter and reference electrodes. A 1 M solution of $LiPF_6$ in a 50:50, w/w mixture of ethylene carbonate and diethyl carbonate was used as the electrolyte. Celgard 2500 polypropylene membranes are used as the separator. Assembly of cell was performed in a glove box with moisture and oxygen concentrations below 1 ppm. The room-temperature electrode capacities were measured using Neware CT-3008 battery testers.

Figure 2:
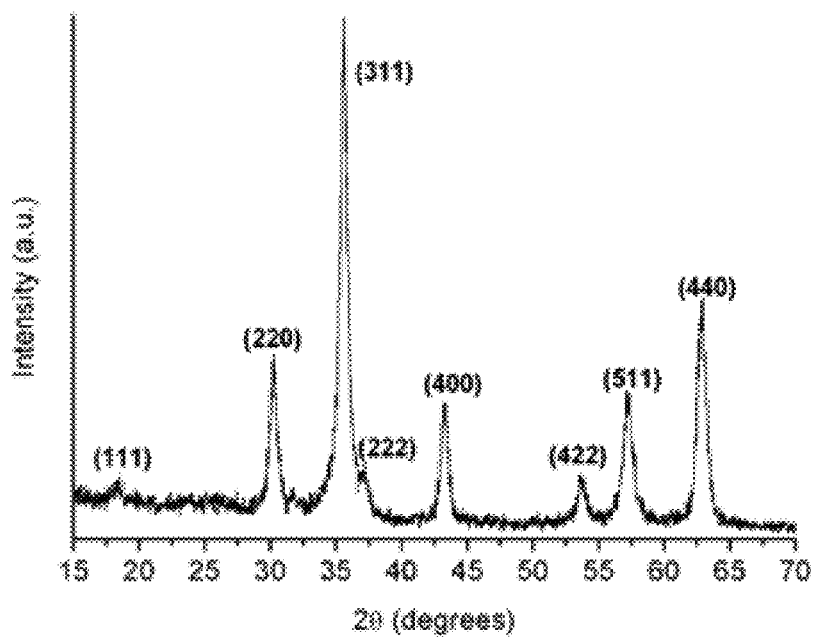
FIG. 2. Representative XRD pattern for the $Fe_3O_4$—C composite created by pyrolysing the as-prepared PAN-Fe (undec)$_3$ complex.

Powder X-ray diffraction was performed to determine the crystalline phase of the transition metal oxide. The XRD results, shown in FIG. 2(a), match well with those of magnetite (JCPDS card no. 19-629). The broad signal in the range of 20-30° may be due to the presence of non-crystalline carbon in the composite, because the most intense reflection for graphitic carbon (002 layer) should appear at 26.8°. From the Scherrer's formula, the average crystallite size of the $Fe_3O_4$ phase is found to be 21 nm.

Figure 3:
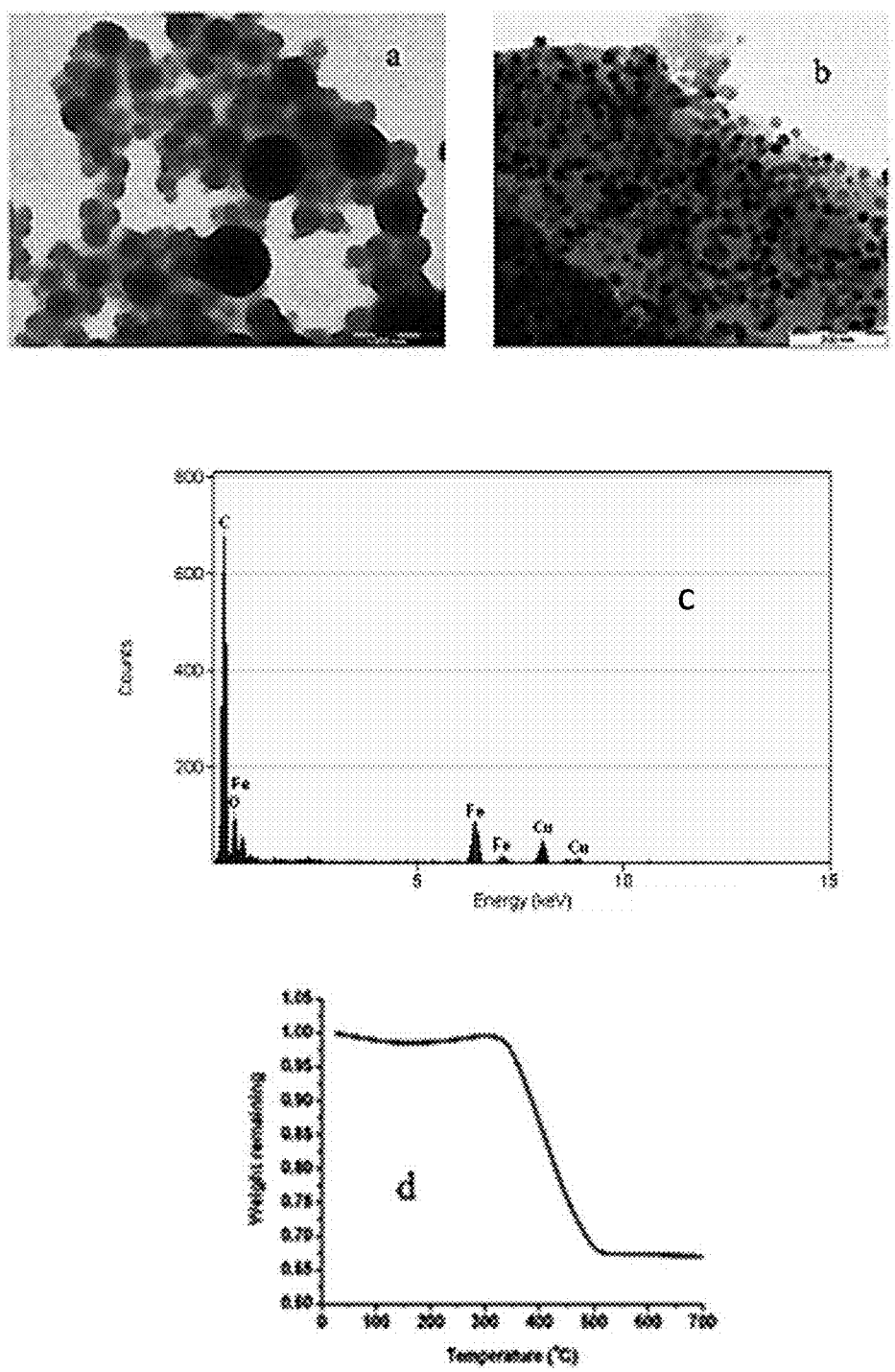
FIG. 3. Examples of (a) Morphology of polymer-iron complex; (b) morphology of $Fe_3O_4$—C composite; (c) EDS spectrum for the polymer-iron complex; and (d) TGA data for the $Fe_3O_4$—C composite.

Transmission Electron Micrographs (TEM) for the polymer-particle complex are shown in FIG. 3(a). The material generally consists of particles with sizes in the range 200-400 nm aggregated together. Energy Dispersive X-Ray Spectroscopy (EDX) was performed on the complex, as shown in FIG. 3(c), which confirms that iron has been successfully incorporated in the complex. The morphology of the material after calcination is shown in FIG. 3(b). It consists of uniformly sized $Fe_3O_4$ nanoparticles embedded in a carbon matrix and the size is consistent with the average crystallite size calculated from the X-Ray diffractograms (21 nm). Oxidative thermal gravimetric analysis (TGA) may be used to measure the weight fraction of active material $Fe_3O_4$ in the composite and the data are shown in FIG. 3(d). The material is heated to 700° C. under air so that $Fe_3O_4$ is oxidized to $Fe_2O_3$ and carbon is oxidized to $CO_2$. From the remaining weight (of $Fe_2O_3$), the original weight fraction of $Fe_3O_4$ is calculated to be 66%.

Other carboxylic acid salts of iron have been used as the precursor, for example iron oleate, but the amount of $Fe_3O_4$ eventually encapsulated in the product can be substantially lower (e.g., 33%) than for iron undecylenate. The higher molecular weight of oleic acid compared to undecylenic acid and the bulkier molecule of iron oleate results in less efficient incorporation in the polymer complex. In addition, the fractional weight loss of conversion of $Fe(ole)_3$ to $Fe_3O_4$ (91%) is larger than conversion of $Fe(ole)_3$ to $Fe_3O_4$ (87%), because of the larger molecular weight of $Fe(ole)_3$. Iron(III) acetylacetonate ($Fe(acac)_3$), which has a lower molecular weight than $Fe(undec)_3$ was also investigated. In this case, the higher water solubility of the particle precursor does not allow formation of stable micelles required for emulsion polymerization.

Polyacrylonitrile is frequently used to synthesize graphitic materials through calcination at high temperatures. To obtain highly graphitic carbon, PAN should be subjected to three consecutive processes, namely, stabilization, carbonization and graphitization. In the stabilization step, PAN is heated to 200-300° C. in air and converted to a cyclic or a ladder compound, followed by treatment in nitrogen atmosphere to about 1000° C. to achieve carbonization of the material. The third step, known as graphitization, is to heat the material to 1500-3000° C. under argon atmosphere to improve the ordering and orientation of the crystallites. Because the present system contains metal oxides, if the material is heated to temperatures above ~700° C. for the sake of increasing the graphite content in the product, there is the possibility of carbon reducing the metal oxide to pure metal. As a compromise, a carbonization protocol requiring heating the material at 500° C. in dry $N_2$ was used.

Figure 4:
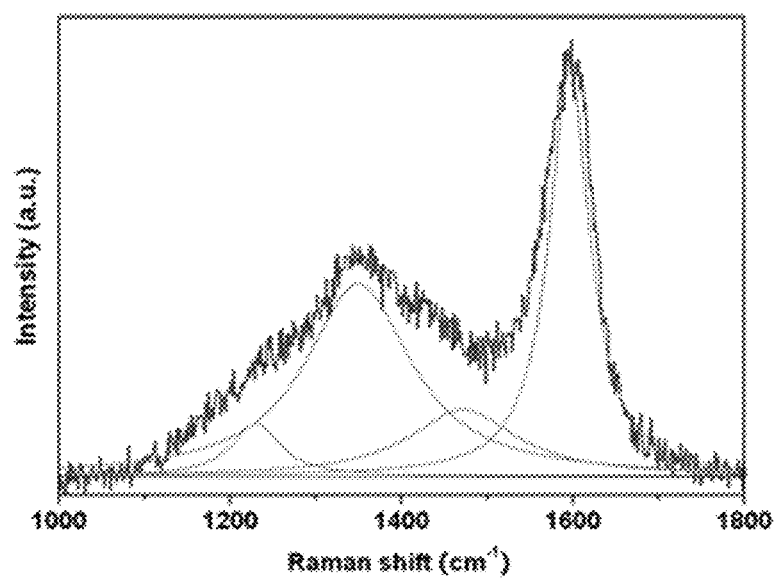
FIG. 4. Representative Raman spectrum for the $Fe_3O_4$—C composite, deconvoluted into peaks for graphitic carbon, disordered graphite lattices and amorphous carbon.

The Raman spectrum of the $Fe_3O_4$—C composite is shown in FIG. 4. It is immediately noticeable that the spectrum contains two prominent peaks at around 1350 and 1590 wavenumbers. Raman spectra for carbon materials usually contain several peaks. In particular, the spectrum can be deconvoluted to five bands, corresponding to ideal graphite (G 1580 $cm^{-1}$), a disordered graphitic lattice (D1 1350 $cm^{-1}$, D2 1620 $cm^{-1}$ and D4 1200 $cm^{-1}$), or amorphous carbon (D3 1500 $cm^{-1}$). G and D2 both come from $sp^2$ carbon vibrations, which can be difficult to distinguish, and in some works have been treated as one single component in the fitting procedure. Lorentzian functions were used in the fitting and the calculated positions for the peaks are: G 1596 $cm^{-1}$, D1 1349 $cm^{-1}$, D3 1471 $cm^{-1}$, and D4 1230 $cm^{-1}$. This analysis indicates the carbon obtained in the composite is partially graphitic.

Magnetite has the formula $Fe^{2+}[Fe^{3+}_2]O_4$ and adopts an inverse spinel structure. In each unit cell (containing 8 multiples of $Fe_3O_4$), 8 out of 16 $Fe^{3+}$ ions occupy 8 out of the 64 tetrahedral sites and all the $Fe^{2+}$ ions and the remaining 8 $Fe^{3+}$ ions are distributed in 16 out of 32 octahedral sites. Lithiation of $Fe_3O_4$ follows the following pathway:

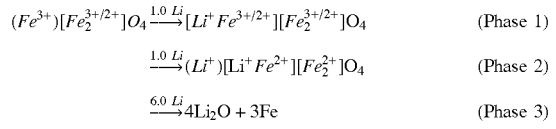

$$(Fe^{3+})[Fe_2^{3+/2+}]O_4 \xrightarrow{1.0\ Li} [Li^+Fe^{3+/2+}][Fe_2^{3+/2+}]O_4 \quad \text{(Phase 1)}$$

$$\xrightarrow{1.0\ Li} (Li^+)[Li^+Fe^{2+}][Fe_2^{2+}]O_4 \quad \text{(Phase 2)}$$

$$\xrightarrow{6.0\ Li} 4Li_2O + 3Fe \quad \text{(Phase 3)}$$

Here parentheses denote ions in tetrahedral sites and square brackets denote ions in octahedral sites. During the insertion of up to 1.0 Li, the $Li^+$ ions fill up octahedral vacancies, with $Fe^{3+}$ in the tetrahedral sites displaced to octahedral sites, leading to the formation of a rock-salt-like structure of $Li_{1.0}Fe_3O_4$ at the end of this step. Further insertion of lithium involves the filling of the tetrahedral sites by $Li^+$ ions. Metallic iron is extruded from the rock-salt structure to accommodate the incoming $Li^+$ ions.

Figure 5:
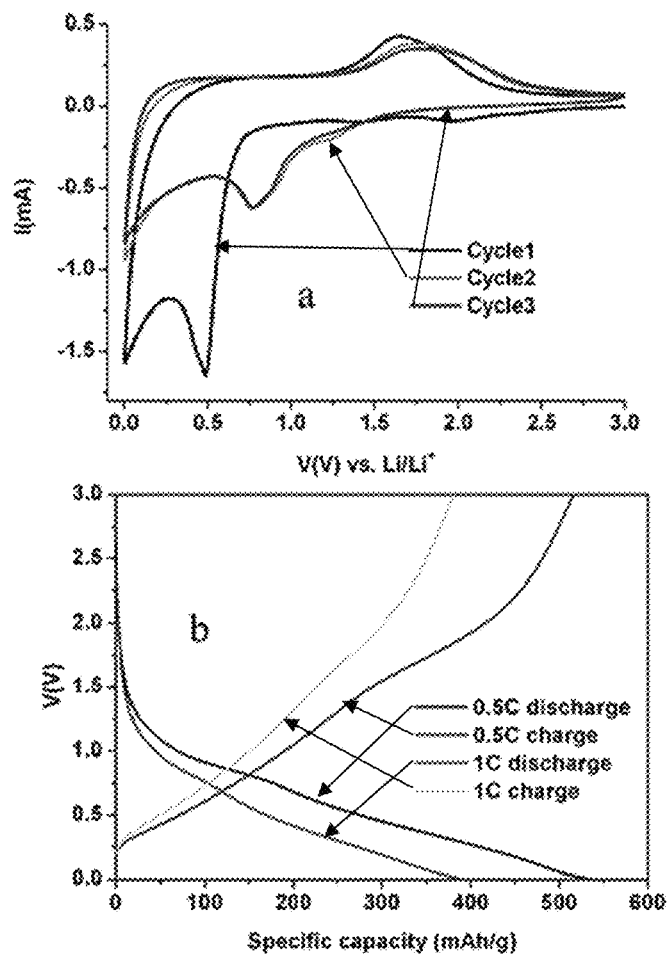
FIG. 5. Representative cyclic voltammograms and voltage-capacity profiles for $Fe_3O_4$—C nanocomposites.

Cyclic voltammograms for $Fe_3O_4$—C composites are shown in FIG. 5(a) (scan rate=0.2 mV $s^{-1}$). The patterns are consistent with the CV results from other reports on $Fe_3O_4$—C composites. In the anodic process, starting from the second cycle, the lithium intercalation occurs mainly at around 0.7 V and in the cathodic process the oxidation of $Fe^0$ occurs at around 1.8 V. In the first cycle, the intercalation occurred at a lower voltage of around 0.4 V, probably because of an overpotential arising from the crystal structure changes from the inverse spinel structure to the rock salt type structure. The voltage-capacity profiles for the complex cycled at different charging rates (1 C or 0.5 C) are shown in FIG. 5(b). The lithium intercalation plateaus are not as flat for the $Fe_3O_4$ in carbon composites compared to the pure oxide, probably because of reduction in crystallinity and/or change in surface site energetics during the process of the carbon formation for the composite.

Figure 6:
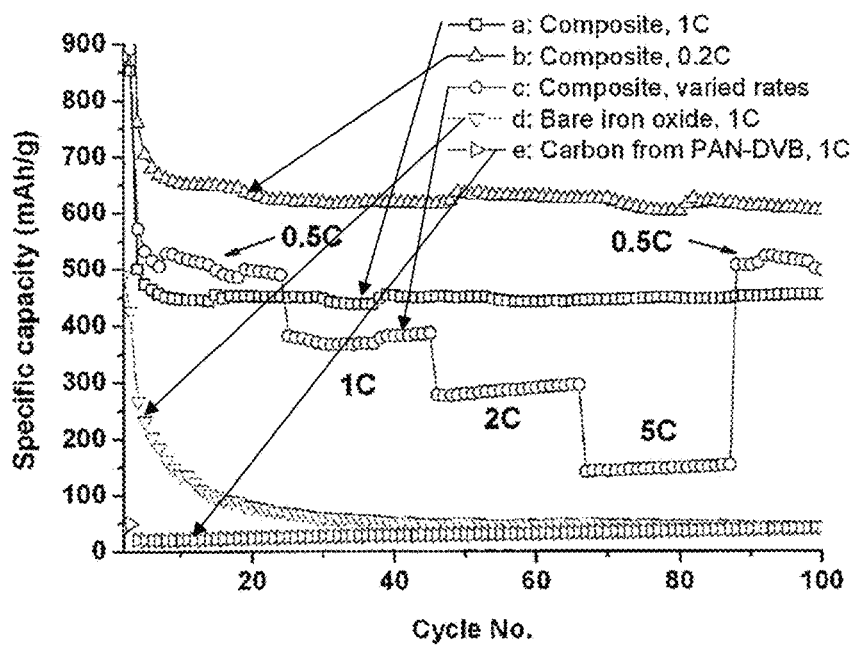
FIG. 6. Representative cycling performance for (a) $Fe_3O_4$—C composites run at 1 C (924 mA h $g^{-1}$); (b) composite run at 0.2 C; (c) composite run at charging rates; (d) bare $Fe_3O_4$ nanoparticles run at 1 C; and (e) bare carbon made from pyrolysis of PAN-DVB run at 1 C.

Cycling performance data for the $Fe_3O_4$—C composites are shown in FIG. 6. The material was cycled at 1 C and 0.2 C, respectively for 100 cycles and the performance under different charging rates ranging from 0.5° C. to 5° C. was also studied. The capacities are calculated based on the metal oxide mass because the capacity-voltage profiles do not indicate significant contribution from lithium intercalation into the carbon host. It is apparent from FIG. 6 that the composites show very stable performance and little fading for 100 cycles, even at 1 C charging rate. The performance is also stable for higher charging rates (20 cycles are shown as examples). The performance of bare $Fe_3O_4$ nanoparticles (50 nm in size, commercially available from Alfa Aesar) as the anode material is also shown in FIG. 6(d) for comparison purposes; the clear improvements provided by the composite materials are visible from this plot. The performance of pure carbon made from pyrolysis of PAN-DVB at 500° C. is also shown. It is seen that this material does not make any significant contribution to the lithium storage capacity.

Figure 7:
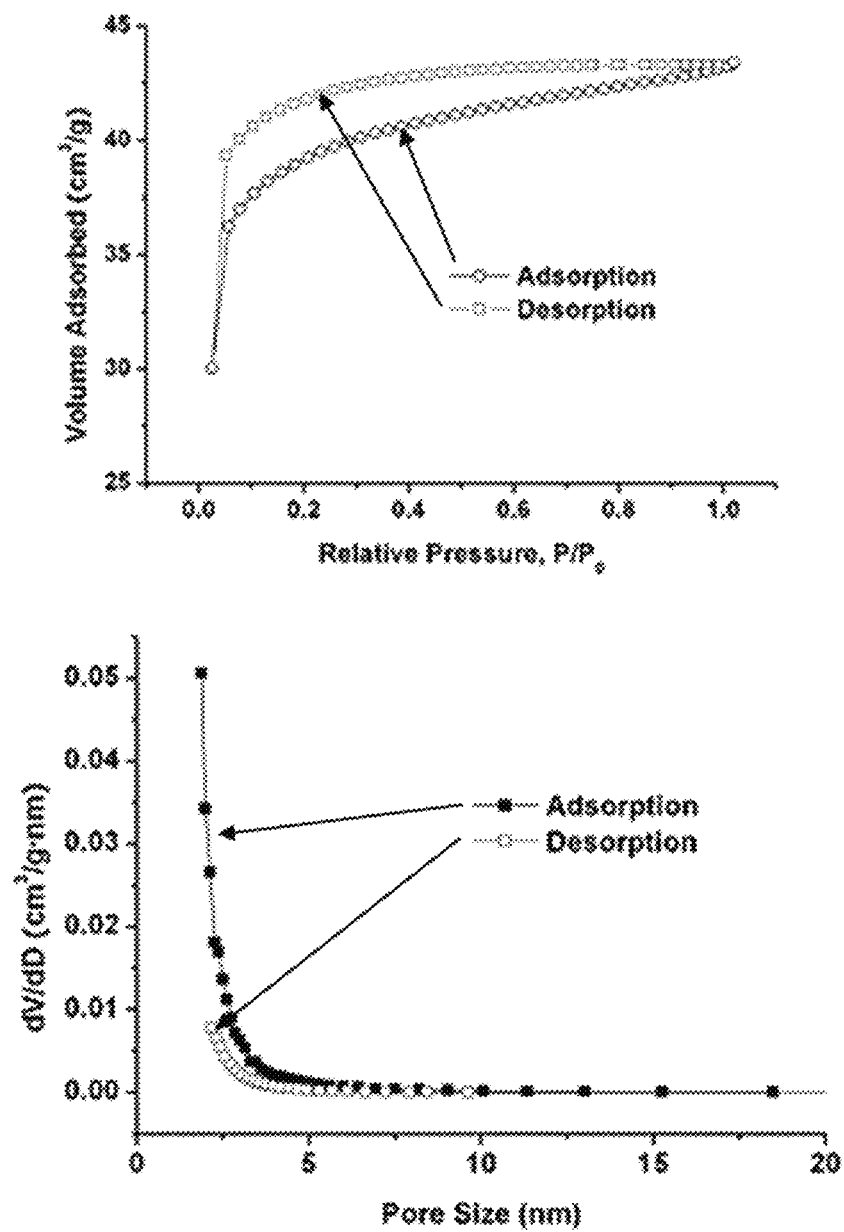
FIG. 7. Representative nitrogen adsorption isotherms and pore size distribution for the $Fe_3O_4$—C composite.

The stable electrochemical performance of the $Fe_3O_4$—C nanocomposites can be attributed to different features of the materials. Considering the relatively low electronic conductivity of the carbon component, it is not a consequence of enhanced electronic transport afforded by the carbon. The uniformly sized $Fe_3O_4$ nanoparticles are embedded in the carbon matrix, which might serve to alleviate the volume change incurred during the repeated cycling. A porous, mechanically flexible reinforcement that allows good penetration by the electrolyte into the active material is therefore considered advantageous. Nitrogen adsorption analysis was performed on the composite and the surface area measured by the BET method is 122 $m^2\ g^{-1}$, with the isotherms and the pore size distribution for the composite (calculated using BJH method) shown in FIG. 7. The BET surface area of pure carbon obtained from pyrolysis of the PAN-DVB polymer (without $Fe_3O_4$ nanoparticles) is about three times higher, 369 $m^2\ g^{-1}$. The pore size distribution results show that most of the pores are less than 10 nm in size.

The size of the $Fe_3O_4$ nanoparticles also seems to be an important factor in determining the electrochemical performance. Average diameters of $Fe_3O_4$ particles synthesized using hydrothermal/solvothermal methods are usually greater than 150 nm because the particles are typically aggregates of smaller primary crystallites. In the current method, the size of the $Fe_3O_4$ nanoparticles is relatively small and the greater surface area and shorter diffusion length may allow easier access of the active material by the lithium ions.

Figure 8:
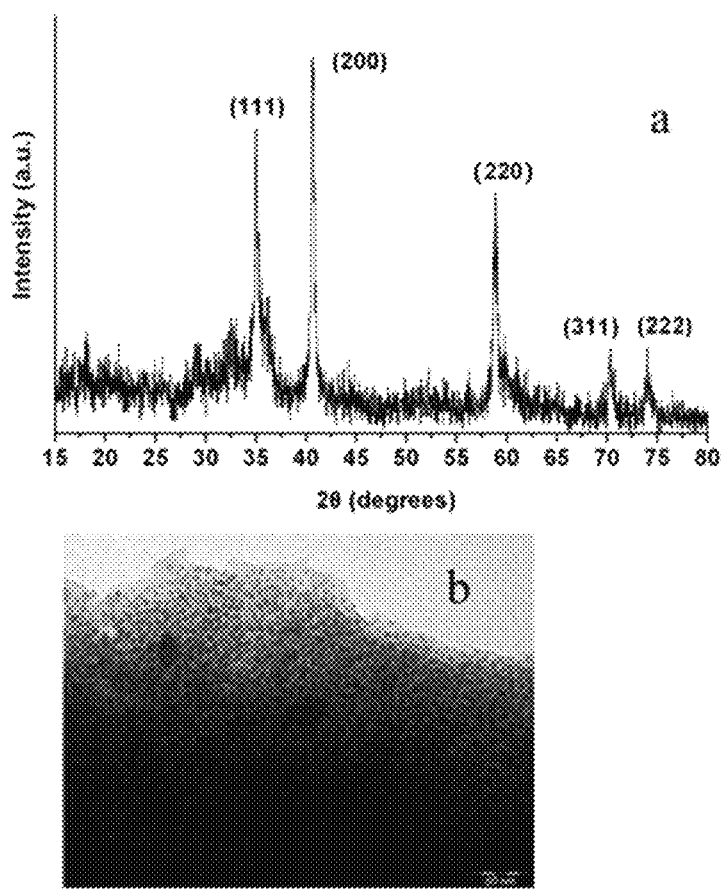
FIG. 8. Representative (a) X-Ray diffractogram and (b) TEM image for MnO—C composite.

The method developed for creating $Fe_3O_4$—C composites can be applied to synthesize nanocomposites of various other metal oxides (or other related materials such as pure metal) embedded in carbon matrices. Another interesting material is MnO, which has a theoretical lithium storage capacity of 755 mA h g$^{-1}$. MnO undergoes conversion reaction in lithium-ion batteries: $2Li+MnO \rightarrow Mn+Li_2O$ and upon lithium insertion, Mn grains <5 nm in size are formed. MnO—C composites can be synthesized using manganese (II) undecylenate as the precursor. FIG. 8(a) shows the X-ray diffractogram for the MnO—C composite, which matches well with MnO (JCPDS card no. 07-230). Again a broad band is observed in the range of 20-30°, but no sharp peak could be found at 26.8°, indicating that the carbon component is largely amorphous. TGA is used to determine the fraction of MnO in the composite. Upon heating to 700° C. in air, MnO is oxidized to $Mn_2O_3$ and the weight fraction of MnO in the composite is calculated to be 58% assuming all the remaining material is carbon. The morphology of the MnO—C composite is shown in FIG. 8(b) and similar to the case of $Fe_3O_4$, MnO nanoparticles embedded in a carbon matrix are obtained.

Figure 9:
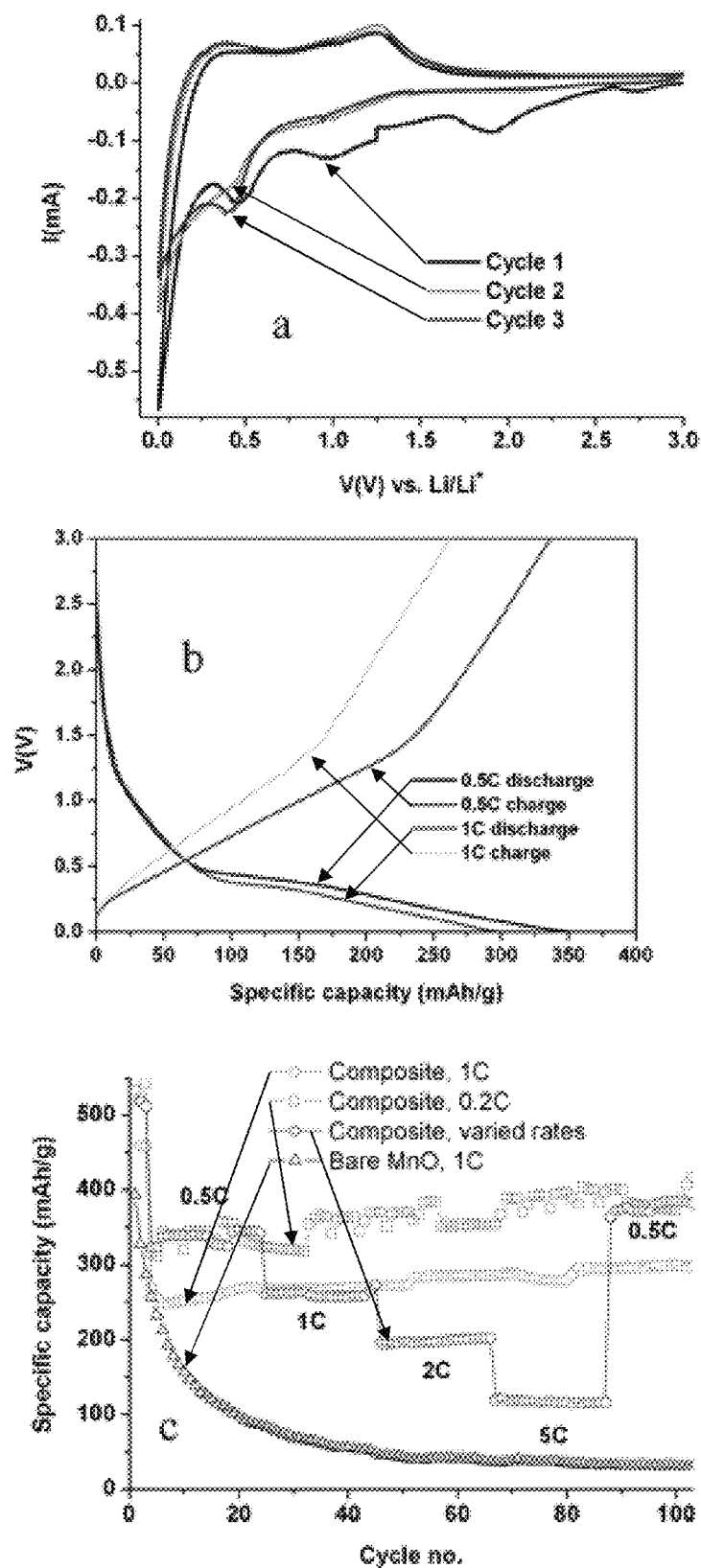
FIG. 9. Representative (a) cyclic voltammograms, (b) voltage-capacity profiles of MnO—C composite and (c) cycling performance of MnO—C composite at 1 C (755 mA h $g^{-1}$), 0.2 C and at varied charging rates, and cycling performance of pure MnO.
Figure 10:
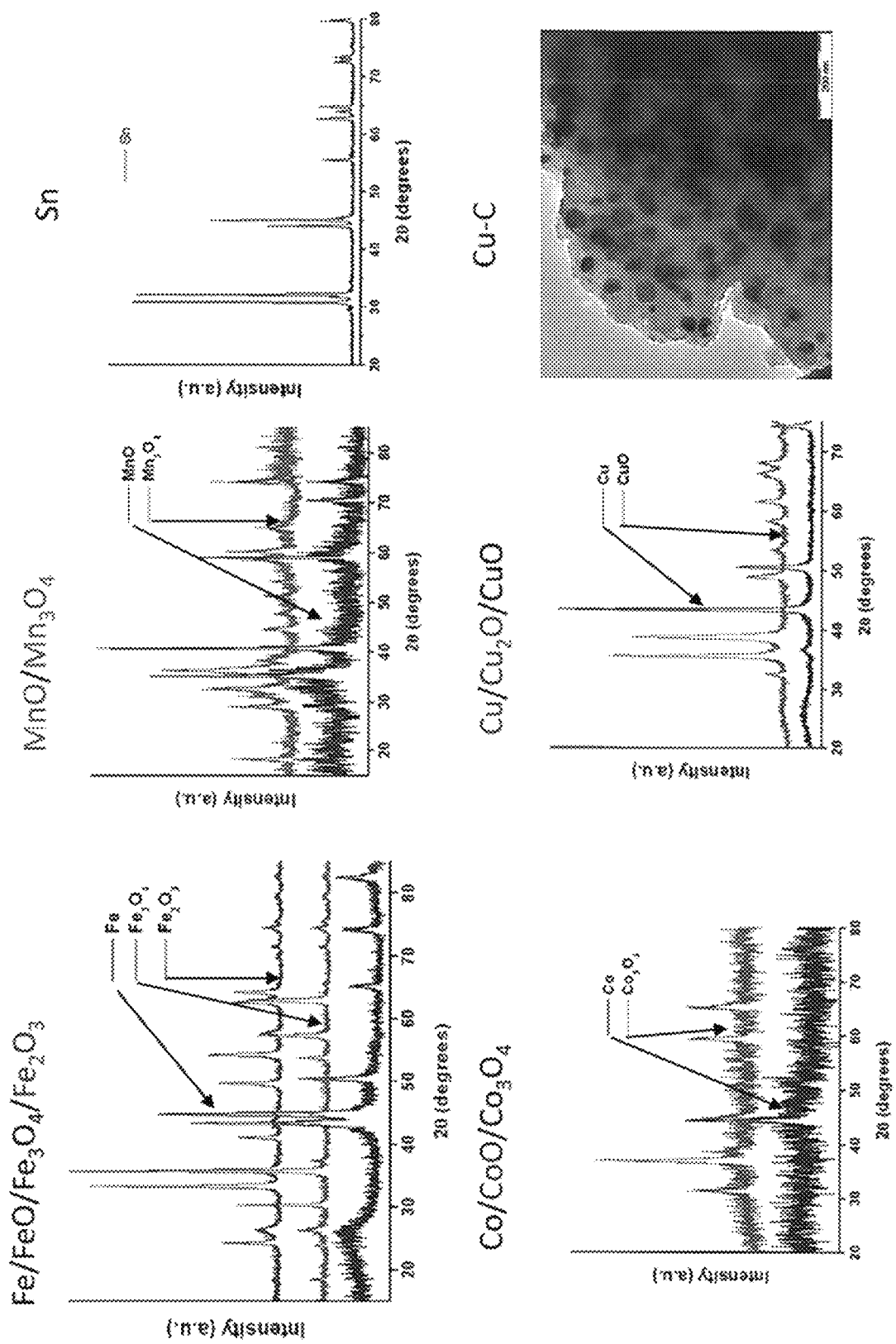
FIG. 10. Representative XRD patterns of nanocomposites embedding the nanoparticles of the following phases: Fe, $Fe_3O_4$, $Fe_2O_3$, MnO, $Mn_3O_4$, Sn, Co, $Co_3O_4$, Cu, CuO; an example of a TEM image of Cu@C composite.
Figure 11:
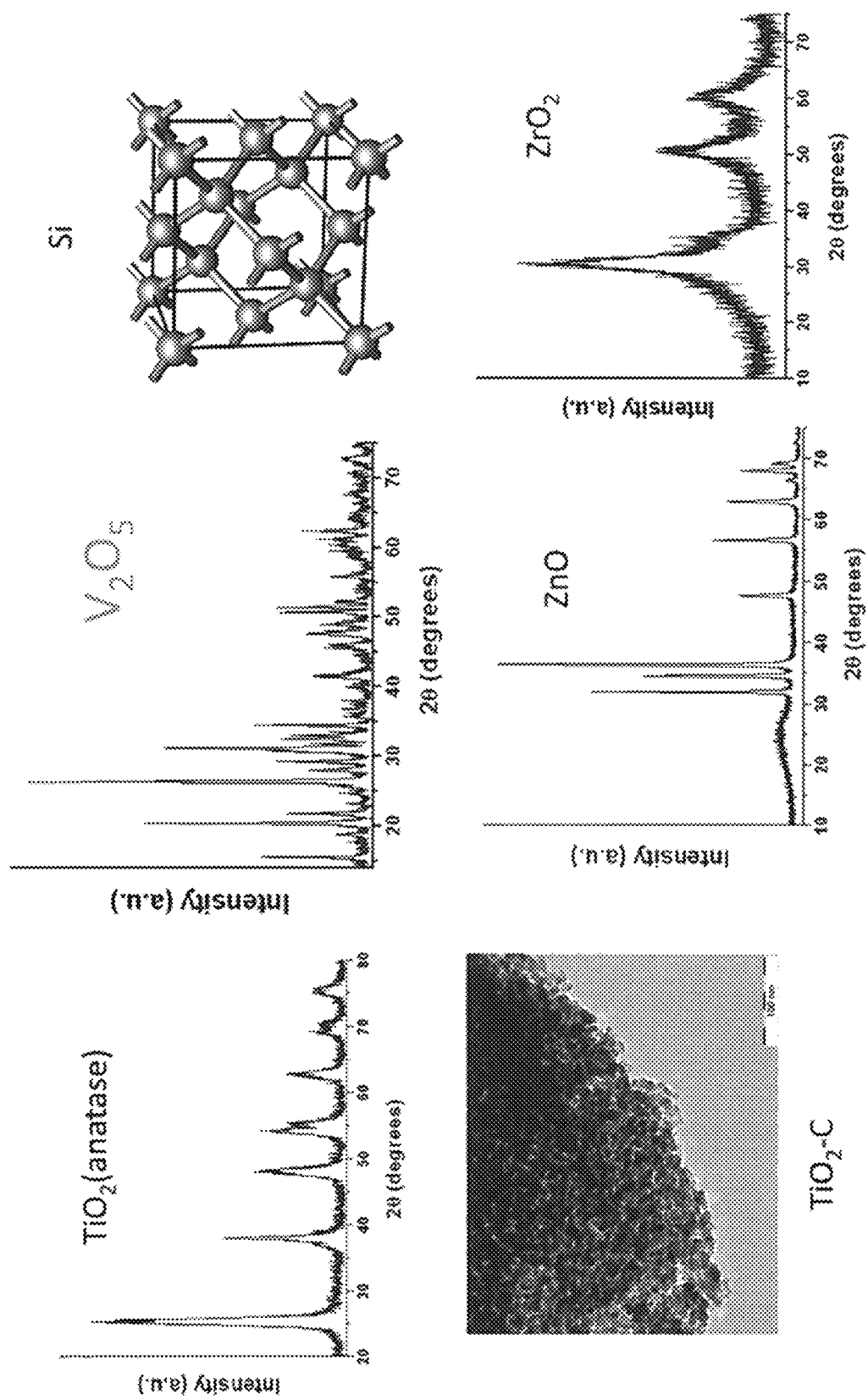
FIG. 11. Representative XRD patterns of nanocomposites embedding the nanoparticles of the following phases: $TiO_2$ (anatase), $V_2O_5$, ZnO, $ZrO_2$; an example of a TEM image of $TiO_2$@C composite.
Figure 12:
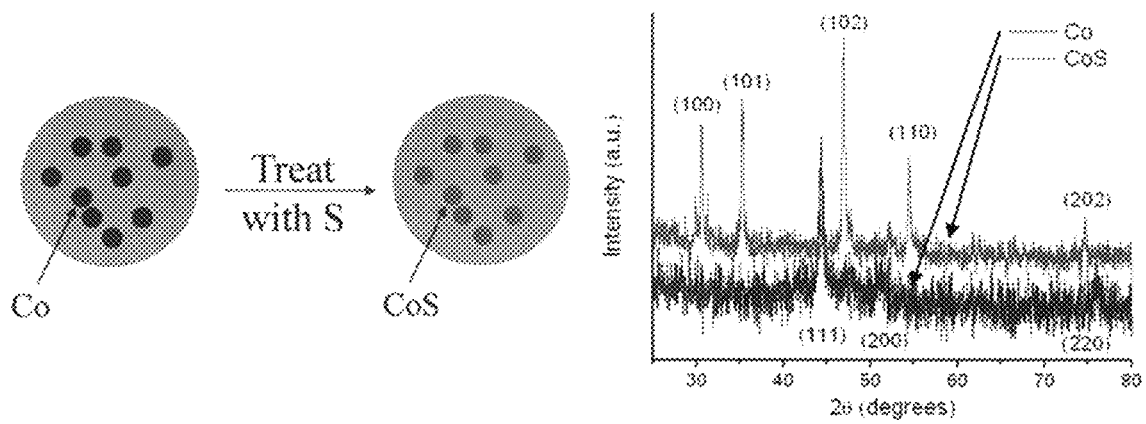
FIG. 12. Scheme for synthesizing Co@C and CoS@C nanocomposites; representative XRD patterns of Co@C and CoS@C nanocomposites.
Figure 13:
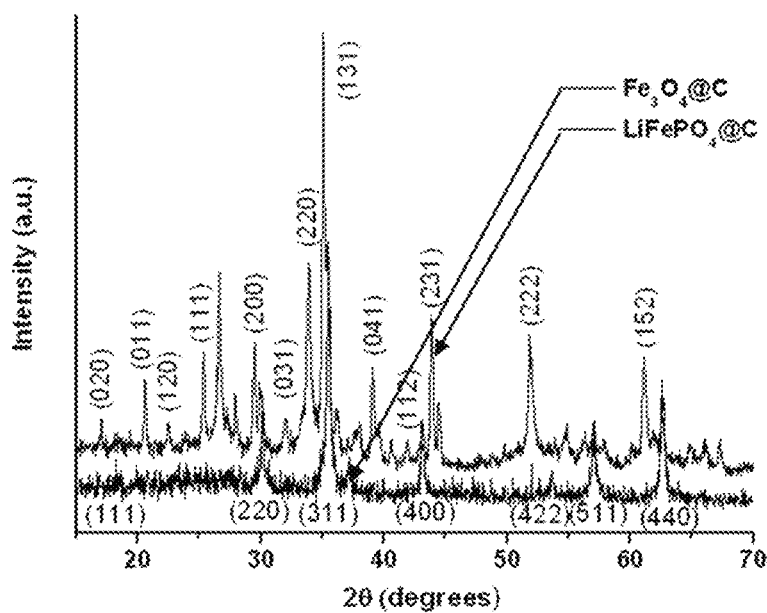
FIG. 13. Representative XRD pattern for $Fe_3O_4$@C and $LiFePO_4$@C nanocomposites.
Figure 14:
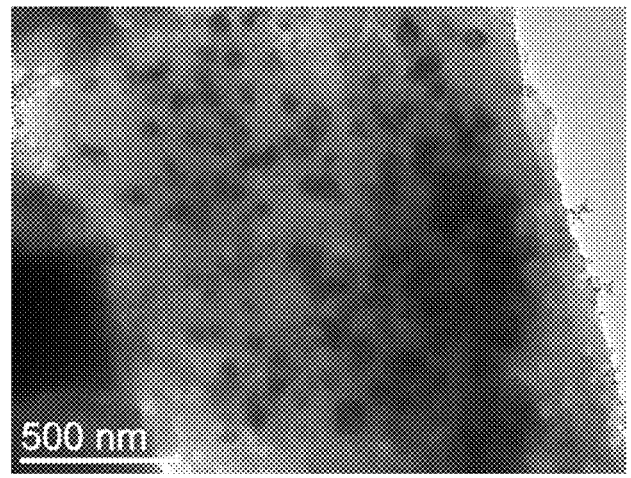
FIG. 14. Representative TEM image for $LiFePO_4$@C nanocomposites.
Figure 15:
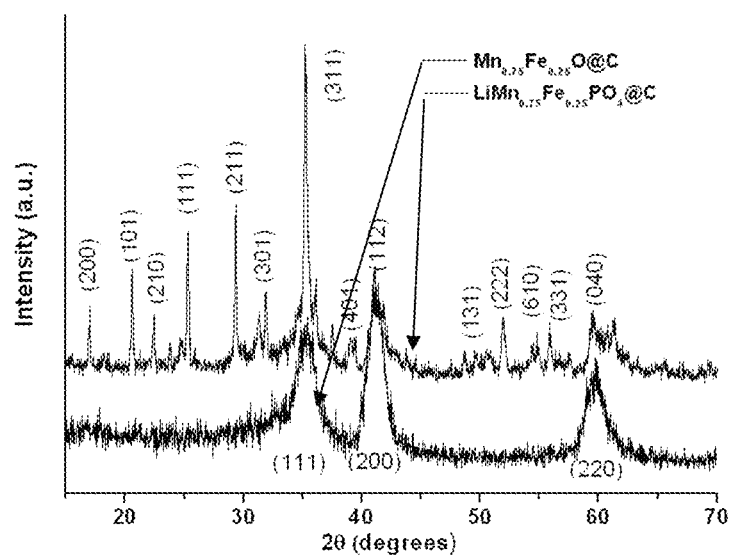
FIG. 15. Representative XRD pattern for $Mn_{0.75}Fe_{0.25}O$@C and $LiMn_{0.75}Fe_{0.25}PO_4$@C nanocomposites.
Figure 16:
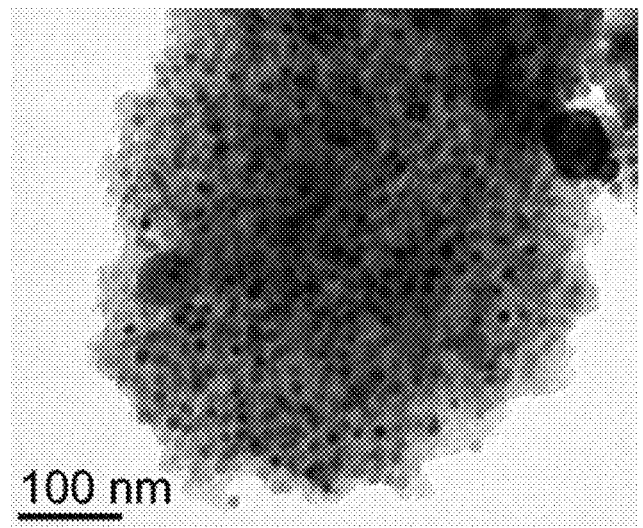
FIG. 16. Representative TEM image for $Mn_{0.75}Fe_{0.25}O$@C nanocomposite.
Figure 17:
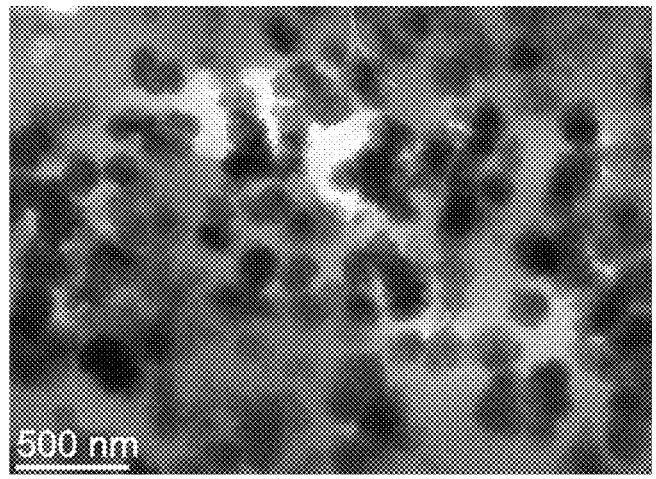
FIG. 17. Representative TEM image for $LiMn_{0.75}Fe_{0.25}PO_4$@C nanocomposite.

A typical cyclic voltammogram for the MnO—C composite is shown in FIG. 9(a) and lithium insertion/$Mn^{2+}$ reduction seems to occur at around 0.5 V against Li/Li$^+$, which is consistent with MnO anode materials. Voltage-capacity curves at 0.5 C and 1 C charging rates are shown in FIG. 9(b) and cycling data for the composite run at 1 C and 0.2 C, and at varied charging rates are shown in FIG. 9(c). Similar to what was observed for the $Fe_3O_4$—C composite, little capacity fade is observed even when the material is subject to 1 C charging rate for over >100 cycles. Cycling at higher charging rates is also seen to give stable performance. Therefore a prominent feature of the current protocol is the ability to yield materials with stable performance at moderately high charging rates.

In conclusion, a one-step free-radical polymerization method is used to synthesize cross-linked metal-oxide/poly (acrylonitrile) nanocomposites. Pyrolysis of the composite at moderate temperatures in an inert atmosphere yields metal-oxide/carbon particles comprised of uniformly distributed metal oxide nanoparticles in a partially graphitic, but poorly conducting carbon host. The versatility of the approach has been demonstrated using two different metal oxides, $Fe_3O_4$ and MnO. When evaluated as anode materials in lithium-ion batteries, composites of both materials display stable performance at low and high current densities.

Example 2

This example describes the synthesis and characterization of examples of hybrid materials and nanocomposite materials of the present invention.

Synthesis of LiFePO$_4$@C nanocomposite. 108 mg LiOH, 221 mg $H_3PO_4$ and 660 mg L-ascorbic acid are dissolved in 10 ml DI water, to which 116 mg $Fe_3O_4$@C nanocomposite powder is added. The solution is loaded into a pressurized container and heated at 270° C. for 12 hr. The powder obtained is centrifuged and washed with water.

Synthesis of $Mn_{0.75}Fe_{0.25}O$@C nanocomposite. Manganese (II) undecylenate is synthesized using the same method as iron (III) undecylenate, with $MnCl_2$ as the Mn precursor. 1.58 g manganese (II) undecylenate and 0.75 g iron (III) undecylenate are mixed to form a homogeneous mixture, and polymerization with acrylonitrile and divinylbenzene is performed using the same method as used for iron (III) undecylenate alone. The polymerization product is collected ant heat treated in the same way to obtain $Mn_{0.75}Fe_{0.25}O$@C nanocomposite.

Synthesis of $LiMn_{0.75}Fe_{0.25}PO_4$@C nanocomposite. 90 mg LiOH, 162 mg $H_3PO_4$ and 49 mg $H_3PO_3$ are dissolved in 10 ml DI water, to which 142 mg $Mn_{0.75}Fe_{0.25}O$@C nanocomposite powder is added. The solution is loaded into a pressurized container and heated at 270° C. for 12 hr. The powder obtained is centrifuged and washed with water.

Example 3

The synthesis, structural characterization and electrochemical performance of $MoS_2$-carbon nanostructures is described in this example.

Composites of $MoS_2$ and amorphous carbon were grown and self-assembled into hierarchical nanostructures via a hydrothermal method. Application of the composites as high-energy electrodes for rechargeable lithium-ion batteries was investigated. The critical roles of nanostructuring of $MoS_2$ and carbon composition on lithium-ion battery performance are described. Pure $MoS_2$ and 22 wt % carbon containing $MoS_2$ materials are designated as MS-0 and MS-22 respectively.

Figure 18:
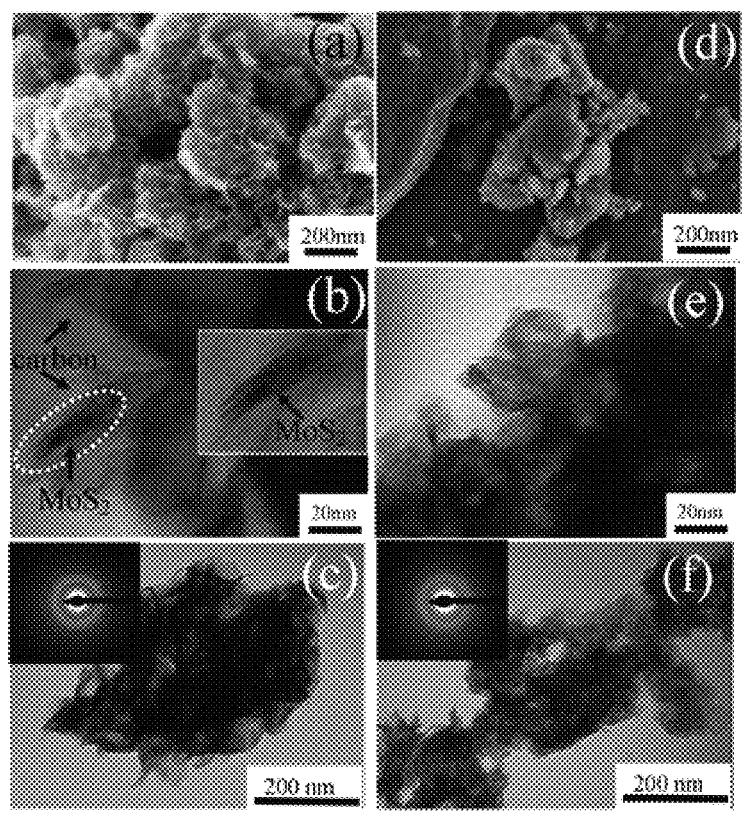
FIG. 18. Representative scanning electron micrographs of (a) MS-22, (d) MS-0; transmission electron micrographs of (b and c) MS-22, (e and f) MS-0; insets of (b) shows $MoS_2$ nanosheet; SAED patterns of MS-22 and MS-0 in the insets of (c) and (f) respectively.
Figure 19:
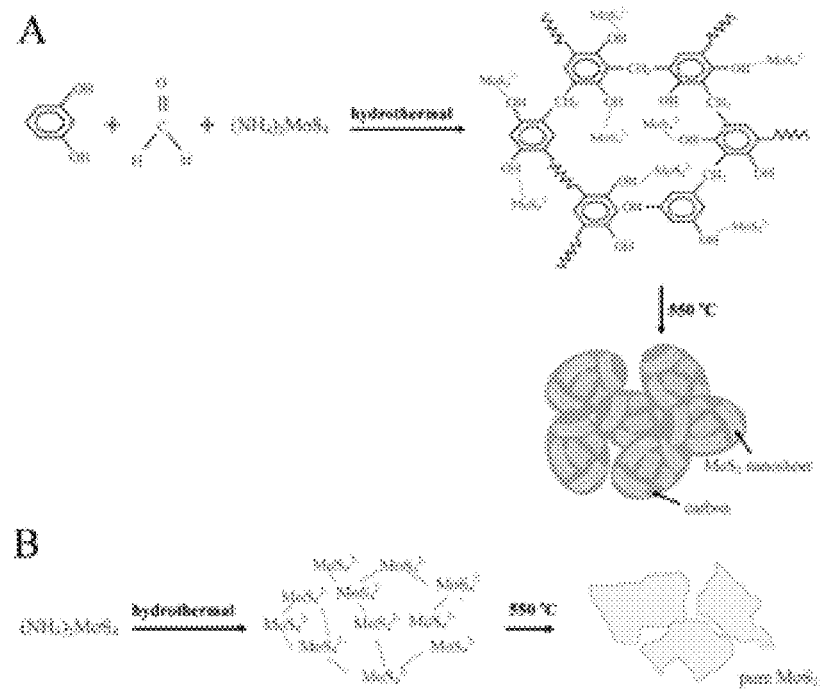
FIG. 19. An example of a schematic of the synthesis of (A) $MoS_2$-carbon nanostructure and (B) pure $MoS_2$.

Morphological investigations using SEM (FIG. 18a) reveal that the product obtained via the hydrothermal treatment of the molybdenum sol in presence of carbon precursors (resorcinol and formaldehyde) takes the form of open structure of $MoS_2$ and carbon. The TEM images of MS-22 (22 wt % carbon), as shown in FIGS. 18b and c, indicate that $MoS_2$ in the composites are in the form of stacked nanosheets homogeneously embedded in a very thin matrix of amorphous carbon. The length and thickness of $MoS_2$ nanosheets are about 40 and 10 nm respectively (inset of FIG. 18b). It can be observed that the $MoS_2$ sheets are composed of few $MoS_2$ layers (~6 to 10 layers). A schematic of the in situ synthesis of $MoS_2$-carbon composites is shown in FIG. 19A. In absence of resorcinol and formaldehyde, the $MoS_2$ particles aggregate to form large $MoS_2$ lumps (FIG. 19B) as verified by the SEM and TEM images (FIGS. 18d and f). On the other hand, polycondensation of resorcinol with formaldehyde takes place during the hydrothermal process forming low density carbon gels. The $MoS_2$ particles in the form of layers simultaneously crystallize during the hydrothermal process and are eventually uniformly dispersed in the carbon gel. The successive restacking of $MoS_2$ layers is significantly inhibited by the carbon gel resulting in few layers of $MoS_2$ nanosheet and consequently self-assembled in interconnected flakes resulting in three dimensional $MoS_2$-carbon nanostructures.

Figure 23:
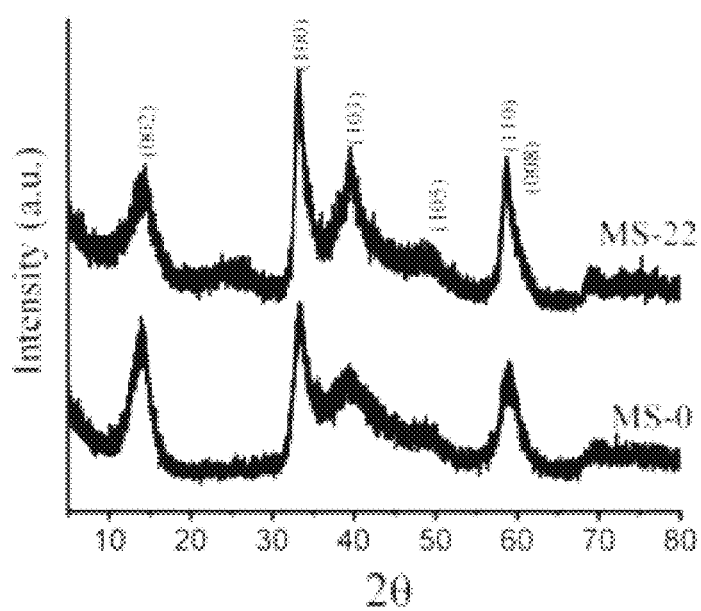
FIG. 23. Representative X-ray diffraction patterns of pure $MoS_2$ and $MoS_2$-carbon (22 wt %) composite.
Figure 24:
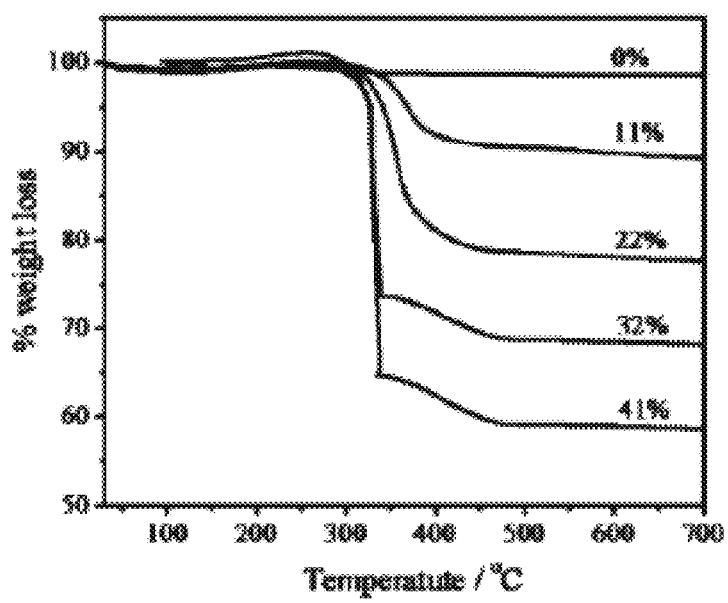
FIG. 24. Representative thermogravimetry analysis of pure $MoS_2$, MS-11, MS-22, MS32 and MS-41.
Figure 25:
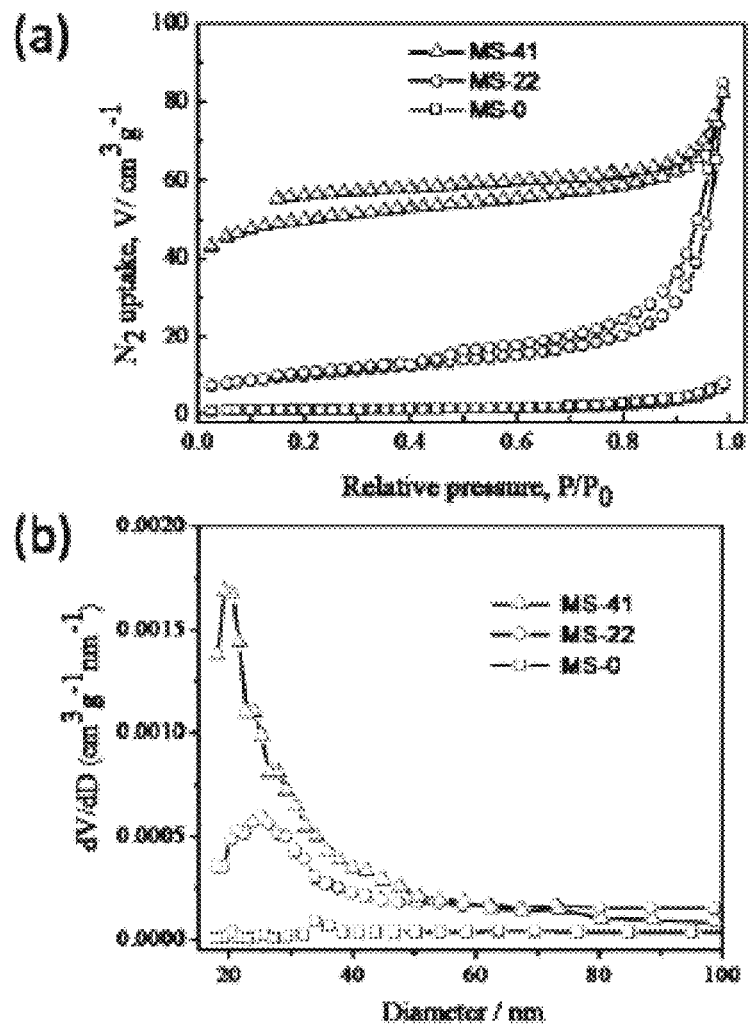
FIG. 25. Representative (a) $N_2$ adsorption/desorption isotherms and (b) pore size distribution of pure $MoS_2$, MS-22 and MS-41.

The X-ray diffraction patterns (XRD) of the MS-0 and MS-22 shows broad diffraction peaks which can be indexed to 2H polytype of $MoS_2$ crystal structure with space group P6$_3$/mmc (194) (ICDD no. 071-809) (see ESI, FIG. 23). In the case of $MoS_2$-carbon composites, no peak shifts are observed suggesting that the $MoS_2$ crystallites are unconstrained by chemical bonding to the carbon framework. Furthermore, no characteristic peak from graphitic carbon was detected in the XRD, indicating the formation of amorphous carbon. It can be observed that the intensity of (002) peak for MS-22 is relatively lower compared to pure $MoS_2$ particles (see ESI, FIG. 23). The peak at (002) is typically observed in bulk analogue. It suggests that the carbon inhibits the growth of (002) planes of $MoS_2$ crystallites, which confines its growth in the plane favoring formation of few-layer nanosheets in the amorphous carbon matrix. The carbon content is estimated using thermogravimetric analysis; the results are depicted in (see ESI, FIG. 24). It is seen that there is successful incorporation of 11, 22, 32 and 41 wt % of carbon in $MoS_2$-carbon nanostructures. The BET surface areas of MS-0, MS-22 and MS-41 are 3, 35 and 157 $m^2$ $g^{-1}$ respectively (see ESI, FIG. 25). The increase in surface area with increasing carbon content is attributed to the porous nature of amorphous carbon.

Figure 20:
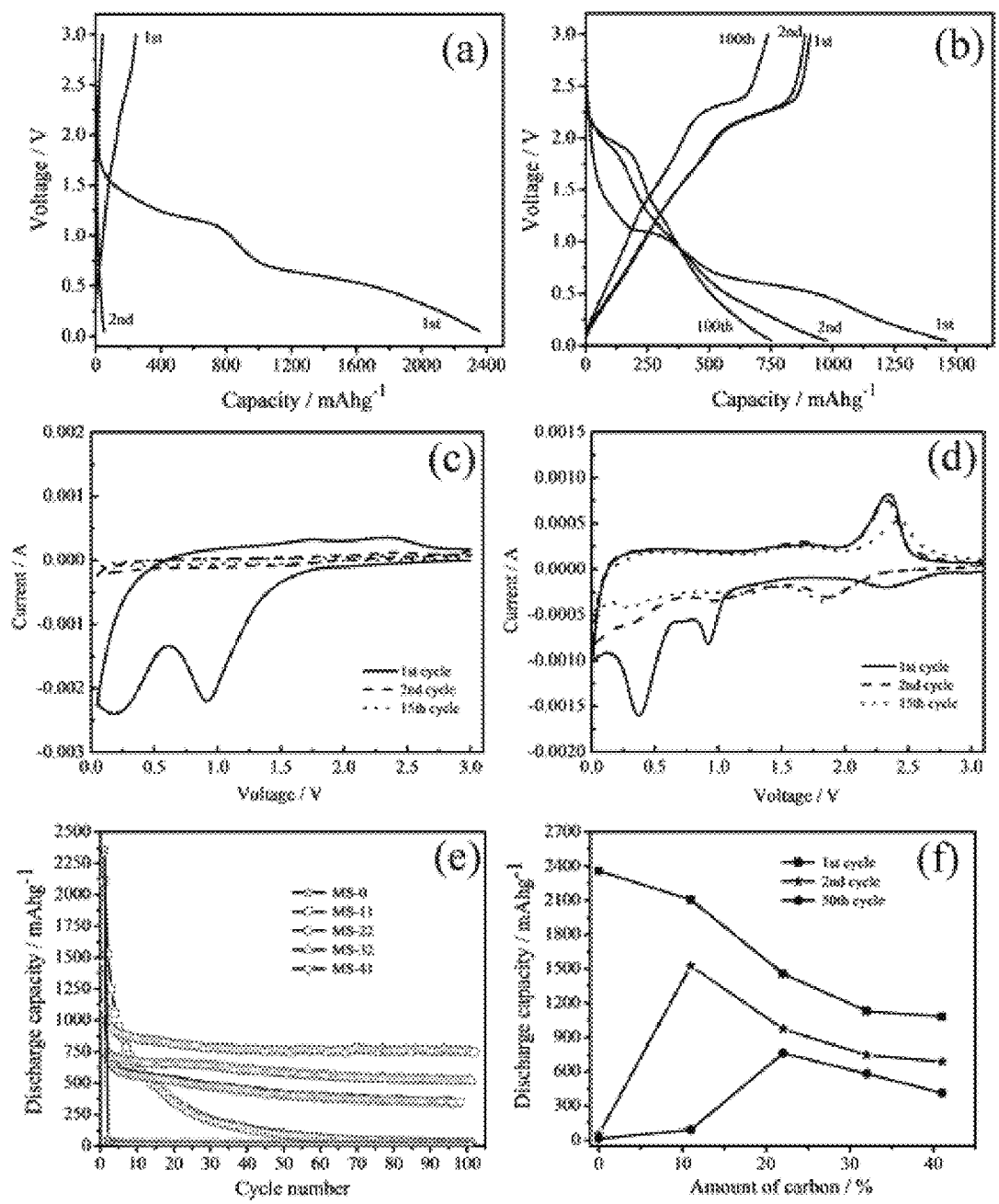
FIG. 20. Representative galvanostatic charge-discharge curves of (a) MS-0 and (b) MS-22 at a current density of 100 mA $g^{-1}$; cyclic voltammetry (CV) curves of (c) MS-0 and (d) MS-22 at a scan rate of 0.2 mV $s^{-1}$; (e) cycling stability of pure $MoS_2$ and various $MoS_2$-carbon composites; (f) variation of discharge capacity as a function of carbon weight fraction.

The electrochemical properties and lithium battery performance of all $MoS_2$-carbon composites using galvanostatic discharge and cyclic voltammetry measurements was investigated. Electrodes were prepared from the $MoS_2$-carbon composites and a PVDf binder, i.e., no carbon black or other conductivity aid was added. FIG. 20 shows the galvanostatic charge (Li removal)/discharge (Li insertion) profiles obtained from pure and carbon-composited $MoS_2$ at room temperature (25° C.) and at a constant current density of 100 mA $g^{-1}$ in the voltage range of 0.05-3 V. In the present study, pure $MoS_2$ particle exhibited a discharge capacity of 2362 mA h $g^{-1}$ in the $1^{st}$ discharge cycle (FIG. 20a). Two potential plateaus at 1.1 V and 0.61 V corresponding to the formation of $Li_xMoS_2$ and conversion of $MoS_2$ to Mo respectively are also readily apparent from FIG. 20. The pure $MoS_2$ shows very poor $1^{st}$ charge and $2^{nd}$ discharge capacities of 247 and 53 mA h $g^{-1}$ respectively without any noticeable potential plateaus.

The $MoS_2$-carbon nanocomposite structures all exhibit significantly improved capacity retention (FIGS. 20b and e). All $MoS_2$-carbon composites manifest the prominent characteristic discharge potential plateaus at 1.1 V and 0.6 V in the $1^{st}$ discharge cycle and charge potential plateau at 2.3 V in all charge cycles (FIG. 20b). During subsequent discharge cycles, the potential plateau observed at 0.6 V disappeared with emergence of two new inconspicuous potential plateaus at ~1.9 V and 1.2 V (FIG. 20b). The first discharge capacities of MS-11, MS-22, MS-32 and MS-41 are 2108, 1462, 1130, and 1078 mA h $g^{-1}$ with coulombic efficiencies of 79%, 62%, 63%, and 61% respectively. Among all the carbon-$MoS_2$ composites, MS-22 exhibits the best battery performance in terms of showing higher capacity and long-term stability. MS-22 shows a discharge capacity of 755 mA h $g^{-1}$ with coulombic efficiencies of 98% after $100^{th}$ cycle at constant current density of 100 mA $g^{-1}$. In contrast, MS-11, MS-32 and MS-41 show capacities of 10, 517 and 354 mA h $g^{-1}$ after $100^{th}$ cycle. Although MS-32 and MS-41 show good long-term capacity retention, the lower capacity possessed by both of them is due to higher amount of inactive carbon in the electrode compositions. It ascertains the importance of optimization of inactive carbon in electrode materials.

Figure 21:
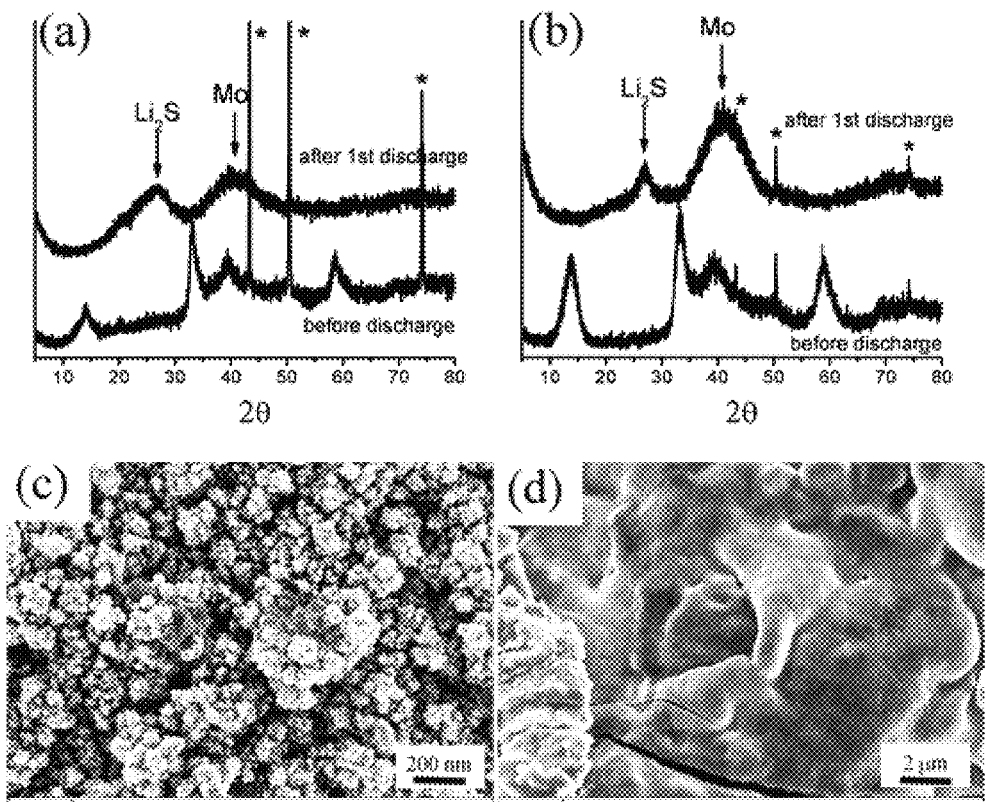
FIG. 21. Representative Ex situ X-ray diffraction patterns of (a) $MoS_2$-carbon (22 wt %) composite and (b) pure $MoS_2$ after $1^{st}$ discharge cycle. Peaks marked by * corresponds to Cu current collector; scanning electron micrographs of $1^{st}$ cycle discharged product of (c) MS-22 and (d) MS-0.

The improved cycling stability of $MoS_2$-carbon composites can be attributed to the inhibition of the side reaction of $Li_2S$ with the electrolyte that forms a thick, gel-like polymeric layer and manifests particle aggregation. The evidence in support of this explanation is provided by cyclic voltammetry (CV) (FIGS. 20c and d), ex situ XRD (FIG. 21) and SEM of the $1^{st}$ cycle discharged product (FIG. 21). The CV plot of MS-22 (FIG. 20d) shows two distinct reduction peaks at 0.93 V and 0.37 V in the $1^{st}$ cycle, which is indicative of the respective formation of $Li_xMoS_2$ and decomposition of $MoS_2$ to Mo and $Li_2S$. In the subsequent oxidation cycles shown until the $15^{th}$ cycle, small but sharp intensity peaks at 1.67 V and 2.34 V can be observed. These peaks are attributed to partial and complete oxidation of Mo to $MoS_2$, respectively. In the subsequent reduction cycles, peaks at 0.93 V and 0.37 V disappear and two new small intensity peaks at 1.83 V and 1.01 V can be observed. The peaks are in agreement with the potential plateaus observed in charge-discharge curves of MS-22 (FIG. 20b). It is also evident from the CV data that even after $15^{th}$ cycle, the $MoS_2$-carbon composite material shows excellent electroactivity, with negligible decrease in peak intensities. On contrary, pure $MoS_2$ shows a distinct reduction peak at 0.93 V and a broad reduction peak in the voltage range of 0.05-0.5 V in the $1^{st}$ reduction cycle. Two minor intensity oxidation peaks at 1.8 V and 2.3 V can also be observed in the $1^{st}$ oxidation cycle followed by little noticeable electrochemical activity after the $1^{st}$ cycle. The ex situ XRD of MS-0 and MS-22 both shows the signature of Mo (ICDD no. 071-3771) and $Li_2S$ (ICDD no. 071-4841) after $1^{st}$ discharge cycle (FIG. 21). However, the peak intensity of $Li_2S$ for MS-0 (FIG. 21b) is significantly lower than MS-22 (FIG. 21a). The breadth of the CV peak at 0.05-0.5 V and decrease in $Li_2S$ XRD peak intensity in case of pure $MoS_2$ particle can be explained in terms of the side reaction of $Li_2S$ with the electrolyte. Further evidence is provided by the ex situ SEM images of the $1^{st}$ cycle discharge products of MS-0 (FIG. 21d) and MS-22 (FIG. 21c). MS-22 maintains its original structure whereas pure $MoS_2$ particles aggregated due to electrolyte degradation with $Li_2S$. As a consequence of electrolyte degradation with the first cycle discharge product $Li_2S$, the pure $MoS_2$ particle show higher capacity (2362 mA h $g^{-1}$) but with extremely poor coulombic efficiency of 10% compared to all carbon-$MoS_2$ composites. In addition, particle agglomeration is also a serious cause for the poor cyclability of pure $MoS_2$.

Figure 26:
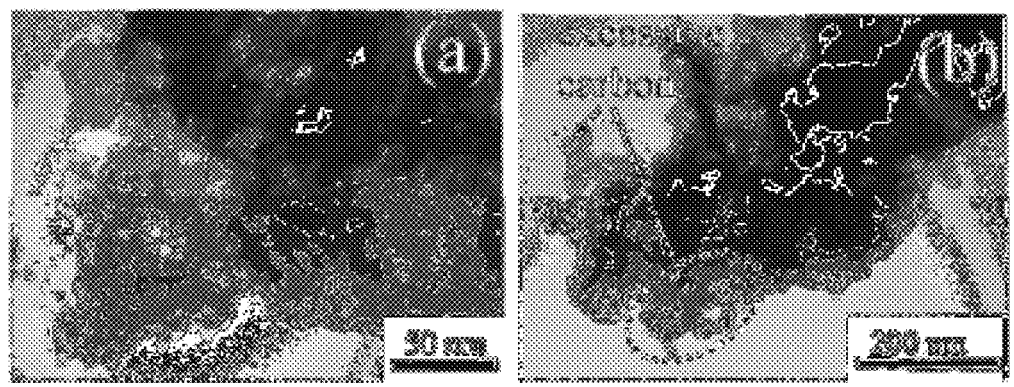
FIG. 26. Representative transmission electron micrographs of (a) MS-11 and (b) MS-32.
Figure 27:
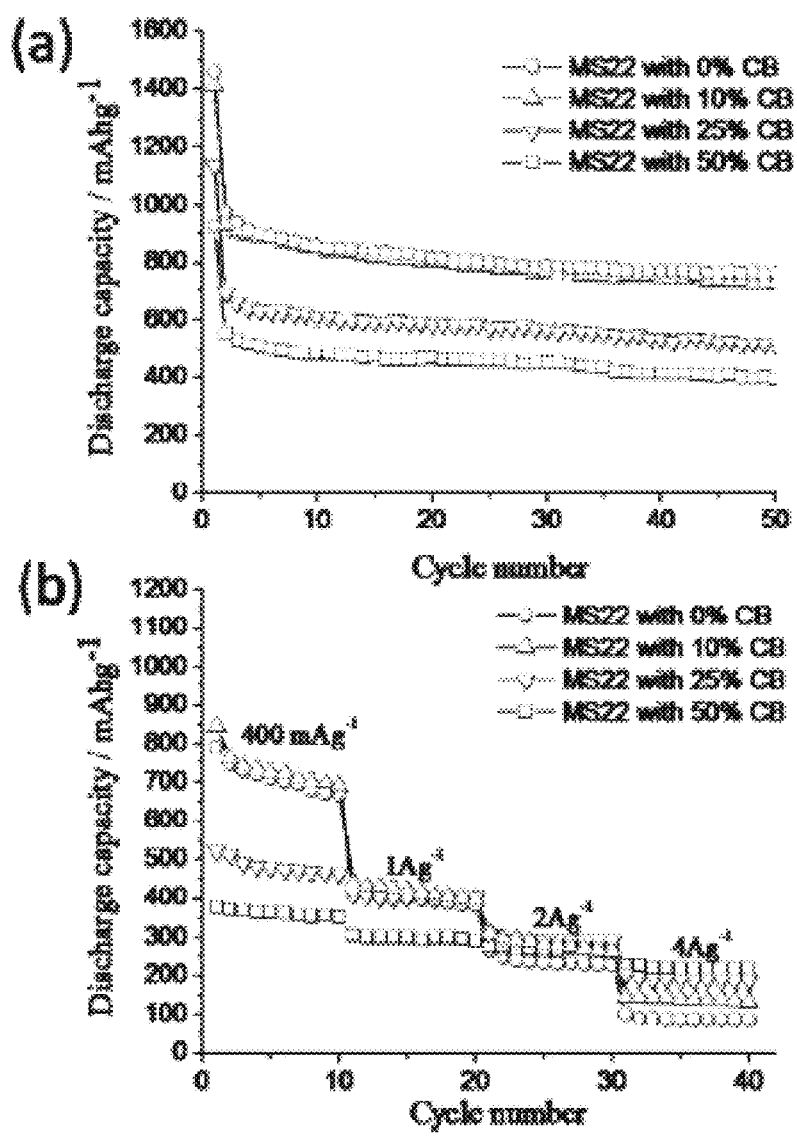
FIG. 27. (a) Representative cycling stability of pure MS-22 with 0%, 10%, 25% and 50% carbon black in the electrode at a current rate of (a) 100 mA$g^{-1}$; (b) at various current rates in the range of 0.4-4 A$g^{-1}$.

Another important result, as shown in FIG. 20f, is that lithium storage capacity of $MoS_2$-carbon composites is a strong function of carbon concentration. A significant jump in stability can be observed in increasing the carbon concentration from 11% to 22% (FIG. 20e). FIGS. 20e and f reflects two important implications. First, although the $1^{st}$ and $2^{nd}$ discharge cycle capacities of MS-11 are higher than MS-22, MS-32 and MS-41, MS-11 exhibits less stable storage capacity over extended cycling. Evidently, carbon does have a stabilizing effect on the cycling stability of $MoS_2$ and the composition of the composites can be used to influence their stability. Second, there is a critical concentration of carbon at which the capacity and cyclability are optimized. 22% carbon containing $MoS_2$-carbon composite exhibits the best stability. It suggests that the optimum value of carbon in rendering stable cycle life is around 22%. At carbon concentrations less than 22%, the $MoS_2$ particles are not effectively coated with carbon (ESI, FIG. 26a) that promotes possible electrochemical reaction of $Li_2S$ and electrolyte during the first discharge process. It is important for lithium-ion battery purposes to ensure good buffering for active material. Therefore, similar to MS-0, MS-11 shows higher first cycle discharge capacity (2108 mA h $g^{-1}$) compared to other carbon-$MoS_2$ compositions. On the other hand, increasing carbon concentrations more than 22% results in thicker carbon coating (ESI, FIG. 26b) and increase in inactive mass in the electrode. Since resorcinol-formaldehyde synthesized carbon is porous, the electrolyte can wet the $MoS_2$ particle. Therefore, MS-32 and MS-41 show stable electrochemical activity. However, the lithium storage capacities are lower than MS-22 due to increased proportion of inactive mass in the electrode.

Figure 22:
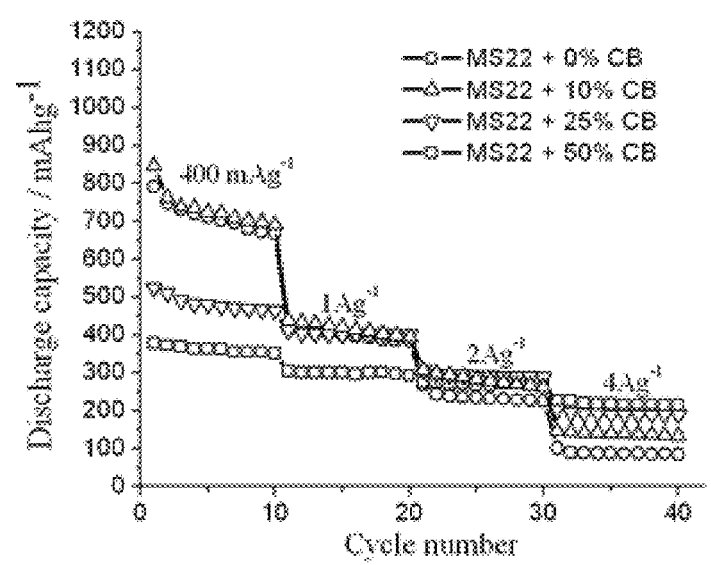
FIG. 22. Representative cycling stability of MS-22 with 0%, 10%, 25% and 50% carbon black in the electrode composition at various current rates in the range of 0.4-4 A $g^{-1}$.
Figure 28:
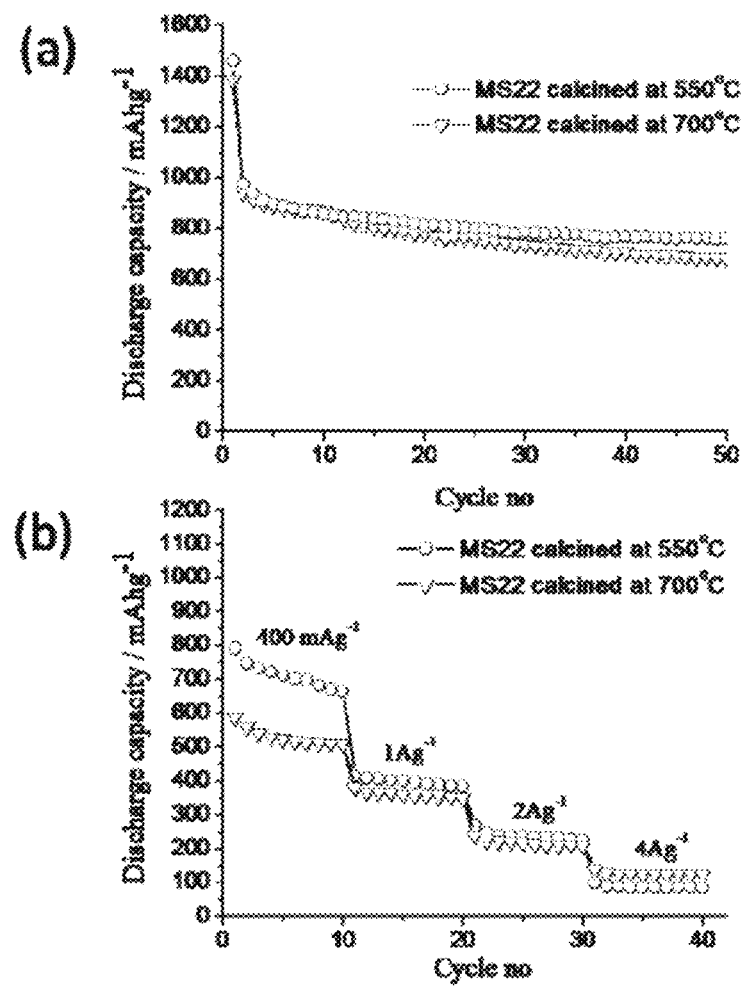
FIG. 28. Representative cycling stability of 550° C. and 700° C. calcined $MoS_2$-carbon (22 wt %) composite at a current rate of (a) 100 mA$g^{-1}$; (b) at various current rates in the range of 0.4-4 A$g^{-1}$.
Figure 29:
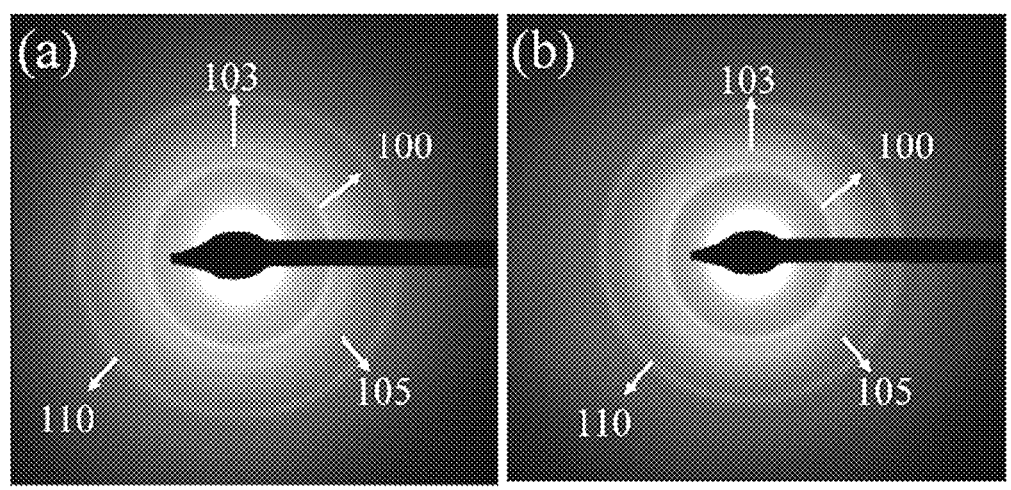
FIG. 29. Representative SAED patterns of (a) pure $MoS_2$ and (b) $MoS_2$-carbon (22 wt %) composite.

The cycling stability and rate capability of MS-22 with additional carbon black in the electrode is shown in FIGS. 22 and 23 (ESI). It is observed that incorporation of higher amount (50%) of carbon black facilitates higher rate capability. To further testify the carbon quality present in the MoS$_2$-carbon composites, the material is calcined at 700° C. The lithium battery performance is shown in (see ESI, FIG. 28). Heat treatment of 700° C. is found to have deteriorating effect on the cyclability due to possible temperature induced crystallite growth.

A facile one-pot hydrothermal method for the synthesis of MoS$_2$-carbon nanostructures with various carbon compositions was demonstrated. The procedure utilizes water as the only solvent and creates stacked nanosheets of MoS$_2$ in a carbon matrix. It is demonstrated that incorporation of carbon provides significantly improved cycling stability when the material is used as a lithium battery electrode. It is also found that an optimum level of carbon is required to produce materials with both high lithium storage capacity and good electrochemical cycling stability. The improved performance is attributed to following three main factors. First, the porous structure of the composites allows for facile Li$^+$ insertion-deinsertion into MoS$_2$ nanosheets and for structural stresses induced by L$^+$ insertion-deinsertion to be properly accommodated since the dimension of MoS$_2$ nanosheets are small (thickness ~10 nm) and composed of few layers (~6 to 10 layers). Second, incorporation of MoS$_2$ in the carbon matrix inhibits the side reaction of Li$_2$S with electrolyte at the interface of Mo and carbon and finally, the carbon framework limits particle agglomeration. The synthesis approach reported in the present invention will be beneficial for designing new organic-solvent free synthesis methods for creating composite electrode materials for lithium batteries.

Synthesis of MoS$_2$-carbon: The MoS$_2$-carbon composites with varying carbon weight fractions were synthesized by a hydrothermal method. Resorcinol/formaldehyde (Sigma-Aldrich) and ammonium tetrathiomolybdate (Sigma-Aldrich) were used respectively as carbon and MoS$_2$ precursors. A desired concentration (0.076 M) of aqueous solution of ammonium tetrathiomolybdate was added to another aqueous solution containing resorcinol, formaldehyde and sodium carbonate under continuous stirring. The ratios of resorcinol to formaldehyde and to sodium carbonate were kept at 0.185 g ml-1 and 251 respectively calculated on a molar basis for all MoS$_2$-carbon composites. However, the concentrations of resorcinol, formaldehyde and sodium carbonate were varied to obtain various carbon loadings in the final product. The intense violet color sol was transferred to a Teflon-lined stainless steel autoclave of capacity 100 ml (70% filling) and heated at 180° C. for 12 hours and then cooled to room temperature. The resultant black product was recovered by centrifugation and washed with deionized water and freeze dried. The dried product was further calcined at 550° C. for 4 hours in an atmosphere of 5% H$_2$ balanced with Ar at a heating rate of 5° C. min$^{-1}$ Pure MoS$_2$ was synthesized by hydrothermal treatment of ammonium tetrathiomolybdate (180° C. for 12 h, calcination at 550° C. for 4 hours under H$_2$/Ar), but without any addition of resorcinol and formaldehyde. The materials were designated as MS-0, MS-11, MS-22, MS-32 and MS-41-corresponding to 0, 11, 22, 32 and 41 wt % of carbon in the MoS$_2$-carbon composites.

The crystallographic phase identification was performed using powder x-ray diffraction (Scintag theta-theta PAD-X-ray Diffractometer; Cu—K$\alpha$ radiation, $\lambda$=1.5406 Å). The morphology was observed by scanning electron microscopy (SEM, LEO 1550 FESEM) and transmission electron microscopy (TEM, FEI Tecnai G2 T12). Specific surface area (BET) was obtained from nitrogen adsorption-desorption isotherms (Micromeritics ASAP 2020). Estimation of carbon content in MoS$_2$-carbon composites was done using thermogravimetric analysis (TGA, TA Instruments Q5000). TGA experiments were performed by heating the sample in air from room temperature to 700° C. at a heating rate of 10° C. min$^{-1}$. For the working electrode, slurry of the active material and carbon black (Super P Timacal) was prepared with PVdF (Sigma) in a weight ratio of MoS$_2$:CB:PVDf=90: 0:10, 80:10:10, 65:10:10, 40:50:10 in N-methyl-pyrrolidone (NMP). The slurry was cast on a copper foil and dried in vacuum at 120° C. for 12 h. Room temperature cyclic voltammetry (CV, CH608 CH Instruments) and galvanostatic charge/discharge cycling (Maccor) were done in 2032 coin-type cells with pure metal Li (Aldrich) as anode, Whatman glass fibre as separator and 1M LiPF6 in ethylene carbonate (EC, Aldrich) and dimethyl carbonate (DMC, Aldrich) (1:1 w/w) as an electrolyte.

Example 4

This example describes the synthesis and characterization of examples of hybrid materials and nanocomposite materials of the present invention.

A method is reported for creating functional organic-inorganic hybrid materials by copolymerization of organic molecules and inorganic compounds. The approach is based on miniemulsion polymerization technique followed by a thermal pyrolysis step, and yields nanostructured composites in which nanoparticles are uniformly embedded in a porous, partially graphitic carbon matrix. Depending upon the chemistry of the starting materials, nanoscale organic-inorganic hybrid materials created using the approach are attractive as anodes and cathodes for next-generation lithium and other rechargeable battery systems. Additionally, the platform is very versatile and through ex situ conversion or utilization of multiple precursors, can be applied to various classes of materials including metal oxides, metals, metal sulfides and alloys. The approach also lends itself to the development of scalable processes for production of nanostructured battery materials.

This general approach for synthesizing metal oxide-, metal sulfide-, and metal alloy-carbon nanocomposites ameliorates the physical and chemical stresses associated with repeated insertion and de-insertion of lithium present a fundamental challenge to further development of next-generation lithium ion battery (LIB) technologies. Remarkably, in every case investigated the nanocomposites manifest improved electrochemical stability whether they are applied as anodes or cathodes in a secondary battery.

An approach for the in situ synthesis of nanoparticles embedded in a carbon matrix through a miniemulsion polymerization technique was shown. The as prepared carbon-nanoparticle hybrid materials can be facilely modified ex situ to significantly increase the range of materials chemistries that can be achieved by the method. The approach is based on the in situ synthesis of inorganic nanoparticles and organic polymers from precursors capable of forming chemical cross-links with each other. After pyrolysis of the organic phase, the process yields a well-defined nanostructured material comprised of discrete inorganic nanoparticles embedded in a porous carbon matrix. Post treatment of the embedded particles creates carbon-nanoparticle hybrids based on metals, metal alloys, and a variety of other particles attractive for lithium battery applications.

Emulsion polymerization is a widely used method for synthesizing polymer latexes for applications such as adhesives and coatings. The method typically uses monomers with low water solubility, stabilized by surfactant in an aqueous media. The polymerization rate is limited by the diffusion of reactive monomer, through the aqueous phase, from monomer droplets to monomer-swollen polymer particles where polymerization takes place. Application of high shear force to the emulsion yields a so-called miniemulsion, comprised of droplets with small sizes, usually 0.01~0.5 µm, compared to 1~10 nm in conventional emulsion polymerization. Because of the high surface area of monomer droplets in a miniemulsion, nucleation takes place mainly via radical entry into the emulsified monomer droplets and reaction proceeds through polymerization of the monomers in these small droplets. If more than one monomer chemistry is employed simultaneously or sequentially, the approach can be used to create copolymers with different architectures. If the polymerization reaction is performed in the presence of guest species miscible with the monomer (e.g. dyes, metal complexes, etc.), the guest species can be embedded in the polymer particle host. However, a common drawback is that only relatively low loadings (a few percent by weight) of the guest can be achieved. A new method to overcome this drawback and demonstrate the applicability of the method to synthesize composites involving various types of LIB electrode materials was demonstrated.

Chemicals and materials synthesis. Chemical reagents were purchased from Sigma-Aldrich and used without purification. $Fe_3O_4$@C nanocomposite synthesis. 2 ml acrylonitrile (AN), 2 ml divinylbenzene (DVB) and 2 g of iron undecylenate were mixed to form a homogeneous solution. 3 mg of azobisisobutyronitrile (AIBN) and 100 mg sodium dodecyl sulfate (SDS) were added to 25 ml of water and the former solution added dropwise to the aqueous phase under sonication with a Sonics VCX500 horn (500 W, 20 kHz, amplitude 50%). The mixture was sonicated for 3 minutes and after a stable emulsion was formed, heated at 70° C. for 12 hours. Sodium chloride was added to induce aggregation of the resultant polymer-inorganic hybrid particles, which were collected by centrifugation. The material obtained was heated in an argon atmosphere, first to 320° C., held at this temperature for 1 hr, then to 500° C. and held for 2 hours to obtain the $Fe_3O_4$@C nanocomposite product. $Fe_3O_4$@C was then ground into powder and heated at 650° C. in a tube furnace under a 7% $H_2$ (balance Ar) gas environment for 2 hours to obtain Fe@C powders. The latter is mixed with 2× mass of sulfur, loaded into a Pyrex tube, sealed and heated at 500° C. for 4 hours to obtain $FeS_2$@C nanocomposite. The product is washed with $CS_2$ to remove any residual elemental sulfur. To synthesize $\gamma$-$Fe_2O_3$@C and $\alpha$-$Fe_2O_3$@C composites, $Fe_3O_4$@C powder is heated in air at 350° C. for 5 hours and 390° C. for 1 hour, respectively, to obtain the products. To synthesize $V_2O_5$@C, $VCl_3$ is used as the starting material to synthesize $V(C_{10}H_{19}COO)_3$. After polymerizing with acrylonitrile, the material is pyrolysed at 500° C. in argon for 2 hours and then heated in air at 390° C. for 1 hour to obtain $V_2O_5$@C. To synthesize $FeSn_2$@C nanocomposite, tin undecylenate ($Sn(C_{10}H_{19}COO)_2$) was synthesized in a similar fashion as iron undecylenate, except with $SnCl_2$ as the starting material. 2.2 g $Fe(C_{10}H_{19}COO)_3$ and 1.8 g $Sn(C_{10}H_{19}COO)_2$ were mixed first, 2 ml AN and 2 ml DVB were added, and then the rest of the procedure was carried out as above.

The crystal structures of the particles were characterized using Scintag Theta-theta PAD-X X-Ray Diffractometer (Cu Kα, λ=1.5406 Å) and their morphologies were studied using FEI Tecnai G2 T12 Spirit Transmission Electron Microscope (120 kV). Thermogravimetric analysis was performed using TA Instruments Q5000 IR Thermogravimetric Analyzer.

Cell assembly and testing. Electrochemical characterization of the composites as anode materials in rechargeable lithium-ion batteries was performed at room temperature in 2032 coin-type cells. The working electrode consisted of 80 wt % of the active material, 10 wt % of carbon black (Super-P Li from TIMCAL) as a conductivity aid, and 10 wt % of polymer binder (PVDF, polyvinylidene fluoride, Aldrich). Copper foil was used as the current collector for nanocomposites targeted for application as the LIB anode and aluminum for those targeted as cathodes. Lithium foil was used as the counter and reference electrode for evaluating both that anode and cathode materials. A 1 M solution of $LiPF_6$ in a 50:50 w/w mixture of ethylene carbonate and dimethyl carbonate was used as the electrolyte. Celgard 2500 polypropylene membranes are used as the separator. Assembly of cell was performed in a glove box with moisture and oxygen concentrations below 1 ppm. The room-temperature electrode capacities were measured using Neware CT-3008 battery testers. Cyclic voltammetry was performed with a CHI600D potentiostat.

Figure 30:
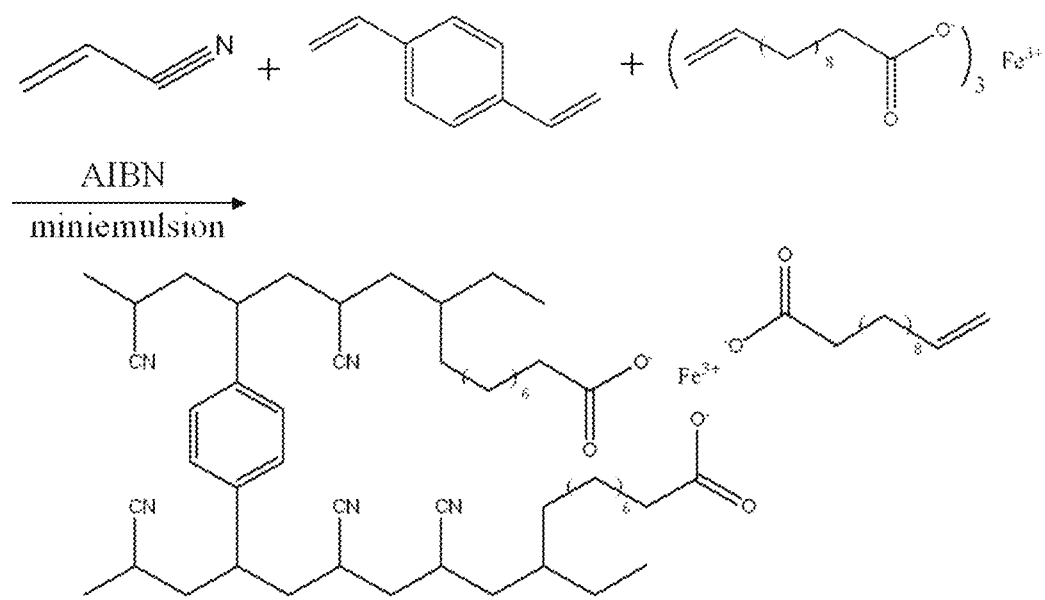
FIG. 30. An example of a schematic of synthesis process for creating organic-inorganic copolymer hybrids.
Figure 31:
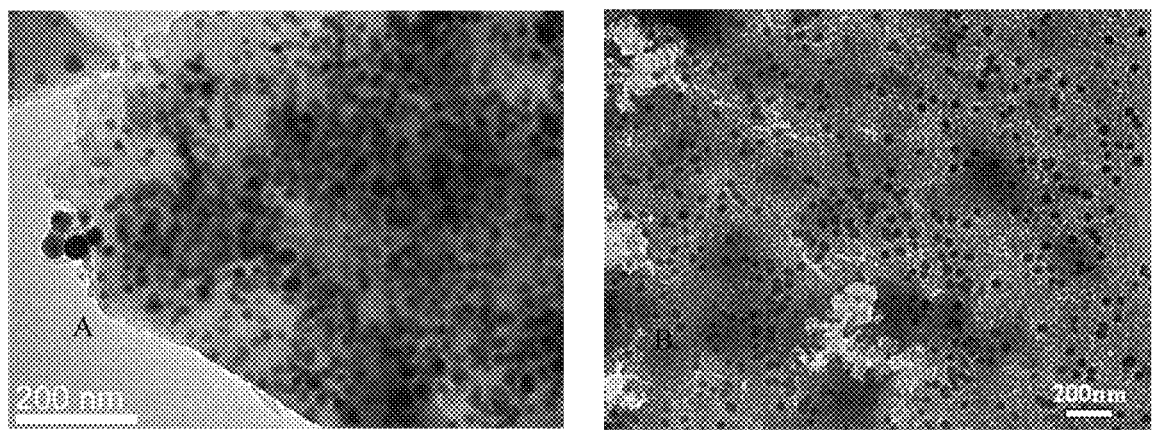
FIG. 31. Representative TEM images of $Fe_3O_4$@C nanocomposite (A) before cycling and (B) after 100 charge-discharge cycles.
Figure 39:
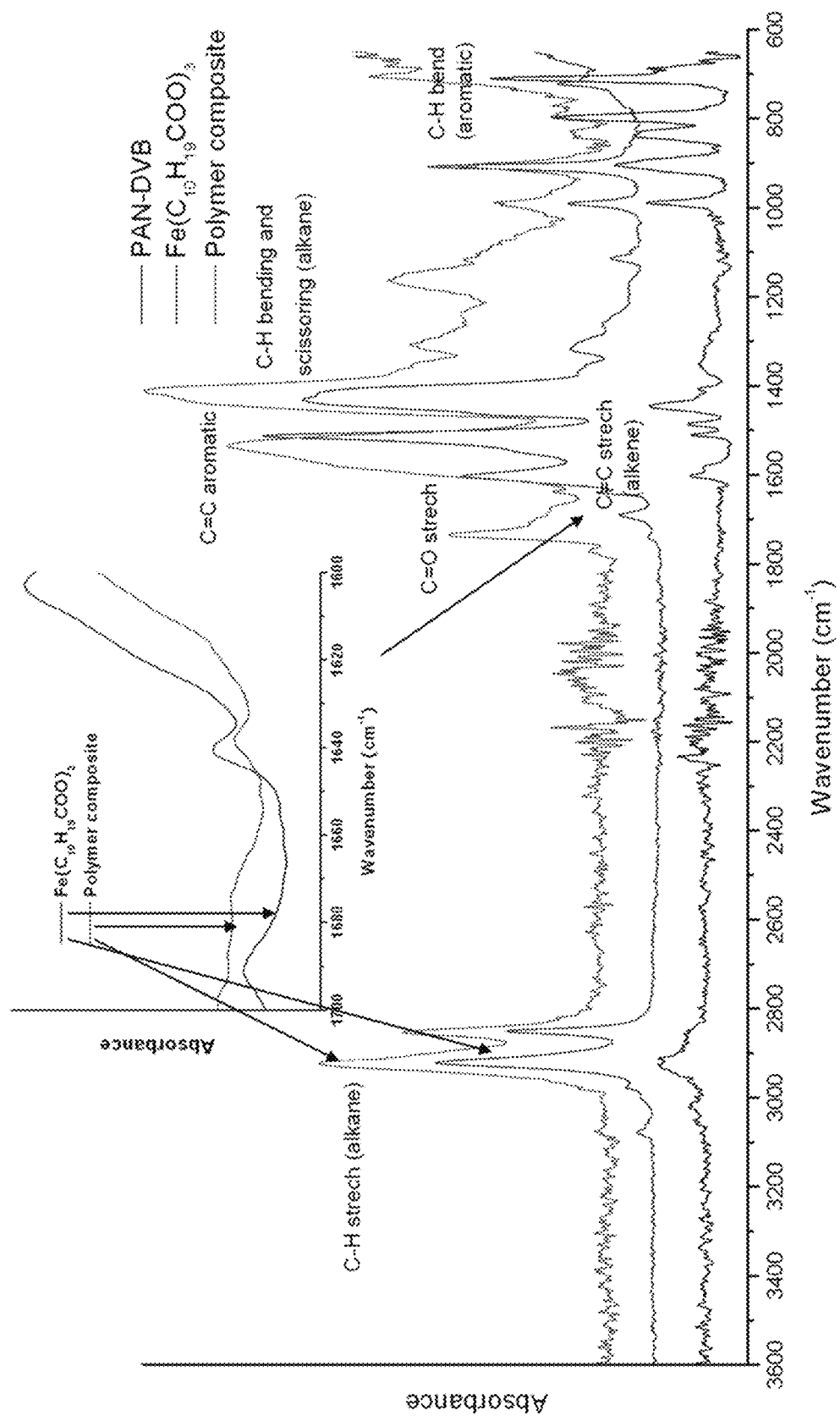
FIG. 39. Representative infrared spectra of crosslinked PAN-DVB, $Fe(C_{10}H_{19}COO)_3$ and PAN-iron composite. Inset: close-up of 1600-1700 $cm^{-1}$, normalized using peak at 2930 $cm^{-1}$.

FIG. 30 illustrates the chemistry of a miniemulsion polymerization methodology that could be used to create organic-inorganic hybrid copolymers with high inorganic loadings. Using an organic monomer (e.g. acrylonitrile, or AN) and the metal salt of an unsaturated carboxylic acid (e.g. iron (III) undecylenate) and divinylbenzene as cross-linker the method yields well-defined iron oxide nanoparticles uniformly embedded in a polyacrylonitrile host (FIG. 31A). FTIR spectra of iron (III) undecylenate and the AN-iron copolymer composite are compared in FIG. 39. Significant decrease in the intensity of the C=C stretch peak at around 1640 $cm^{-1}$ (normalized with respect to C—H stretch at around 2910 $cm^{-1}$) is observed, showing that as expected many of the double bonds in iron (III) undecylenate have been eliminated during polymerization.

Upon thermal treatment, the as prepared polyacrylonitrile (PAN)—nanoparticle hybrids are transformed into carbon-$Fe_3O_4$ nanocomposites characterized by the uniform distribution of $Fe_3O_4$ in a partially graphitic carbon host was demonstrated. When evaluated as the anode in a lithium ion battery, the material showed significantly improved cycling stability and capacity retention relative to anodes based on pristine $Fe_3O_4$ nanoparticles. The performance enhancement brought about by the in situ synthesis approach was argued to largely originate from the uniform separation of the embedded nanoparticles achieved in the composites, which simultaneously minimizes aggregation of the active nanostructures, facilitates electron transport, and maximizes the degree to which the carbon framework is able to absorb and isolate mechanical stresses produced by structural changes. FIG. 31B shows the TEM image of the nanocomposite after 100 charge-discharge cycles. It indicates that with the mechanical support provided by the carbon matrix, the pulverization of the active material nanoparticles is mitigated, which is the source of the observed improvement in cyclability.

Figure 32:
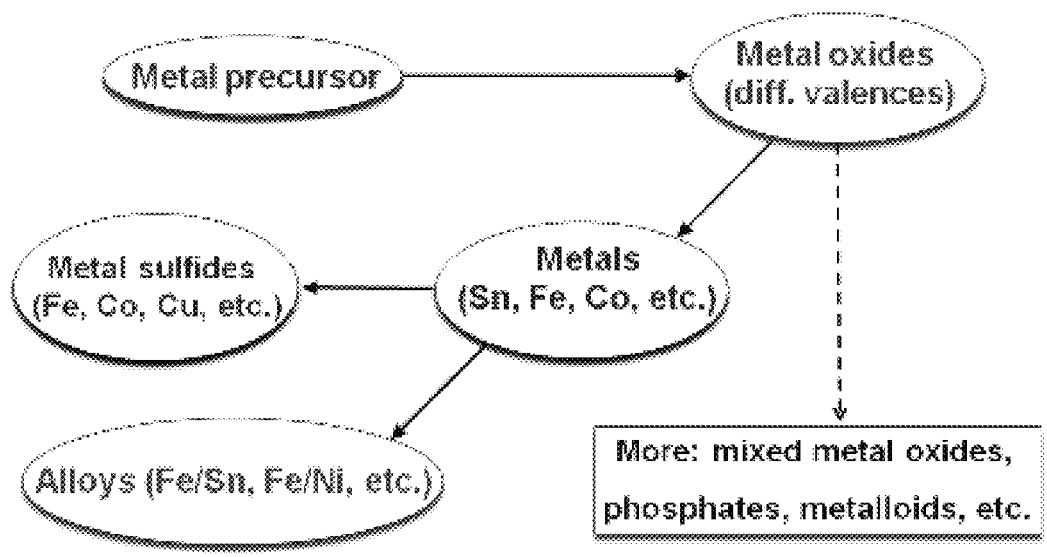
FIG. 32. An example of an overview of the platform for synthesizing nanocomposites with embedded structures involving different classes of materials.

A goal of the present work is to illustrate the versatility of the synthesis method and to evaluate the generality of the hybrids produced. FIG. 32 shows an abbreviated list that identifies the variety of hybrid materials relevant for application in lithium battery electrodes that can be synthesized using the approach. Because of the large number of Fe-based compounds and alloys that are of interest for LIB applications, demonstrated is the simplicity and versatility of the method using nanoparticles based on Fe compounds; the enhancements were subsequently evaluated in their properties by using the composites as anodes or cathodes for LIBs.

Results on other examples (e.g. materials based on vanadium and titanium) will also be discussed.

Figure 33:
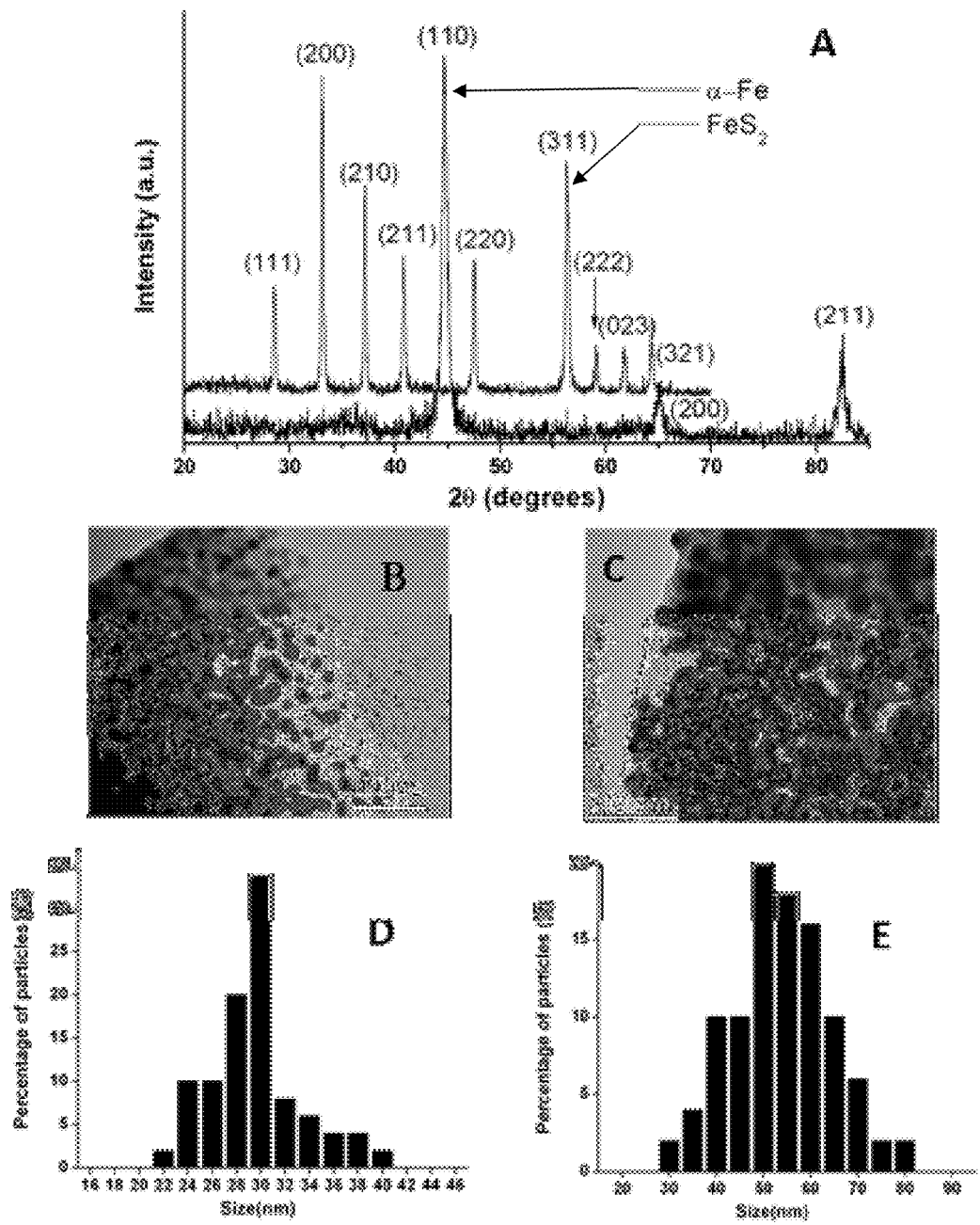
FIG. 33. Representative powder XRD patterns (A), TEM images for Fe@C (B) and $FeS_2$@C(C) composites and size distribution histograms for Fe@C (D) and $FeS_2$@C (E).

As illustrated in FIG. 32, carbon-$Fe_3O_4$ nanocomposites ($Fe_3O_4$@C) synthesized using the procedures outlined earlier can be reduced to Fe@C composites either by heating the material in an $H_2$ environment or simply by heating the composite in an inert gas to a temperature somewhat higher than the carbonization temperature (whereby carbon serves as the reducing agent). The XRD pattern of the material obtained after heating $Fe_3O_4$@C to 650~700° C. under $H_2$ is shown in FIG. 33A, which is unambiguously assigned to the α-Fe (JCPDS card #06-0696). FIG. 33B is a transmission electron micrograph of the material showing that the materials are comprised of well-dispersed ca. 30 nm Fe nanoparticles, which is consistent with the average crystallite size of 29 nm deduced from XRD.

Because the carbon matrix is porous, it allows the infusion of other chemical agents, which can react with the embedded Fe nanoparticles. $FeS_2$ is a promising cathode material for lithium batteries because of its high reversible capacity (625 mAh/g), low cost and low toxicity. It is well-known in primary lithium battery applications and high temperature thermal batteries, but its use in room-temperature rechargeable cells has been hindered by the material's limited cyclability. A vapor infusion procedure was used to react the Fe@C composites with sulfur at 500° C. FIGS. 33A and C are the corresponding XRD and TEM patterns for this material. The XRD pattern is unambiguously assigned to $FeS_2$ (JCPDS card #42-1340) and reveals that reaction with sulfur has nearly doubled the crystallite size to 54 nm; again consistent with results from TEM, which show uniformly distributed ca. 55 nm $FeS_2$ particles in the carbon host. Particle size histograms obtained from TEM images for Fe@C and $FeS_2$@C composites are shown in FIGS. 33(D) and (E), with average sizes of 29.7±3.8 nm and 53.8±9.9 nm, respectively. Through oxidative TGA (FIG. 40) the weight fraction of $FeS_2$ in the product is found to be 75%.

Figure 34:
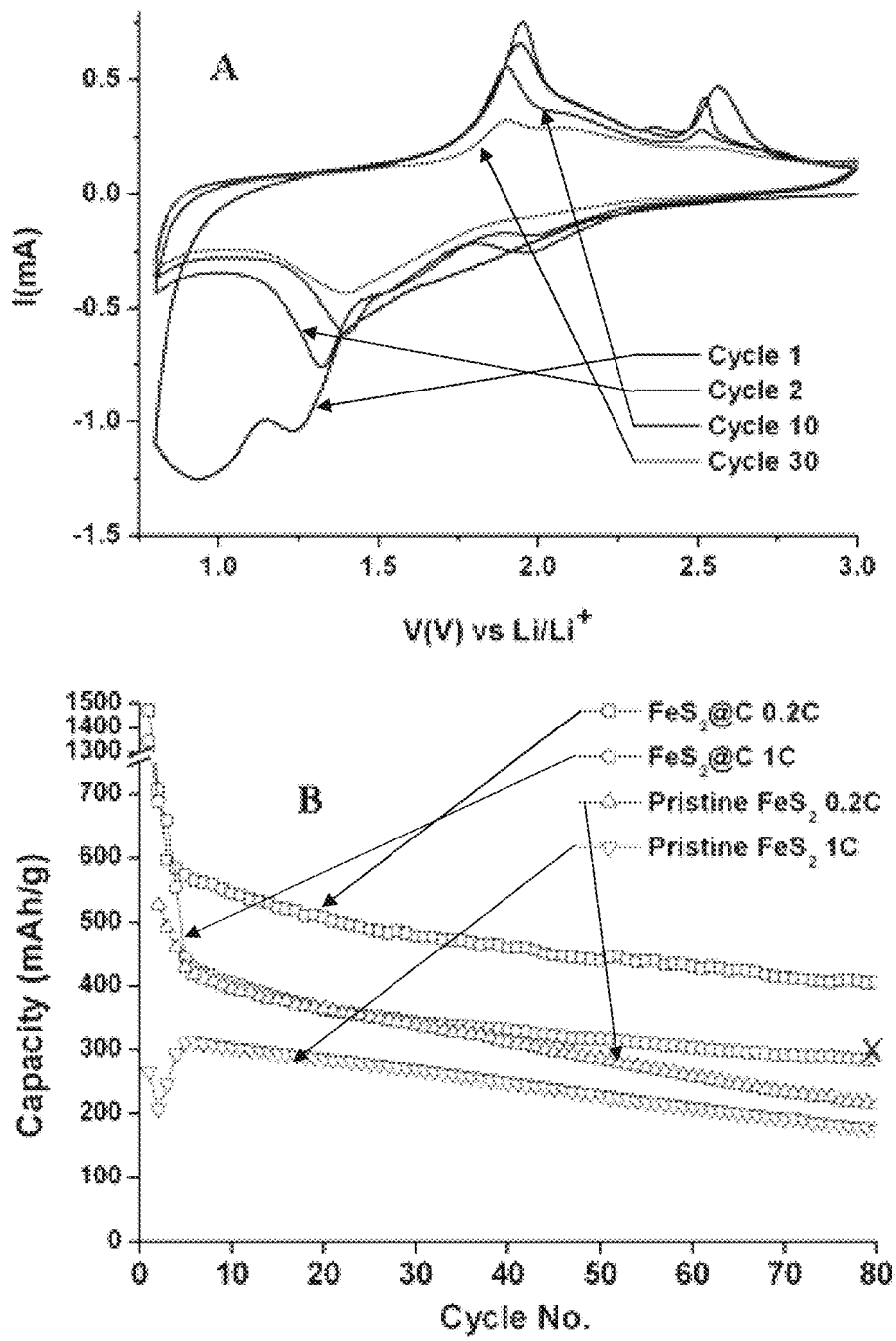
FIG. 34. Representative (A) Cyclic voltammograms of $FeS_2$@C; (B) cycling performance of $FeS_2$@C and pristine $FeS_2$. Red cross indicates result from reference 28 (0.58 C).
Figure 41:
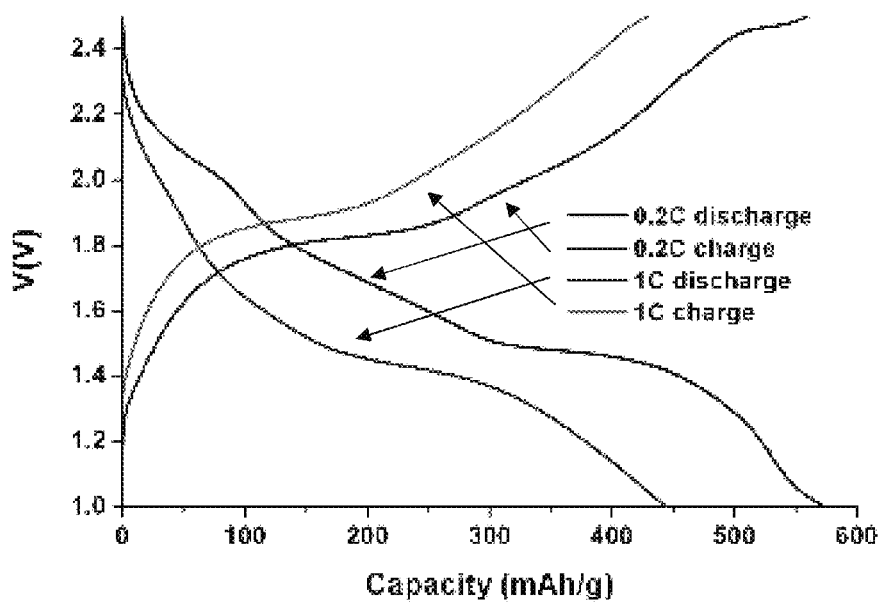
Figure 42:
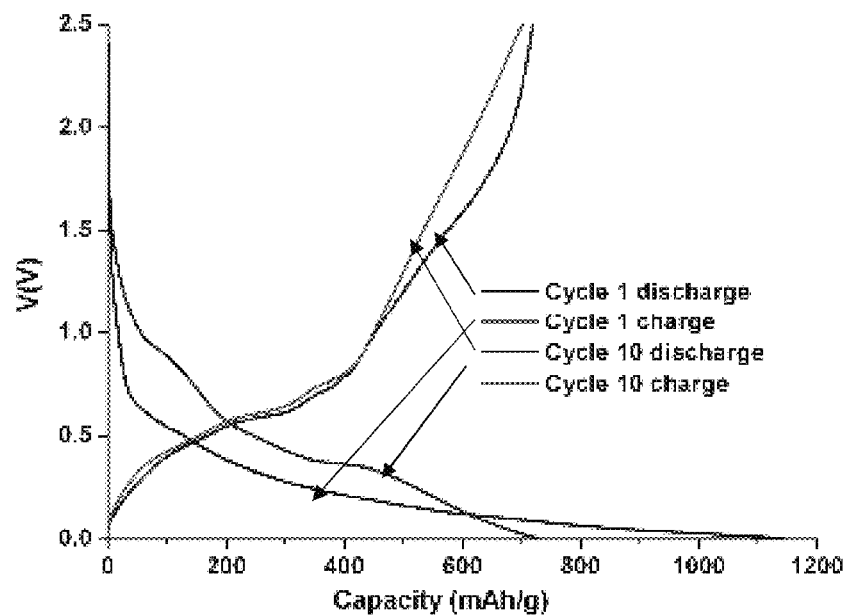
FIG. 42. Representative voltage-capacity profiles for $FeSn_2$@C composite run at 0.1 C.
Figure 43:
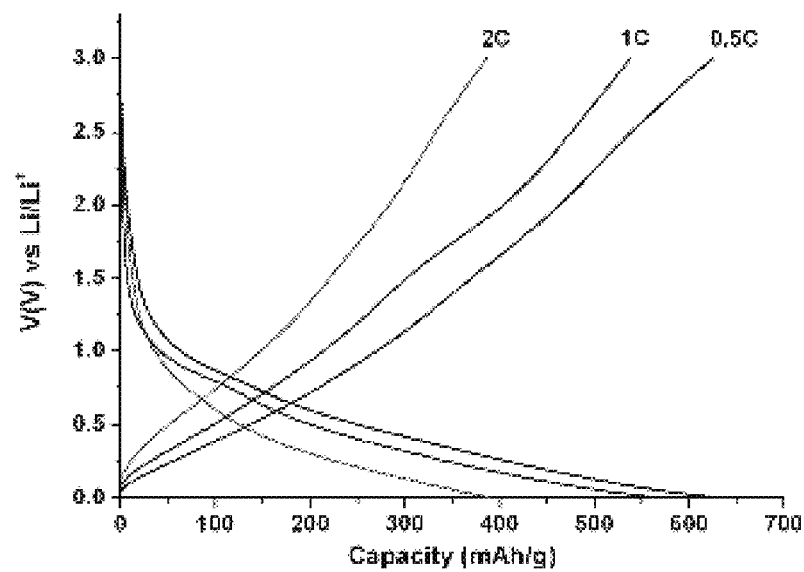
FIG. 43. Representative voltage-capacity profiles for $\gamma$-$Fe_2O_3$@C composite run at 0.5 C, 1 C and 2 C.

FIG. 34 report results from cyclic voltammetry and galvanostatic cycling measurements performed using the as prepared $FeS_2$@C composites. In the cathodic scan of the first cycle, $FeS_2$ follows a two-step lithiation: $FeS_2 + 2Li^+ + 2e \rightarrow Li_2FeS_2$ (~2V) and $Li_2FeS_2 + 2Li^+ + 2e \rightarrow Fe + 2Li_2S$ (~1.4V). In the anodic scans, the material is converted to $Li_2FeS_2$ at around 1.8V and then to $Li_{2-x}FeS_2$ (0<x<0.8) at around 2.5V. At room temperature if the material is driven to high potentials (above 2.45V), instead of regenerating the $FeS_2$ (cubic structure), $FeS_x$ and elemental sulfur may be formed because of the relative ease of transformation from $Li_{2-x}FeS_2$ (hexagonal) to $FeS_x$ (hexagonal). Subsequent cycling occurs between $Li_{2-x}FeS_2$ and $Fe/Li_2S$. Voltage-capacity profiles at different charging rates are shown in FIG. 41. Plateaus at ~2V and 1.4~1.5V in the discharge curve correspond to lithiation peaks in the anodic scan. The gravimetric capacity is calculated with respect to active material mass (the same for the materials to follow in this work). The cyclability is compared with commercially available pristine $FeS_2$, showing the enhancement of cycling performance brought about by forming nanocomposites with carbon.

When more than one metal precursor is used, the approach yielded nanocomposites with alloy nanoparticles embedded in the carbon matrix. An example of this is the iron-tin alloy, which is being actively investigated as an anode material in LIBs. Alloys of tin with another metal (e.g. Sb, Co, Fe, Ni) are able to provide some alleviation effect for the pulverization of tin through the mechanical protection offered by the other metal which gets extruded during lithiation. The incorporation of such alloy nanoparticles in a carbon matrix provides a means of additional mechanical support so that the cycling stability of the material may be further enhanced.

Figure 35:
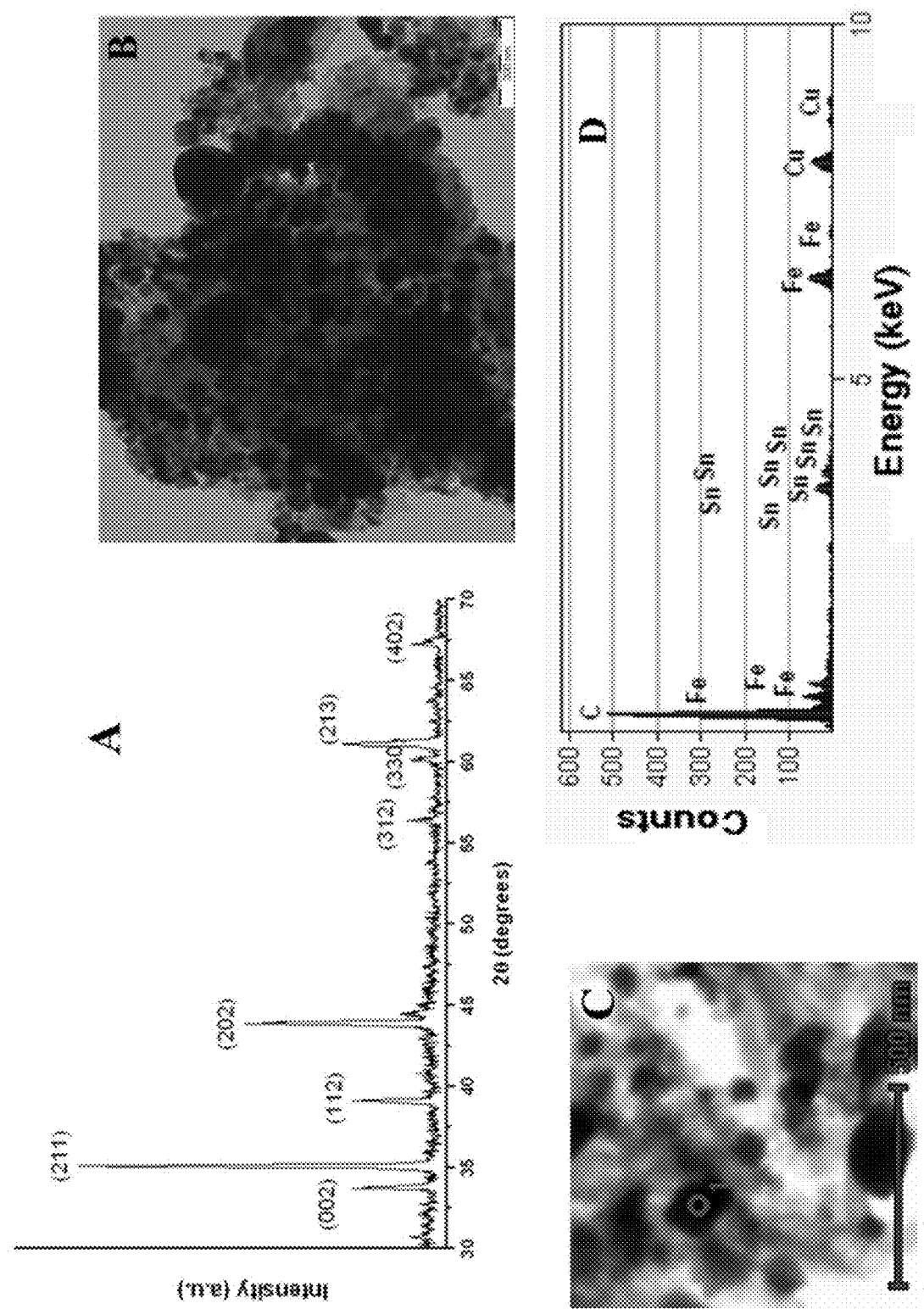
FIG. 35. Representative (A) XRD pattern, (B) TEM image, (C) STEM image and (D) EDX spectrum for $FeSn_2$@C nanocomposite.
Figure 36:
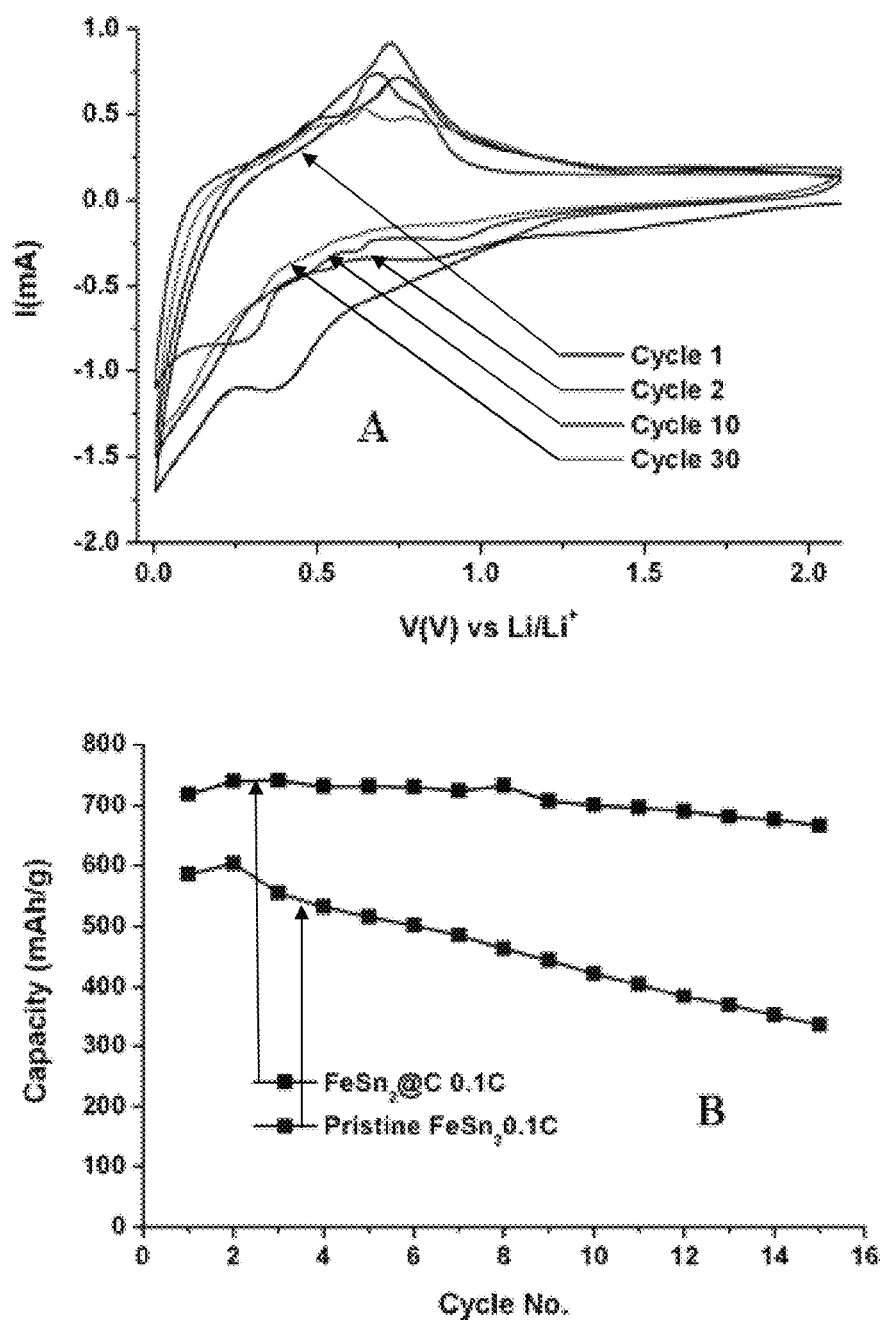
FIG. 36. Representative (A) Cyclic voltammograms of $FeSn_2$@C; (B) cycling performance of $FeSn_2$@C and pristine $FeSn_2$ at 0.1 C.
Figure 40:
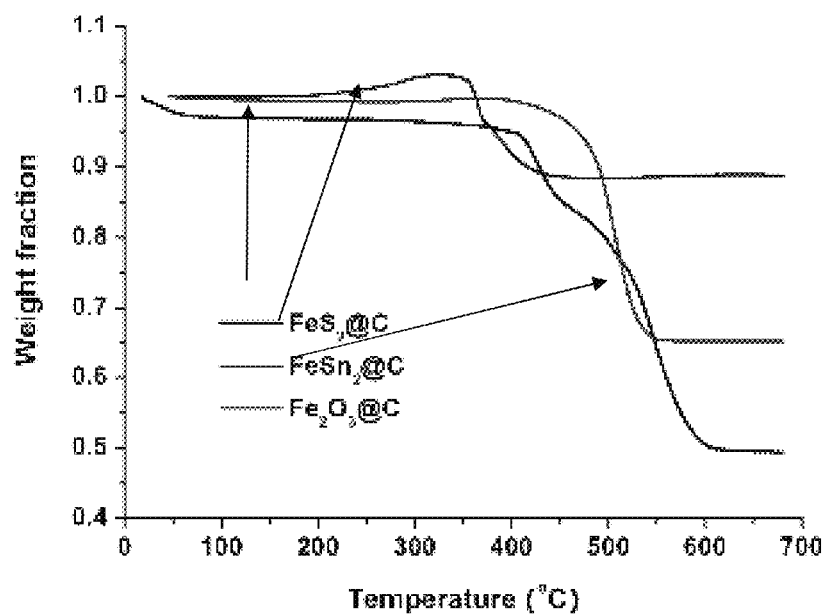
FIG. 40. Representative oxidative TGA curves for $FeS_2$@C, $FeSn_2$@C and $\gamma$-$Fe_2O_3$@C FIG. 41. Representative voltage-capacity profiles for $FeS_2$@C composite run at 0.2 C and 1 C.

$FeSn_2$@C nanocomposites can be synthesized using a combination of iron and tin precursors, as confirmed by XRD (FIG. 35A). EDX indicates the presence of iron and tin in the composite (FIGS. 35C and 35D) and yields an atomic ratio of Fe/Sn=0.59. The weight fraction of $FeSn_2$ in the composite is determined using oxidative TGA to be 68% (FIG. 40). The TEM images are shown in FIG. 35B. There appears to be a broader distribution of nanoparticle size compared to other materials (e.g. metal oxides, sulfides) synthesized using the same approach. The reason may be that tin has a relatively low melting point and liquid tin likely formed droplets with broad size distribution before reacting with iron. Cyclic voltammograms of the material are shown in FIG. 36A. The electrochemical reaction of $FeSn_2$ in LIB can be expressed as follows: $FeSn_2 + 8.8Li^+ + 8.8e \rightarrow 2Li_{4.4}Sn + Fe$ and $Li_{4.4}Sn \rightarrow S + 4.4\ Li^+ + 4.4e$. The reversible capacity of the material results from the repeated alloying and dealloying of lithium with tin. Multiple lithiation peaks occur in the CV indicating the multi-step reaction associated with Li—Sn alloying. Some of the important intermediate phases include $Li_7Sn_3$ (formed at ~0.45V vs. $Li/Li^+$) and $Li_7Sn_2$ (~0.28V). Overlapping with the SEI formation peak may have caused some broadening of these lithiation peaks. The cycling performance of the composite at different rates is compared with pristine $FeSn_2$ synthesized from heating a mixture of iron and tin powders at 500° C. and enhancement over the bare material is clearly seen.

Figure 37:
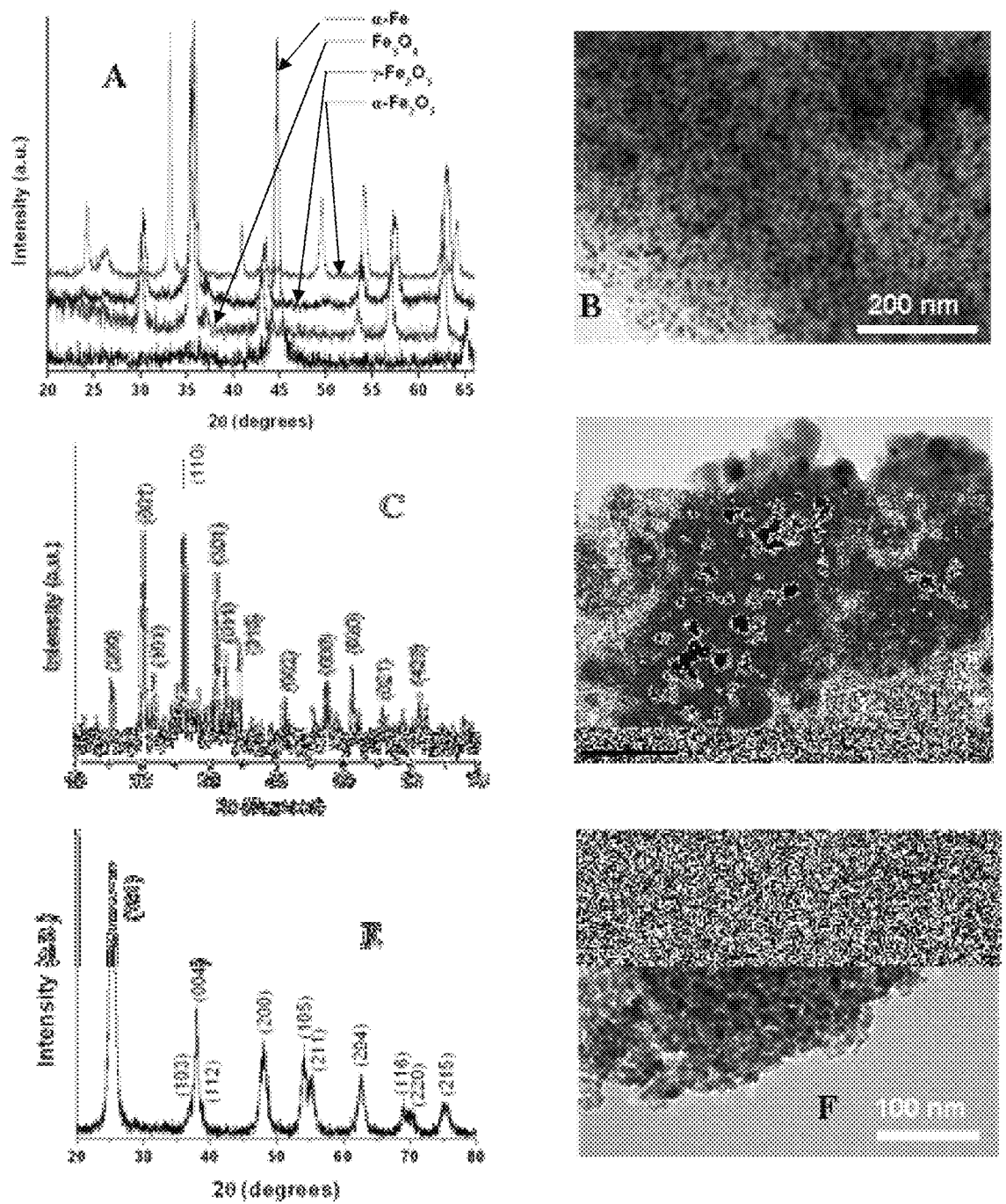
FIG. 37. Representative (A) XRD patterns of the embedded carbon composites involving iron/iron oxides; (B) TEM image of $\gamma$-$Fe_2O_3$@C composite; (C) and (D) XRD pattern and TEM image of $V_2O_5$@C composite; (E) and (F) XRD pattern and TEM image of $TiO_2$@C composite.

Ex situ treatment may also be performed on metal oxides themselves to yield the oxides with different valences of the metal. This brings about a method to overcome the limitations on the types of metal oxides that can be synthesized using the current approach. There are two main reasons for this limitation. One is that in general metal salts with higher valences has a higher tendency to hydrolyze and the corresponding carboxylic acid salt may be more difficult to synthesize. For example, only $Mn(C_{10}H_{19}COO)_2$ can be synthesized using the current approach and not $Mn(C_{10}H_{19}COO)_3$. The other is that with a given precursor, usually only one type of metal oxide can be obtained from the direct pyrolysis of the precursor. For example, the pyrolysis of the $Fe(C_{10}H_{19}COO)_3$ precursor only yields magnetite and does not directly give maghemite or hematite. With ex situ oxidation, the composites involving lower-valence metal oxides may be transformed into composites containing metal oxides with higher valences, which cannot be directly made. For example, $Fe_3O_4$ (magnetite) may be oxidized to maghemite or hematite and MnO may be oxidized to form $Mn_3O_4$. The XRD patterns of α-Fe@C (JCPDS card #06-0696), $Fe_3O_4$@C (#19-0629), α-$Fe_2O_3$@C (#33-0664) and γ-$Fe_2O_3$@C (#25-1402) are shown in FIG. 37A and TEM image for γ-$Fe_2O_3$@C in 6B.

Another example is vanadium. V(V) salt is not stable in water and $V_2O_5$ cannot be directly synthesized using this approach. However, V(III) salt may be used to synthesize $V(C_{10}H_{19}COO)_3$ precursor which can be pyrolysed to form $VO_2$@C which is then oxidized in air to give $V_2O_5$@C composite. The XRD patterns and TEM images of $V_2O_5$@C (JCPDS card #41-1426) and $TiO_2$@C (anatase, JCPDS card #21-1272) are shown in FIGS. 37C-F.

Figure 38:
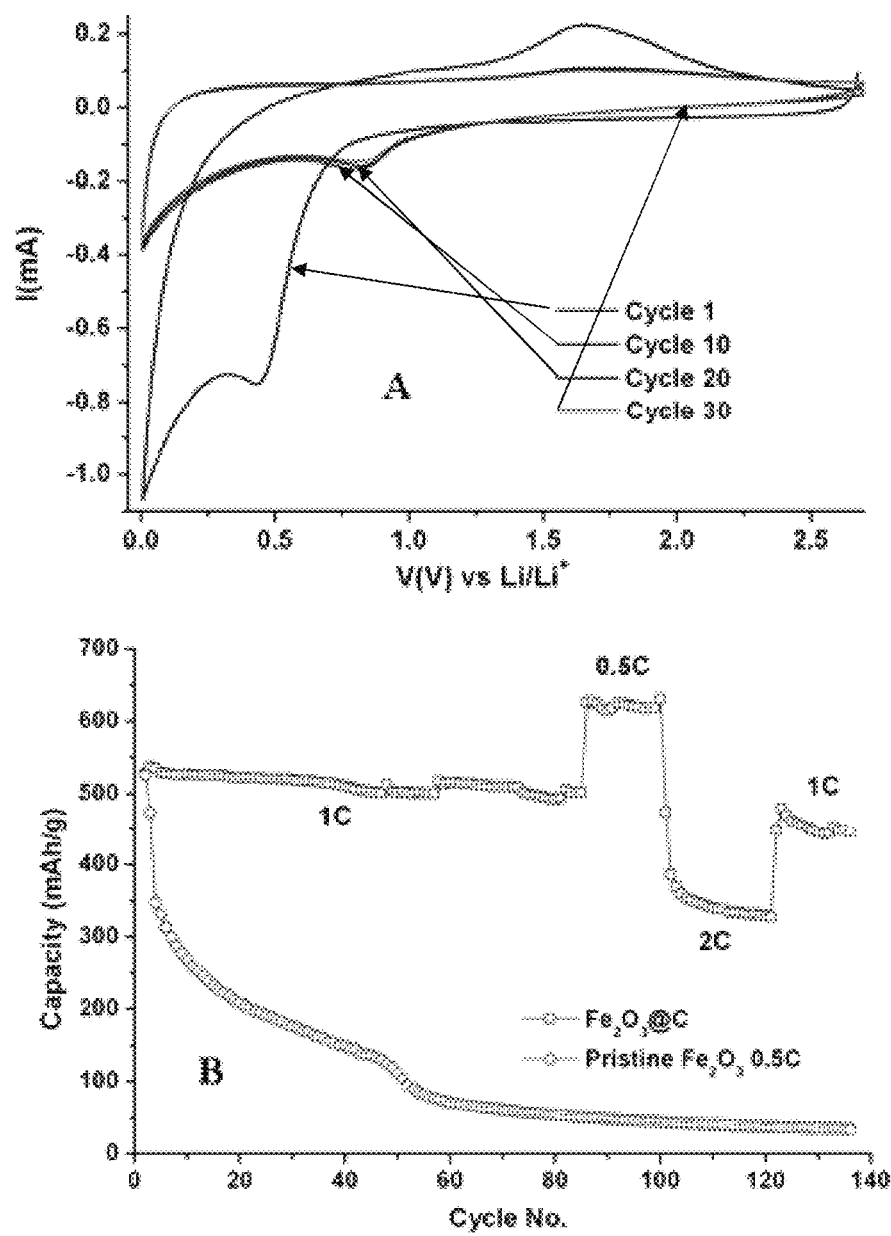
FIG. 38. Representative (A) Cyclic voltammograms of $\gamma$-$Fe_2O_3$@C; (B) cycling performance of $\gamma$-$Fe_2O_3$@C at 0.5 C, 1 C and 2 C and pristine $Fe_2O_3$ at 0.5 C.

The electrochemical performance of γ-$Fe_2O_3$@C was tested. α-$Fe_2O_3$ has been extensively investigated as LIB electrode materials undergoing either intercalation mechanism at low levels of lithiation or conversion reaction at high levels of lithiation and there have also been some reports on $\gamma$-$Fe_2O_3$. Cyclic voltammograms of the $\gamma$-$Fe_2O_3$@C composite synthesized using the current method are shown in FIG. 38A. $Fe_2O_3$ nanoparticles follow the reversible conversion reaction $Fe_2O_3+6Li^++6e^-\leftrightarrow 2Fe+3Li_2O$ when fully lithiated. The large peak in the first cathodic scan at ~0.5V vs. Li/Li$^+$ is usually attributed to SEI formation and in the subsequent cycles lithiation of $Fe_2O_3$ takes place at ~0.8V corresponding to the reduction of $Fe^{3+}$ to $Fe^0$. The broad peak centered at ~1.7V in the anodic scan corresponds to the reoxidation of $Fe^0$ to $Fe^{3+}$. The overlapping of the traces of cyclic voltammograms indicates stable cycling performance, which is shown in FIG. 38B at C, 0.5 C and 2 C charging rates.

Since the active material is incorporated in an amorphous carbon matrix, which does not make a significant contribution to the lithiation capacity, it is useful to determine the effect of the carbon. Using as an example the $Fe_3O_4$-carbon nanocomposite containing 66% by weight $Fe_3O_4$ (924 mAh/g) and the balance carbon (40 mAh/g), the gravimetric theoretical capacity of the composite is 620 mAh/g. From mercury porosimetry, the pore volume of carbon is found to be 0.5516 ml/g and assuming the bulk densities of magnetite and amorphous carbon to be 5.2 and 2.1 g/cm$^3$, respectively, the volumetric theoretical capacities of magnetite and the composite are 4.81 and 1.30 Ah/cm$^3$. Therefore the employment of the porous carbon matrix comes at the cost of a reduced volumetric capacity, which can be limited in an actual battery design by engineering the porosity and weight fraction of the carbon matrix to achieve desired gravimetric and volumetric capacity goals while preserving the improving cyclability imparted by the porous carbon support.

In conclusion, a platform has been developed whereby through the copolymerization of organic and inorganic starting materials and formation of a hybrid followed by calcination, embedded nanostructures consisting of uniformly sized nanoparticles incorporated in a porous carbon matrix may be synthesized in situ. Either by mere in situ reaction, or combined with ex situ engineering of the embedded material, a wide variety of embedded nanostructures may be synthesized which show enhanced lithium storage performance over the bare material. The method obviates the relatively stringent experimental control required in many other methods of creating carbon composites and provides a convenient way to prevent the aggregation of particles. Therefore the process lends itself to cheap and facile scale-up. Besides the materials, which have been demonstrated, additional categories of materials can be made using the current approach (e.g. silicon and phosphates), which is part of the ongoing work.

Example 5

This example describes the synthesis and characterization of examples of hybrid materials and nanocomposite materials of the present invention.

Lithium sulfide is a promising cathode material for high-energy lithium ion batteries because unlike elemental sulfur it obviates the need for metallic lithium anodes. Like elemental sulfur, however, a successful lithium sulfide cathode requires an inherent mechanism for preventing lithium polysulfide dissolution and shuttling during electrochemical cycling. A new scheme is disclosed to create composites based on lithium sulfide uniformly dispersed in a carbon host, which serves to sequester polysulfides. The synthesis methodology makes use of interactions between lithium ions in solution and nitrile groups uniformly distributed along the chain backbone of the polymer precursor (polyacrylonitrile), to control the distribution of lithium sulfide in the host material. The $Li_2S$-carbon composites obtained by carbonizing the precursor are evaluated as cathode materials in a half-cell lithium battery and shown to yield high galvanic charge/discharge capacities and excellent coulombic efficiency; demonstrating the effectiveness of the architecture in homogeneously distributing $Li_2S$ and in sequestering lithium polysulfides.

In this example, a novel route towards lithium sulfide-carbon composite cathodes is disclosed. Lithium sulfide ($Li_2S$), the fully lithiated sulfur product, is already under active investigation for its promise as a cathode. It is a lithiated material and therefore can be paired with high capacity anode materials other than metallic lithium. Also, unlike sulfur which sublimes at a modest temperature, $Li_2S$ has a high decomposition temperature above 900° C. so that it can potentially be processed using high temperature procedures to achieve better performance. The particular property of $Li_2S$ that is utilized in the synthesis is the capacity of the lithium ions to strongly interact with electron donating groups in carbon-precursor polymers such as polyacrylonitrile (PAN). Specifically, lone pair electrons in the nitrile group of PAN are capable of interacting with lithium through a coordination bond-like interaction. Thus, when lithium sulfide is mixed with PAN in a homogeneous solution, $Li_2S$ may function as a crosslinking agent, which interconnects the PAN network via lithium sulfide net-nodes. It is hypothesized that in addition to stiffening the PAN framework, such linkages favor uniform dispersion of $Li_2S$ in the PAN matrix. The resultant lithium sulfide-PAN crosslinked matrix can be carbonized at elevated temperature in an inert environment to obtain an ideal $Li_2S$—C composite cathode material in which $Li_2S$ is uniformly and completely dispersed in carbon.

Figure 44:
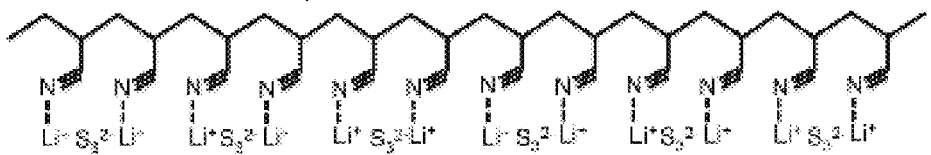
FIG. 44. Proposed synthesis route for creating $Li_2S$-carbon cathode materials.
Figure 44:
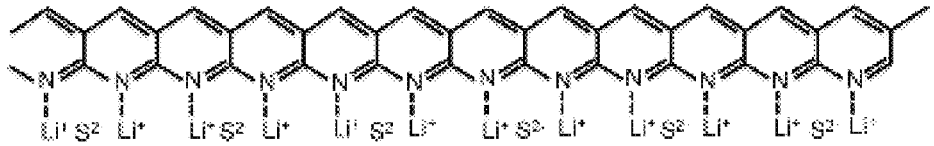
Figure 44:
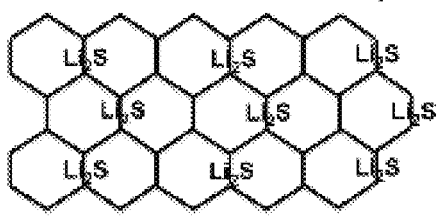

Results and Discussion. The specific synthesis route is shown in FIG. 44 and detailed herein. The method takes advantage of the easy conversion of $Li_2S$ to $Li_2S_x$, to create a dimethylformamide (DMF)-soluble $Li_2S_3$ salt. Because DMF is a good solvent for PAN, co-dissolution of the $Li_2S_3$ salt and PAN promotes uniform dispersion in a high-dielectric constant DMF medium, which favors ion pair dissociation of $Li_2S_3$ and cross-linking of the polymer in solution. To prepare $Li_2S_3$-PAN composites the cross-linked polymer solution was first treated at 100° C. for 48 h under vacuum to remove the DMF. The resultant solid material was pulverized by mechanical ball milling to produce a fine powder, which was heated in an argon-filled furnace at 300° C. for 2 h. As shown in FIG. 44, two simultaneous reactions are thought to occur in this step: Cyclization in which one of the triple bonds in the nitrile group cleaves, and the nitrogen sequentially bonds to the carbon in the neighboring nitrile group, thus forming ring-like structures. This reaction is accompanied by dehydrogenation in which $Li_2S_3$ decomposes to yield $Li_2S$ and elemental sulfur, which is lost as $H_2S$ by combining with the hydrogen atoms in the PAN chain. After heat treatment at 300° C., the material was further heated in argon at 600° C. for 30 min to carbonize it. Based on the proposed mechanism, the $Li_2S$—C composite formation could result in N-containing carbon (ring) structures encapsulating lithium sulfide species. It is noteworthy that although $Li_2S$ is hygroscopic, $Li_2S_3$ is stable in ambient environment and therefore the crosslinking reaction and the drying process was performed out of the glove-box (the carbonization process must still be carried out under argon environment).

Figure 45:
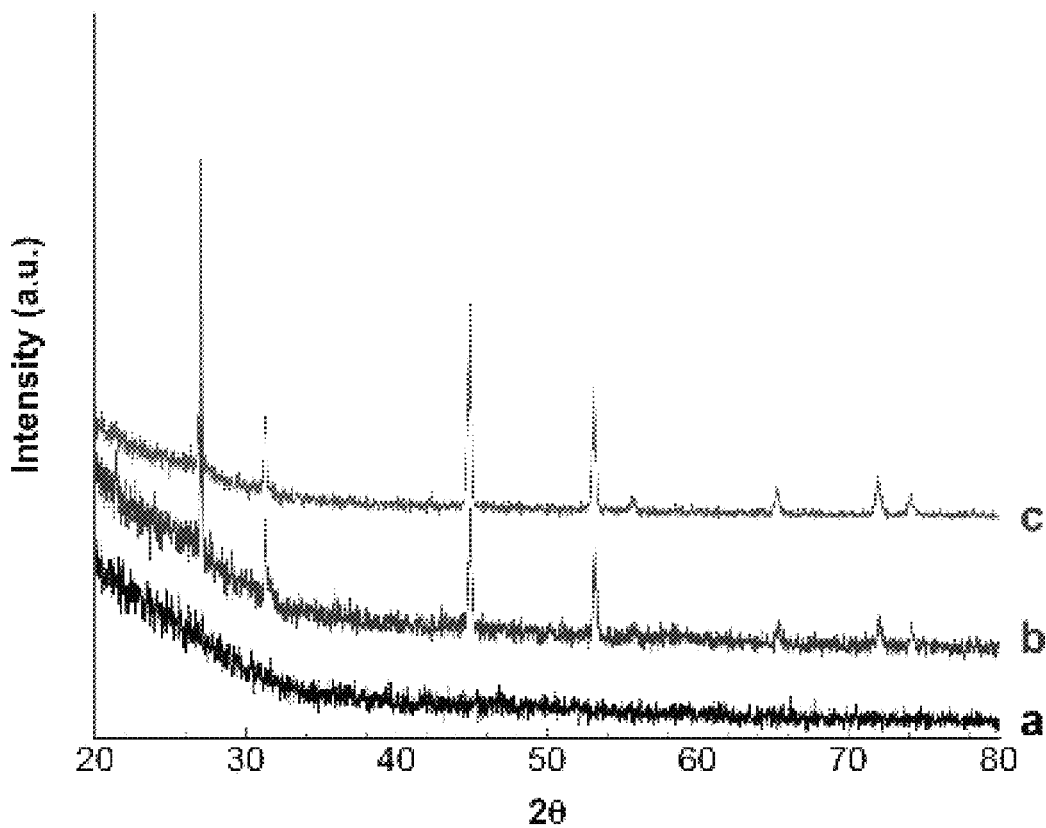
FIG. 45. Representative XRD patterns for: (a) Cross-linked $Li_2S_3$-PAN after vacuum drying; (b) $Li_2S_3$-PAN after heat treatment (dehydrogenation and cyclization) at 300° C.; (c) $Li_2S$—C after carbonization at 600° C.

After carbonization, the product in the form of a fine black powder was characterized by X-ray Diffraction (XRD, Scintag Theta-Theta X-ray Diffractometer) and compared with the vacuum-dried crosslinked $Li_2S_3$-PAN composite and the sample after dehydrogenation at 300° C. The XRD results are shown in FIG. 45. The $Li_2S_3$-PAN composite is clearly seen to be in an amorphous state, which is consistent with the fact that lithium polysulfides are chemical compounds with stoichiometric lithium/sulfur ratios without crystalline structure. The XRD patterns in FIGS. 45*b* and 45*c* can be unambiguously assigned to the $Li_2S$ phase (JCPDS card #23-0369), showing that $Li_2S$ is produced in the composite after the dehydrogenation step. This is expected due to $Li_2S_3$ decomposition, as shown in FIG. 45*b*. The weight fraction of $Li_2S$ can be determined from oxidative TGA, with the TGA curve shown in FIG. 50. Assuming complete oxidization of the carbon and complete conversion from $Li_2S$ (molar mass 45.95 g mol$^{-1}$) to $Li_2SO_4$ (molar mass 109.94 g mol$^{-1}$), based on the final weight gain percentage (124 wt %) of the $Li_2S$—C after TGA, the $Li_2S$ weight ratio in $Li_2S$—C can be calculated as 51.8 wt %. The XRD pattern of the remains after TGA is shown in FIG. 51, which can be assigned to $Li_2SO_4$ (JCPDS card #20-0640).

Infrared spectra of $Li_2S$—C composites synthesized at 300° C. and 600° C., PAN carbonized at 600° C. for 2 hours and bulk $Li_2S$ are shown in FIG. 53. The IR peaks in the range of 1020-1340 cm$^{-1}$ can be assigned to the stretching modes of the C—N bond; indicating that it is notable that in PAN carbonized at 600° C., the IR peaks are noticeably broad, while in the $Li_2S$—C composite samples the corresponding peaks are sharper. The IR spectra indicate that in the composites, nitrogen is involved in the C—N bond which forms part of the ring structure, as is the case in PAN. Consistent with the hypothesis that $Li_2S$ forms a coordination-type of interaction with nitrogen, the spectra also suggest that nitrogen interacts with the crystalline $Li_2S$ salt, thus causing broadening of the IR bands.

Raman spectra of the $Li_2S$—C composites synthesized at 300° C. and 600° C. are reported in FIG. 53 (*a*), along with the spectra of PAN carbonized at 600° C. for 2 h and the glass holder. Spectra of $Li_2S$—C composites and carbonized PAN all contain bands corresponding to graphite (G), disordered graphitic lattices (D1) and amorphous carbon (D3), as seen in the deconvoluted spectrum in FIGS. 53 (*b*) and (*c*), indicating the partially graphitic nature of PAN carbonized at this temperature. The wavenumbers, band half widths and relative areas of deconvoluted peaks are listed in Table 1. It is seen that the $Li_2S$ composite has lower graphitic content compared to pure PAN carbonized at the same temperature, which could be due to the presence of lithium sulfide in close proximity to the carbon backbone, causing hindrance to the formation of graphitic lattices during carbonization. This result again supports the hypothesis of Li—N interaction in the composite.

Figure 46:
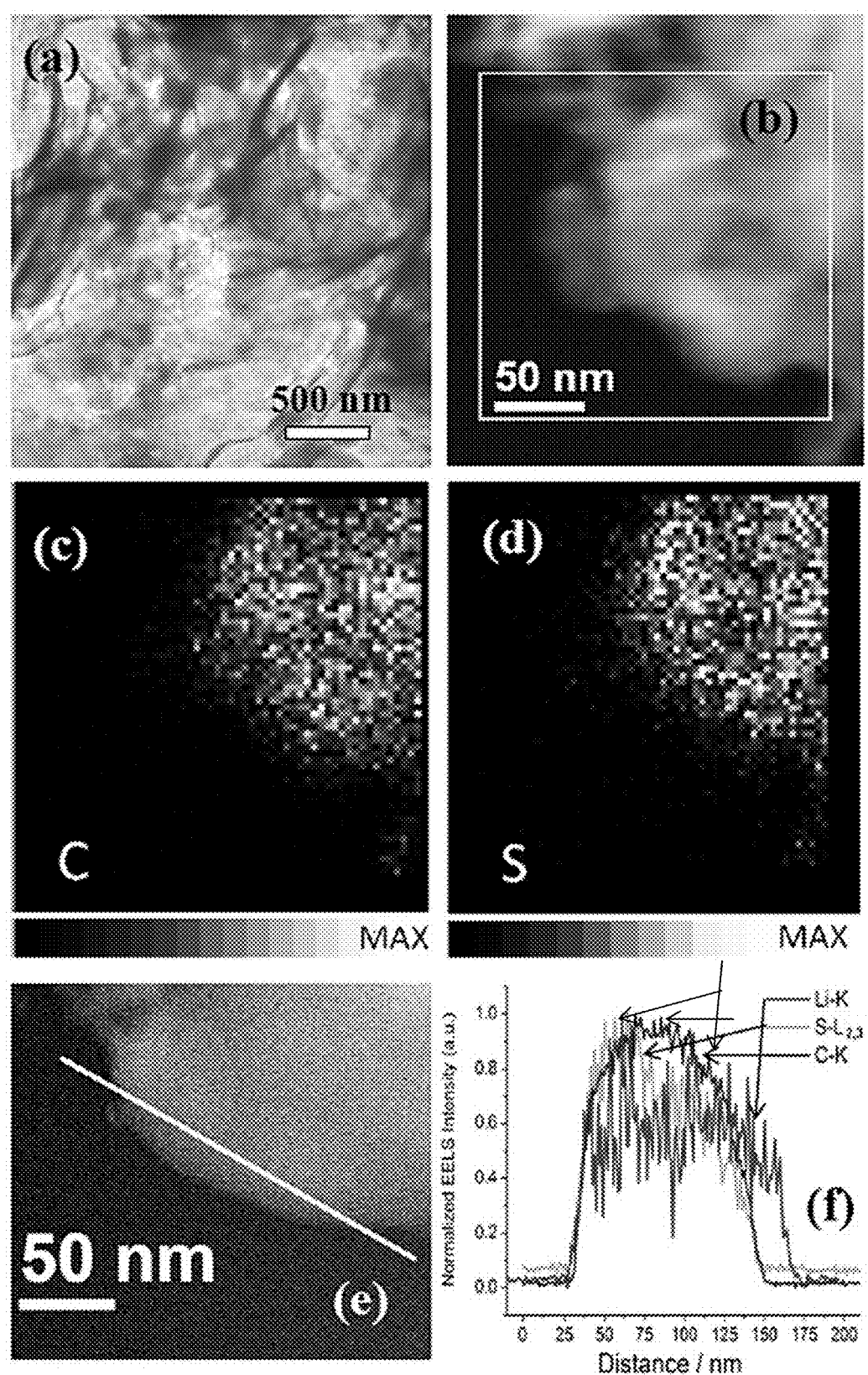
FIG. 46. Representative TEM (a) and STEM (b) images of the $Li_2S$—C composite; (c) and (d): EDX carbon and sulfur maps based on the area shown in (b); (e) STEM image and (f) normalized EELS intensity along the line in (e).

FIG. 46(*a*) shows a typical TEM image of the $Li_2S$—C composite carbonized at 600° C., indicating the formation of flake-like structures during the carbonization of polyacrylonitrile. Similar structures have been observed in the literature for carbonized PAN. To determine the distribution of lithium sulfide in the composite, elemental identification is performed on the 600° C. $Li_2S$—C composite. FIGS. 46(*c*) and (*d*) show the energy dispersive X-ray (EDX) maps for carbon and sulfur based on the area shown in the annular dark field (ADF) image (FIG. 46(*b*)). The edge of carbon and sulfur EDX maps in FIGS. 46(*c*) and (*d*) match the edge shown in the ADF image, indicating that carbon and sulfur are homogeneously distributed throughout the composite, without apparent phase segregation. Since the K edge of lithium (55 eV) is not detectable using EDX, electron energy loss spectroscopy (EELS) has been performed on the composite to investigate the presence of lithium. A line scan is performed in the area shown in FIG. 46(*e*), with normalized EELS intensities with respect to position for Li—K edge, S-$L_{2,3}$ edges and C—K edge shown in FIG. 46(*f*). The results demonstrate that in addition to carbon and sulfur, lithium is also uniformly dispersed in the composite material (EDX spectrum and original and power-law background subtracted EELS data are found in FIG. 54). These observations support the hypothesis that by utilizing the synthesis strategy, which makes use of Li—N interaction, composites with lithium and sulfur uniformly dispersed in carbon hosts can be obtained.

Figure 47:
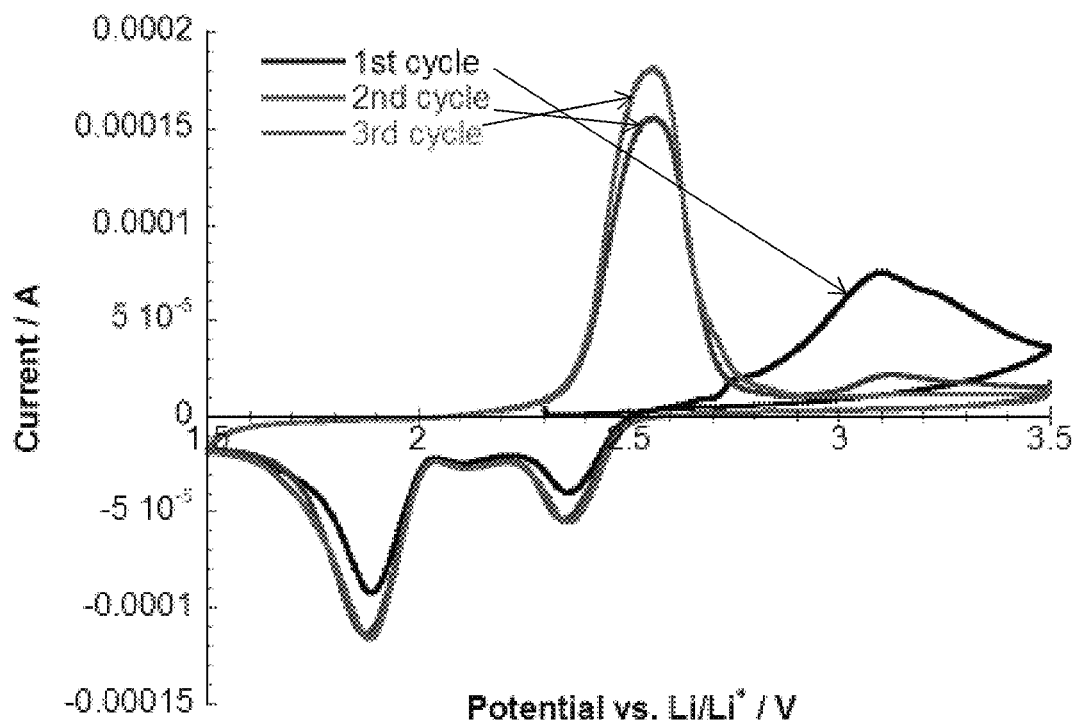
FIG. 47. Representative cyclic voltammograms of the as prepared $Li_2S$—C composite cathodes at a scan rate of 0.05 mV/s.

The electrochemical properties of the $Li_2S$—C composite cathode materials were characterized in coin cells with lithium foil as the counter electrode. FIG. 47 shows the first three cyclic voltammetry (CV) cycles of the $Li_2S$—C cathode vs. Li/Li$^+$ from 1.5 V to 3.5 V at a scanning rate of 0.05 mV sec$^{-1}$. Since the $Li_2S$—C cathode was lithiated, CV measurements were started with a de-lithiation process by increasing potential from the open circuit potential. The first cathodic peak is seen to be broad and centered at 3.1 V with a small shoulder at 2.75 V. The potential of this cathodic peak is distinctly higher than the cathodic peaks from conventional S—C cathode materials, which are typically seen at approximately 2.5 V. The higher cathodic peak of the $Li_2S$—C cathode indicates a delithiation reaction with higher energy barrier than that in the conventional S—C cathodes. It could be produced by the Li—N bonding from the nitrogen containing groups in the carbon. After the delithiation, the first anodic scan demonstrated typical sulfur-oxidizing-Li CV peaks at 2.35 V, 2.1 V, and 1.9 V. The second cathodic scan showed a major cathodic peak at 2.55 V which is more consistent with the conventional S—C cathodes. Also, the amplitude of the broad cathodic peak at 3.1 V was greatly reduced. The third CV cycle showed a more pronounced cathodic peak at 2.55V and absence of the 3.1V cathodic peak. The anodic peaks remained stable and consistent. The evolution of the CV curves at different cycles is consistent with the hypothesis that the $Li_2S$—C cathode material is enabled by the Li—N bonding, which is indicated by the unusual high potential delithiation reaction in the initial cycles. CV cycling started with lithiation (decreasing potential from OCP vs. Li/Li$^+$) indicated the same mechanism as shown in FIG. 55.

Figure 48:
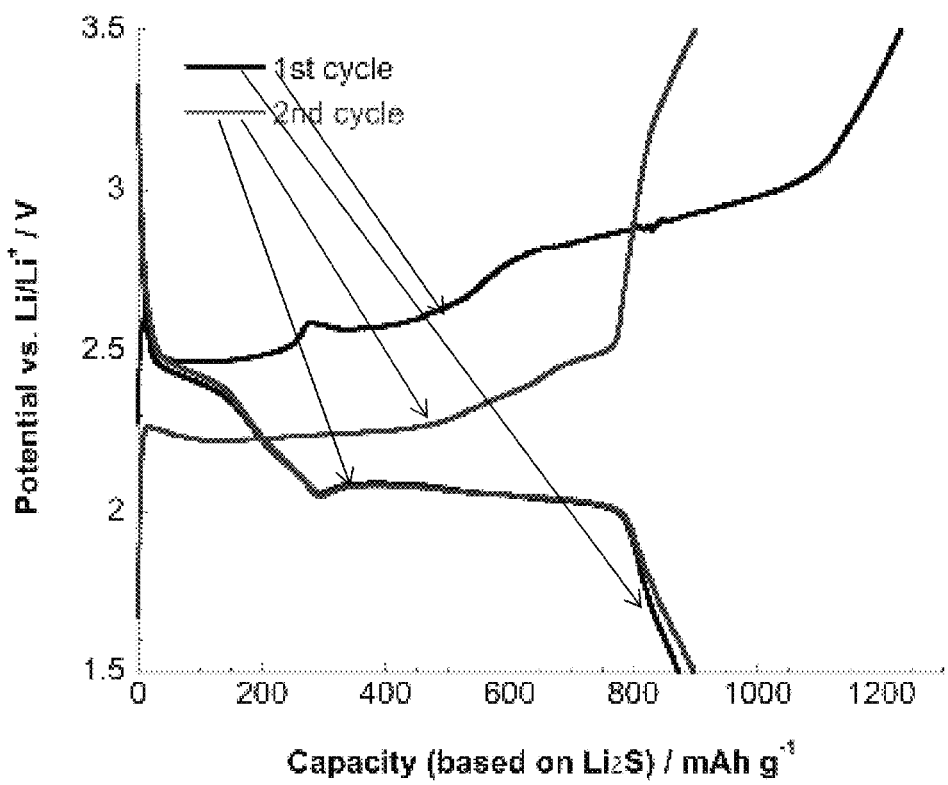
FIG. 48. Two representative galvanostatic charge/discharge profiles of the $Li_2S$—C cathode at a low charge/ discharge rate of 10 mA g$^{-1}$. These measurements are designed to characterize the near-equilibrium state electrochemical performance of the cathode.

Galvanostatic charge/discharge measurements were also used to characterize the $Li_2S$—C composite cathodes. These measurements also reveal the unusual delithiation reaction in the $Li_2S$—C cathode as shown in FIG. 48. To minimize the effect of over-potential, the $Li_2S$—C cathode was charged and discharged at a very low current density at 10 mA g$^{-1}$, based on the mass of active material $Li_2S$ (51.8% of total mass). The first charging curve suggests that there are three plateaus, i.e., three delithiation steps in the first charging process. The first plateau at 2.5 V, and the second at approximately 2.75 V are followed by a regime in which the potential gradually increases to between 2.8 V and 3.0 V. Since the galvanostatic measurements were performed under a very slow rate (~110 h charging time vs. ~11 h charging time in CV), the electrochemical reactions are considered to take place under conditions that approach thermodynamic equilibrium. Therefore, the higher delithiation potential in the first charge appears to be truly an indication of a higher energy barrier induced by the Li—N bonding. The subsequent cycling process demonstrated discharge/charge profiles consistent with the conventional sulfur cathode, and a reversible capacity of approximately 900 mAh g$^{-1}$ was achieved, which was close to the theoretical capacity of Li$_2$S (1166 mAh g$^{-1}$).

FIG. 49 reports the stability and coulombic efficiency of the Li$_2$S—C cathode under a charge/discharge current of 200 mA g$^{-1}$ based on Li$_2$S. Stable reversible capacities of 500 mA g$^{-1}$ and coulombic efficiencies of nearly 100% were achieved, indicating the effectiveness of the dispersed Li$_2$S architecture in sequestering sulfur and inhibiting shuttling reaction.

Interactions between lithium ions and nitrile groups in a high-molar mass polyacrylonitrile (PAN) can be used to create carbon-Li$_2$S composites in which Li$_2$S is uniformly distributed in a carbon host. Similar approaches can be used to control the distribution of other metal salts in polymer- or carbon-based composites. The results indicate that carbon-Li$_2$S composites created using the new approach offer superior potential, in comparison to previous methods, as cathode materials for high-energy lithium ion batteries with great cycling stability and excellent coulombic efficiency. The improved performance of the new composite cathodes can be attributed to the uniform dispersion of Li$_2$S in carbon and the capacity of the structures to sequester higher order polysulfides generated during electrochemical cycling. It was shown that Li$_2$S$_x$ is a more efficient cross-linker for PAN in solvents such as DMF with high dielectric constants. This suggests that a coordination-like interaction between Li$^+$ ions in solution and nitrogen atoms along the polymer backbone are responsible for the uniform dispersion of Li$_2$S achieved in the composites.

Experimental: Synthesis: All chemicals were purchased from Sigma-Aldrich unless otherwise specified and used without purification. In a typical synthesis, 0.46 g of Li$_2$S was first reacted with 0.64 g of elemental sulfur (1:2 molar ratio) in 5 mL of DMF to form Li$_2$S$_3$ stoichiometrically by vigorous stirring at room temperature. The reaction can be followed colorimetrically. The initial Li$_2$S and DMF mixture has a faint blue color, which quickly turns deep red upon sulfur addition. After stirring at room temperature for 1 h, the solid Li$_2$S completely dissolved in DMF to produce a 2M solution of Li$_2$S$_3$ in DMF. Following preparation of Li$_2$S$_3$ solution, 0.53 g of PAN (MW=150,000) was dissolved in 5 mL of DMF, which was then mixed with the Li$_2$S$_3$ solution. The molar ratio of Li to acrylonitrile units (nitrile groups) was maintained at 2:1. The resultant mixture of Li$_2$S$_3$ and PAN in DMF was vigorously stirred while heated at 80° C. After approximately 30 mins, the mixture became a deep-red, rigid solid, evidence that the individual PAN chains are strongly cross-linked by interaction with Li-ions.

Characterization: The crystal structures of the products were characterized using Scintag Theta-theta PAD-X X-Ray Diffractometer (Cu Kα, λ2=1.5406 Å). Their morphologies were studied using FEI Tecnai G2 T12 Spirit Transmission Electron Microscope (120 kV) and elemental mapping (EDX and EELS) was performed using FEI Tecnai F20 Transmission Electron Microscope (200 kV). Thermogravimetric analysis was performed using TA Instruments Q5000 IR Thermogravimetric Analyzer. Raman spectra were collected using a Renishaw InVia Confocal Raman Microscope (laser wavelength=488 nm) with samples containing Li$_2$S sealed in a glass holder. Fourier Transform Infrared Spectra were taken using a Bruker Optics Vertex80v Infrared Spectrometer with air-sensitive samples tested in a vacuum-evacuated chamber.

Electrochemical characterization: Electrochemical characterization of the Li$_2$S @C nanocomposites as cathode materials in rechargeable lithium batteries was performed at room temperature in 2032 coin-type cells. The working electrode consisted of 90 wt % of the active material, 5 wt % of carbon black (Super-P Li from TIMCAL) as a conductivity aid, and 5 wt % of polymer binder (PVDF, polyvinylidene fluoride, Aldrich). Aluminum foil (0.004 in thick, Alfa Aesar) was used as the current collector. Casting of electrode film was performed in a glove box with moisture and oxygen concentrations below 0.1 ppm because Li$_2$S is sensitive to moisture. Typical thickness of the active material film is ~0.03 mm and mass per unit area is ~0.63 mg Li$_2$S/cm$^2$. Lithium foil (0.03 in thick, Alfa Aesar) was used as the counter and reference electrode. 1M lithium bis(trifluoromethanesulfonyl)imide in a mixture of 1:1 volume ratio of tetraethylene glycol dimethyl ether and n-methyl-(n-butyl) pyrrolidinium bis(trifluoromethanesulfonyl)imide was used as the electrolyte. Celgard 2500 polypropylene membranes are used as the separator. Assembly of cells was also performed in the glove box. The room-temperature electrode capacities were measured using Neware CT-3008 battery testers and cyclic voltammetry was performed with a Solartron Model 1470 Potentiostat/Galvanostat.

TABLE 1

Wavenumbers, band half widths and peak areas of the different bands in the Raman spectra of the samples.

| Sample/Band | Wavenumber (cm$^{-1}$) | Band FWHM (cm$^{-1}$) | Peak Area (% of Total) |
|---|---|---|---|
| PAN 600° C. | | | |
| D1 | 1366 | 158 | 71.8 |
| D3 | 1562 | 81 | 15.1 |
| G | 1606 | 58 | 13.1 |
| Li$_2$S—C 600° C. | | | |
| D1 | 1334 | 131 | 53.2 |
| D3 | 1513 | 166 | 38.4 |
| G | 1585 | 71 | 8.4 |

Example 6

This example describes the synthesis and characterization of examples of hybrid materials and nanocomposite materials of the present invention.

Lithium-sulfur batteries are among the most promising candidates for next-generation rechargeable lithium batteries in view of recent progress on sulfur-carbon composite cathodes. However, further progress on such batteries is hampered by their concomitant need for a metallic lithium cathode, which introduces new challenges associated with uneven electrodeposition and lithium dendrite formation. In this example, a method of creating lithium sulfide-carbon composites as cathode materials, which can be paired with high-capacity anodes other than metallic lithium is disclosed. Lithium sulfide is dispersed in a porous carbon matrix, which serves to improve its electrical conductivity and provides a framework for sequestration of sulfur and lithium polysulfides. The in situ synthesis approach allows facile, scalable synthesis of lithium sulfide-carbon composite materials that exhibit improved electrochemical properties. Also investigated are the effects of lithium polysulfides dissolved in the electrolyte on the stability and cycling behavior of Li$_2$S-carbon composite cathodes.

In this example, a new approach for synthesizing lithium sulfide-carbon (Li$_2$S@C) nanocomposites and evaluating the materials as cathodes for lithium-ion batteries is described. Additionally, also investigated are the effects of dissolved $Li_2S_n$ in the electrolyte on the electrochemical properties of $Li_2S$ @C cathodes.

Materials synthesis: Chemical reagents were purchased from Sigma-Aldrich unless otherwise stated and used without purification. 1.8 g of resorcinol, 6 g of lithium sulfate and 7 mg of sodium carbonate were dissolved in 70 ml of water, to which 2.7 ml of 30% formaldehyde solution was added. The solution was loaded to a Teflon-lined stainless steel autoclave and heated at 180° C. for 12 hours. The resulting gel was centrifuged and the precipitate was collected and freeze-dried overnight. The solid obtained was heated in a tube furnace under argon atmosphere at 900° C. for 2 hours using a ramp rate of 5° C./min to obtain the final product. For lithium polysulfide preparation, 920 mg $Li_2S$, 3.2 g sulfur and 0.5 g lithium powder (from FMC Lithium) were added to 5 ml tetraglyme (tetraethylene glycol dimethyl ether) and stirred for 24 hours. The mixture was filtered to obtain a dark reddish liquid. For more dilute solutions of lithium polysulfide, this liquid is diluted with either pure tetraglyme (for spectroscopy and elemental analysis) or solutions of LiTFSI in tetraglyme (for conductivity and electrochemical measurements) to obtain the desired concentrations.

Characterization: The crystal structures of the particles were characterized using Scintag Theta-theta PAD-X X-Ray Diffractometer (Cu Kα, λ=1.5406 Å). Their morphologies were studied using FEI Tecnai G2 T12 Spirit Transmission Electron Microscope (120 kV) and elemental mapping (EDX and EELS) was performed using FEI Tecnai F20 Transmission Electron Microscope (200 kV). Thermogravimetric analysis was performed using TA Instruments Q5000 IR Thermogravimetric Analyzer. Raman spectra were taken using a Renishaw InVia Confocal Raman Microscope. UV-visible spectra were taken using a Molecular Devices SpectraMax M2e spectrophotometer. Nitrogen adsorption analysis for porous materials was performed using a Micromeritics ASAP 2020 Accelerated Surface Area and Porosimetry System. Elemental analysis (atomic emission spectroscopy) was performed using a Thermo Scientific iCAP 6500 ICP spectrometer. Ionic conductivities were measured using a Novocontrol N40 broadband dielectric spectrometer.

Electrochemical characterization: Electrochemical characterization of the $Li_2S$ @C nanocomposites as cathode materials in rechargeable lithium batteries was performed at room temperature in 2032 coin-type cells. The working electrode consisted of 80 wt % of the active material, 10 wt % of carbon black (Super-P Li from TIMCAL) as a conductivity aid, and 10 wt % of polymer binder (PVDF, polyvinylidene fluoride, Aldrich). Aluminum foil (0.004 in thick, Alfa Aesar) was used as the current collector. Electrode casting was performed in the glove box as $Li_2S$ is sensitive to moisture. Lithium foil (0.03 in thick, Alfa Aesar) was used as the counter and reference electrode. A 1 M solution of LiTFSI in tetraglyme, or solutions containing lithium polysulfides described above, were used as the electrolyte. Celgard 2500 polypropylene membranes are used as the separator. Assembly of cell was performed in a glove box with moisture and oxygen concentrations below 0.1 ppm. The room-temperature electrode capacities were measured using Neware CT-3008 battery testers and cyclic voltammetry was performed with a CH Instruments CHI600D potentiostat. Electrochemical impedance spectroscopy was performed with a Solartron Model 1252 Electrochemistry Workstation with a frequency response analyzer.

Results and Discussion. The lithium sulfide-carbon ($Li_2S$@C) composite was synthesized using an in situ approach designed to produce a uniform distribution of $Li_2S$ in a carbon host. The method is illustrated in FIG. 56. $Li_2S$ is formed through the reaction $Li_2SO_4+2C \rightarrow Li_2S+2CO_2$. The reduction of sulfates to sulfides by carbon has long been utilized in the Leblanc process. Bulk lithium sulfide has been used as the precursor for $Li_2S$@C composites in a few reports. The price of $Li_2S$ is an order of magnitude higher than common lithium precursors such as lithium carbonate, suggesting that this choice is perhaps not best for a battery cathode material. Here the focus is on a lithium sulfate precursor, which seems a more promising candidate for eventual large-scale economical synthesis of $Li_2S$@C composite cathodes.

The carbon framework is formed by pyrolysis of a resorcinol-formaldehyde aerogel (RF gel). Resorcinol and formaldehyde are known to undergo condensation polymerization under basic or acidic conditions to form a cross-linked gel known as the RF gel. RF gel-based carbon materials have been promising candidates for various applications such as adsorbents, catalysts and battery/supercapacitor electrodes because of their high porosities and surface areas, high electrical conductivities and controllable pore structures. It is hypothesized that the large numbers of oxygen atoms present in the RF gel may form coordination-like linkages with lithium ions in $Li_2SO_4$, facilitating its uniform dispersion in the host material. FIG. 57 shows the X-Ray diffraction pattern of the $Li_2S$ composite synthesized using the in situ approach, and the pattern is unambiguously assigned to the $Li_2S$ phase (JCPDS card #23-0369). The background signal at low two-theta angles is due to Kapton tape used for protection from air. The in situ synthesis scheme combines pyrolysis and $Li_2S$ formation in a one-step process. In situ processes have been employed for the synthesis of composites of carbon with various types of materials such as metal oxides and alloys. This approach obviates separate creation of the carbon matrix and the active material and enhances the scalability of the synthesis process.

To determine the mass loading of $Li_2S$ in the composite, TGA was performed for the composite with results shown in FIG. 67. In air, $Li_2S$ is oxidized to $Li_2SO_4$ as confirmed by XRD and the weigh fraction of $Li_2S$ in the composite is calculated to be ~62%. Raman spectroscopy was used to investigate the nature of carbon obtained from pyrolysis of RF gel. Because $Li_2S$ is hygroscopic and may affect the measurement, Raman spectrum is taken (shown in FIG. 58) for the carbon pyrolyzed from RF gel synthesized using the same conditions (except that no $Li_2SO_4$ was added) at 900° C. for 2 hr. The spectrum can be deconvoluted into peaks of Lorentzian shape centered at 1600, 1547 and 1350 cm$^{-1}$, which may be assigned to graphite (G), amorphous carbon (D3) and disordered graphitic lattice (D1), respectively. The result indicates the partially graphitic nature of the carbon in the composite. The electrical conductivity of carbon obtained from pyrolyzing RF gel depends on factors such as pyrolysis temperature and density of product, and the value is generally on the order of 1~20 S/cm for a pyrolysis temperature of 800-900° C. In comparison, the electrical conductivity of carbon black is on the order of 1-5 S/cm, indicating that carbon derived from RF gel is a good candidate as a conductive supporting matrix for lithium sulfide. Besides electrical conductivity, the graphene layers present in the graphitic lattices can serve as substrates to which sulfur can be linked via carbon-sulfur interactions, which is helpful in the immobilization of sulfur/polysulfides. The surface area and pore structure of the RF gel carbon composite were characterized using nitrogen adsorption with results shown in FIG. 68. The isotherm follows type-IV behavior with a type H4 hysteresis loop, which may indicate the presence of large mesopores embedded in a matrix of pores with much smaller size. The pore size distribution shows most of the pores are of size <6 nm. The BET surface areas of $Li_2S@C$ composite and pure carbon are 336 and 830 $m^2/g$, respectively, indicating that the surface area of the composite is mainly attributed to that of the carbon, considering that the weight fraction of carbon in the composite is ~38%.

The morphology of the composite is studied using TEM and typical images are shown in FIGS. 59(a) and (b). It is seen that the cross-linked RF gel generally forms spherical particles in the size range of 500 nm-2 µm. To study the distribution of lithium sulfide in the carbon particles, Energy Dispersive X-Ray Spectroscopy (EDX) is performed on the particles and carbon and sulfur mapping is shown in FIGS. 59(e) and (f), with STEM image and EDX spectrum shown in FIGS. 59(c) and (d). C and S maps show that sulfur is distributed throughout the carbon particles. Because of the relatively large size of the particles, it is difficult to distinguish in TEM the finer features of lithium sulfide within the bigger carbon particles. Lithium cannot be detected using EDX and Electron Energy Loss Spectroscopy (EELS) is used to investigate the presence of lithium. A line scan is performed on the composite for lithium (shown in FIG. 69(d) based on the image in S2 (a) with EELS spectra shown in FIGS. 69(b) and (c)) and also indicate that lithium is distributed throughout the particles. An advantage which carbon could provide is that it could help to sequester the sulfur through forming chemical bonding with sulfur and acting as a physical barrier for the diffusion of polysulfides.

The electrochemical performance of the as prepared $Li_2S@C$ composite is shown in FIGS. 60-62. FIG. 60 shows the cyclic voltammograms of $Li_2S@C$ at different cycle numbers, which follow the commonly known reaction mechanism for lithiation of sulfur. At ~3V the material exists as sulfur ($S_8$) and at ~1.5V as $Li_2S$. The first anodic scan corresponds to the delithiation of $Li_2S$ to form sulfur (peak at 2.75V). In the cathodic scans, three peaks are distinguishable, at approximately 2.45V, 2.1V and 1.95V, respectively. These peaks correspond to reduction of $S_8$ to higher order polysulfides ($Li_2S_n$, n=5~8), higher order to lower order polysulfides ($Li_2S_n$, n=2~4), and lower order polysulfides to $Li_2S$, respectively. In the anodic scan, two peaks are distinguishable at approximately 2.4V and 2.55V and correspond to the oxidation of $Li_2S$ to polysulfides and polysulfides to $S_8$. The cyclic voltammograms are consistent with the charge-discharge curves in FIG. 61(a), showing two reduction plateaus in discharge, at 2.45V and 1.95V, and two oxidation plateaus in discharge, at 2.3V and 2.5V. The decrease in peak area with cycle number in the CV scans corresponds to the decrease in discharge and charge capacities. FIG. 61(b) shows the charge-discharge curves for the physical mixture of $Li_2S$ (62% by weight) and carbon pyrolyzed from RF gel at 900° C. (38% by weight).

Comparison of FIGS. 61(a) and 61(b) clearly show that the composites offer superior capacity and far superior ability to suppress the polysulfide shuttle. The cycling performance of the $Li_2S@C$ composite and the physical mixture are compared in greater detail in FIG. 62(a). The charge/discharge rates is fixed at 0.5 C (1 C=1166 mA/g $Li_2S$) and the capacity values reported are normalized with respect to the $Li_2S$ active material mass. For the $Li_2S@C$ composite, after 40 cycles the discharge capacity is 280 mAh/g compared to an initial discharge capacity of 330 mAh/g. The coulombic efficiency decreases from 80% to 60% over the same number of cycles. The results show clear improvement over the physical mixture of $Li_2S$ and carbon, but are far from optimum. Discharge capacities of the composite at different charging rates (C/3 to 3 C) are shown in FIG. 62(b) Impedance plots for the composite and for physical mixtures of $Li_2S$ with carbon (with the same electrode mass of 1.5 mg) before cycling and after 10 cycles are shown in FIG. 70. Lower ohmic and charge transfer resistances are observed for the composite compared to the physical mixture, showing the effect of dispersing $Li_2S$ in carbon in improving the conductivity of the material.

As in the lithium-sulfur cell, the composition of the electrolyte can have a profound effect on the solubility of lithium polysulfide $Li_2S_n$ species, which in turn may have a large effect on the cell electrochemistry and stability. Additives such as $LiNO_3$ and ionic liquids have been proposed and shown to improve the cycling performance and coulombic efficiency of Li—S cells by limiting the loss of sulfur to the electrolyte. Saturation levels of lithium polysulfides in the electrolyte should have as profound and perhaps more predictable effect. Lithium polysulfides have been investigated as catholytes as they are able both to serve as the electrolyte component and to deposit on the cathode in the reduced state as an active material. Lithium polysulfides dissolved in the electrolyte are also able to form a $Li_2S/Li_2S_2$ solid electrolyte interface film on a metallic lithium surface, as revealed by impedance studies, which can passivate and stabilize the surface. Thus in addition to impeding loss of the active material from the cathode to the electrolyte, an electrolyte which already contains lithium polysulfides with the appropriate composition may also provide added benefits.

The synthesis protocol for lithium polysulfide used in this example is described in the example. Elemental analysis indicates that the overall composition of lithium polysulfides in the electrolyte is $Li_2S_{3.5}$; implying that $Li_2S_n$ species with a distribution of n values above 2 are present in solution. UV-visible absorption spectra taken immediately after preparation of the electrolyte (with dilution to allow the absorbance to reach an appropriate range) are shown in FIG. 63. Deconvolution of the spectrum yields two peaks at ~615 nm and ~450 nm. The 615 nm peak is assigned to $S_3^{2-}$, while the peak at 450 nm corresponds to higher order polysulfides such as $S_5^{2-}$ or $S_6^{2-}$. The ratio of the area under the curve for these two peaks is 4.1:1, which is consistent with the overall composition of the solution (n=3.5 in $Li_2S_n$). The ionic conductivities of the $Li_2S_n$ solutions in tetraglyme (with the same overall n ratio but different dilution ratios) were measured and shown in FIG. 71 (all with 1M LiTFSI). The ionic conductivities appear to follow a VFT-type relationship with temperature ($\sigma=A*exp(-B/(T-T_0))$). The fitting results are shown in the figure as lines with fitting parameters summarized in Table 2. It is seen that the most concentrated lithium polysulfides solution (1.9M $Li_2S_{3.5}$) has the lowest conductivity because of its high viscosity. As the polysulfides concentration becomes lower, the ionic conductivity of the solution approaches that of the bare LiTFSI/tetraglyme electrolyte.

The electrochemical performance of the $Li_2S@C$ composite in 1M LiTFSI+0.095M $Li_2S_{3.5}$ is shown in FIGS. 64-66. The cyclic voltammograms (FIG. 64) show essentially the same peaks observed for the bare LiTFSI electrolyte, because polysulfides originally present in the electrolyte would also undergo similar reduction and oxidation reactions as polysulfides, which originate from the cathode. The polysulfides originally present in the electrolyte can be reduced to $Li_2S/Li_2S_2$ and deposited on the cathode and contribute to the apparent capacity measured (in addition to that contributed by the $Li_2S$ originally in the cathode). To account for this contribution, a control cathode was used, which contained only the RF gel carbon (no $Li_2S$), with the same mass as the carbon present in the $Li_2S@C$ cathode. Specifically, on a 1.0 cm$^2$ aluminum electrode, 0.87 mg $Li_2S@C$ is deposited, which contains 0.54 mg $Li_2S$ and 0.33 mg carbon. The control cathode also contained 0.33 mg carbon, and 30 µL, electrolyte is used for both cases, which contains 0.32 mg sulfur. The discharge capacities using the carbon cathode and $Li_2S@C$ cathode are shown in FIG. 65, with a current density of 1.6 mA/cm$^2$, which is equivalent to 0.5 C (1 C=1166 mA/g $Li_2S$) for the usual combination of $Li_2S@C$ cathode with the 1M LiTFSI electrolyte which has been used so far.

It is apparent from FIG. 65 that the carbon cathode with the polysulfide electrolyte shows exceptionally stable discharge capacities with no detectable decrease in 80 cycles, while the $Li_2S@C$ cathode shows some fading. The discharge capacity due to the $Li_2S$ in cathode is calculated by subtracting the capacity contribution of the carbon cathode from total capacity and is shown in FIG. 66, with the performance in bare LiTFSI electrolyte also shown for comparison. An electrolyte with 0.095M of lithium polysulfide instead of higher polysulfide concentrations was used in order to ensure good ionic conductivity and to limit the capacity contributed by the electrolyte from overshadowing that of the $Li_2S$ in the cathode. It is apparent from the figure that the electrolyte containing dissolved lithium polysulfide exhibits markedly lower capacity fading, compared to the electrolyte without the $Li_2S_{3.5}$. The capacities of the carbon cathode, $Li_2S@C$ cathode at different charging rates are shown as FIG. 72 and the difference in capacities for $Li_2S@C$ and pure carbon, normalized by electrode material mass, over the range of charge/discharge rates studied is shown in FIG. 66. The figure nicely shows that the presence of the $Li_2S_{3.5}$ in the electrolyte stabilizes the cycling performance of $Li_2S$ @C cathodes, without compromising the rate capability of the cathode.

TABLE 2

VFT fitting parameters for ionic conductivities of electrolytes (with and without lithium polysulfides)

| Sample | VFT fitting parameters | | |
|---|---|---|---|
|  | A(S cm$^{-1}$) | B(K) | T$_0$(K) |
| 1M LiTFSi in tetraglyme | 0.0238 | 302 | 191 |
| 1M LiTFSi + 1.9M $Li_2S_{3.5}$ in tetraglyme | 0.0577 | 582 | 200 |
| 1M LiTFSi + 0.38M $Li_2S_{3.5}$ in tetraglyme | 0.0378 | 400 | 185 |
| 1M LiTFSi + 0.095M $Li_2S_{3.5}$ in tetraglyme | 0.0350 | 357 | 183 |

A scalable, in-situ method for creating lithium sulfide-carbon nanocomposites in which $Li_2S$ is homogeneously dispersed in a mesoporous, partially graphitic carbon matrix has been developed. The matrix serves to enhance the electrical conductivity of the cathode and to sequester the active $Li_2S$ material in the cathode. The effectiveness of the nanocomposite electrodes in inhibiting polysulfide shuttling and in improving the cycling stability of $Li_2S$, is demonstrated through comparisons with the pristine material. It is hypothesized that the success of the approach hinges on the homogeneous distribution of $Li_2S$ in the carbon host. This distribution is thought to arise from specific interactions between the $Li_2SO_4$ precursor for $Li_2S$ and the large concentration of polar oxygens in the resorcinol-formaldehyde aerogel used as a precursor for carbon. It is further shown that electrolyte compositions that incorporate lithium polysulfide as additives lead to additional improvements in cycling stability and efficiency of the $Li_2S@C$ composite anodes.

While the invention has been particularly shown and described with reference to specific embodiments (some of which are preferred embodiments), it should be understood by those having skill in the art that various changes in form and detail may be made therein without departing from the spirit and scope of the present invention as disclosed herein.

What is claimed is:

1. A method for forming a material comprising the steps of:
contacting one or more monomers, wherein at least one of the one or more monomers is a cross-linking monomer,
one or more metal precursor compounds comprising a polymerizable group,
an initiator,
a surfactant,
one or more organic solvents, and
water,
such that a reaction mixture that is an aqueous emulsion is formed,
wherein the metal precursor compounds are present at 10 to 90% by weight of the reaction mixture,
heating the reaction mixture such that the metal precursor compounds are copolymerized with one or more monomers wherein the reaction between the polymerizable groups of one or more metal precursor compounds and the one or more monomers forms a hybrid material comprising a plurality of uniformly dispersed metal precursor compounds chemically bonded to the polymer matrix and, optionally, isolating the hybrid material, and
pyrolysing the hybrid material such that a nanocomposite material comprising a plurality of nanoparticles embedded in a carbon matrix is formed, the nanoparticles being formed from the metal component of the one or more metal precursor compounds.

2. The method of claim 1, wherein the one or more monomers comprise a first monomer, and a second monomer, wherein the second monomer is a cross-linking monomer; and the surfactant is an anionic surfactant.

3. The method of claim 1, wherein the one or more monomers comprise:
a first monomer and
a second monomer,
neither of which is a cross-linking monomer.

4. The method of claim 1, wherein the reaction mixture comprises a plurality of metal precursors, wherein the metal precursors have a different metal.

5. The method of claim 1, wherein the one or more monomers are selected from the group consisting of acrylonitrile, divinyl benzene, resorcinol, formaldehyde, vinylpyrrolidone, vinyl alcohol, acrylic acid, phenol, 1,4-butadiene, isoprene, vinylsilane, sulfur, and combinations thereof.

6. The method of claim 1, wherein the one or more metal precursor compounds are selected from the group consisting of metal carboxylates, metal coordination compounds, and combinations thereof.

7. The method of claim 2, wherein the nanoparticles are metal oxide nanoparticles and the method further comprises reducing the metal oxide nanoparticles of the nanocomposite material comprising a plurality of metal oxide nanoparticles embedded in a carbon matrix by contacting the nanocomposite material with a reductant or heating the nanocomposite material under inert conditions, such that a nanocomposite material comprising a plurality of metal nanoparticles embedded in a carbon matrix is formed.

8. The method of claim 2, wherein the nanoparticles are metal oxide nanoparticles and the method further comprises contacting the nanocomposite material comprising a plurality of metal oxide nanoparticles embedded in a carbon matrix with a sulfur compound, halide compound, or phosphate compound, such that a nanocomposite material comprising a plurality of metal sulfide, metal halide, or metal phosphate nanoparticles embedded in a carbon matrix is formed.

9. The method of claim 1, wherein the nanoparticles are metal sulfide nanoparticles and the method further comprises reducing the metal sulfide nanoparticles of the nanocomposite material comprising a plurality of metal sulfide nanoparticles embedded in a carbon matrix by contacting the nanocomposite material with a reductant or heating the nanocomposite material under inert conditions, such that a nanocomposite material comprising a plurality of metal nanoparticles embedded in a carbon matrix is formed.

10. The method of claim 1, wherein the nanoparticles are metal sulfide nanoparticles and the method further comprises contacting the nanocomposite material comprising a plurality of metal sulfide nanoparticles embedded in a carbon matrix with an oxygen compound, halide compound, or phosphate compound, such that a nanocomposite material comprising a plurality of metal oxide, metal halide, or metal phosphate nanoparticles embedded in a carbon matrix is formed.

11. The method of claim 1, wherein the hybrid material is isolated.

12. The method of claim 1, wherein the one or more monomers comprise a first monomer, and a second monomer, wherein the second monomer is a cross-linking monomer, and wherein the first monomer is a bulk monomer and is the majority of the monomers.

13. The method of claim 1, wherein a moiety of the individual metal precursor compound is incorporated in the polymer matrix via a chemical bond between the polymerizable group of the individual metal precursor compound and the one or more monomers.

14. The method of claim 6, wherein the metal carboxylate comprises an alkyl moiety, wherein the alkyl moiety is substituted with a reactive chemical moiety chosen from a terminal carbon-carbon double bond group, an amine group, and a hydroxyl group.

15. The method of claim 1, wherein the crosslinking monomer is divinyl benzene.

16. The method of claim 1, wherein the nanocomposite material has a pore size distribution including mesopores and micropores.

17. The method of claim 1, wherein the nanocomposite material has an average pore size of less than 20 nm.

18. The method of claim 1, wherein the nanocomposite material comprises graphene-like sheet textures.

\* \* \* \* \*